US012572810B2

(12) United States Patent
Meyerson et al.

(10) Patent No.: US 12,572,810 B2
(45) Date of Patent: Mar. 10, 2026

(54) SYSTEM AND METHOD FOR GENERATING IMPROVED PRESCRIPTORS

(71) Applicant: Cognizant Technology Solutions U.S. Corporation, College Station, TX (US)

(72) Inventors: Elliot Meyerson, Pasadena, CA (US); Risto Miikkulainen, Stanford, CA (US); Olivier Francon, Yssingeaux (FR); Babak Hodjat, Dublin, CA (US); Darren Sargent, West Linn, OR (US)

(73) Assignee: Cognizant Technology Solutions US Corp., College Station, TX (US)

( * ) Notice: Subject to any disclaimer, the term of this patent is extended or adjusted under 35 U.S.C. 154(b) by 921 days.

(21) Appl. No.: 17/835,474

(22) Filed: Jun. 8, 2022

(65) Prior Publication Data

US 2023/0025388 A1     Jan. 26, 2023

Related U.S. Application Data

(60) Provisional application No. 63/208,277, filed on Jun. 8, 2021.

(51) Int. Cl.
*G06N 3/086* (2023.01)

(52) U.S. Cl.
CPC .................................... *G06N 3/086* (2013.01)

(58) Field of Classification Search
CPC ...... G06N 3/086; G06N 3/0442; G06N 3/084; G06N 3/09; G06N 5/01; G06N 3/096
See application file for complete search history.

(56) References Cited

U.S. PATENT DOCUMENTS

| | | | |
|---|---|---|---|
| 5,140,530 A | 8/1992 | Guha | |
| 5,761,381 A | 6/1998 | Arci | |

(Continued)

FOREIGN PATENT DOCUMENTS

| | | |
|---|---|---|
| EP | 0762294 A2 | 3/1997 |
| EP | 2422276 | 2/2012 |

(Continued)

OTHER PUBLICATIONS

Yuan, F., Shou, L., Pei, J., Lin, W., Gong, M., Fu, Y., & Jiang, D. Reinforced MultiTeacher Selection for Knowledge Distillation. Proceedings of the AAAI Conference on Artificial Intelligence, 35(16), pp. 14284-14291. May 18, 2021.*

(Continued)

*Primary Examiner* — Albert M Phillips, III
(74) *Attorney, Agent, or Firm* — Dawn-Marie Bey; Bey & Cotropia PLLC

(57)     ABSTRACT

A system and method of combining and improving sets of diverse prescriptors for Evolutionary Surrogate-assisted Prescription (ESP) model is described. The prescriptors are distilled into neural networks and evolved further using ESP. The system and method can handle diverse sets of prescriptors in that it makes no assumptions about the form of the input (i.e., contexts) of the initial prescriptors; it relies only on the prescriptions made in order to distill each prescriptor to a neural network with a fixed form. The resulting set of high performing prescriptors provides a practical way for ESP to incorporate external human and machine knowledge and generate more accurate and fitting set of solutions.

5 Claims, 50 Drawing Sheets
(48 of 50 Drawing Sheet(s) Filed in Color)

(56) References Cited

U.S. PATENT DOCUMENTS

| | | | |
|---|---|---|---|
| 5,845,266 A | 12/1998 | Lupien et al. |
| 5,920,848 A | 7/1999 | Schutzer et al. |
| 5,930,780 A | 7/1999 | Hughes et al. |
| 6,240,399 B1 | 5/2001 | Frank et al. |
| 6,249,783 B1 | 6/2001 | Crone et al. |
| 6,941,287 B1 | 9/2005 | Vaidyanathan |
| 7,013,344 B2 | 3/2006 | Megiddo |
| 7,246,075 B1 | 7/2007 | Testa |
| 7,370,013 B1 | 5/2008 | Aziz et al. |
| 7,444,309 B2 | 10/2008 | Branke et al. |
| 8,065,244 B2 | 11/2011 | Chen et al. |
| 8,364,519 B1 | 1/2013 | Basu |
| 8,527,433 B2 | 9/2013 | Hodjat et al. |
| 8,639,545 B2 | 1/2014 | Cases |
| 8,768,811 B2 | 7/2014 | Hodjat et al. |
| 8,775,341 B1 | 7/2014 | Commons |
| 8,825,560 B2 | 9/2014 | Hodjat |
| 8,909,570 B1 | 12/2014 | Hodjat et al. |
| 8,918,349 B2 | 12/2014 | Hodjat et al. |
| 8,977,581 B1 | 3/2015 | Hodjat et al. |
| 9,002,759 B2 | 4/2015 | Hodjat et al. |
| 9,015,093 B1 | 4/2015 | Commons |
| 9,053,431 B1 | 6/2015 | Commons |
| 9,230,211 B1 | 1/2016 | Basu |
| 9,466,023 B1 | 10/2016 | Shahrzad et al. |
| 9,489,630 B2 | 11/2016 | Achin et al. |
| 9,605,529 B1 | 3/2017 | Venter |
| 9,678,487 B1 | 6/2017 | Basu |
| 9,785,886 B1 | 10/2017 | Andoni |
| 10,255,529 B2 | 4/2019 | Rabinovich |
| 10,268,953 B1 | 4/2019 | Fink et al. |
| 10,364,662 B1 | 7/2019 | Basu |
| 10,430,709 B2 | 10/2019 | Shahrzad et al. |
| 10,699,194 B2 | 6/2020 | David |
| 10,860,931 B1 | 12/2020 | Venter |
| 10,970,441 B1 | 4/2021 | Zhang |
| 11,003,997 B1 | 5/2021 | Blackwood et al. |
| 11,087,261 B1 | 8/2021 | Basu |
| 2002/0019844 A1 | 2/2002 | Kurowski et al. |
| 2002/0080169 A1 | 6/2002 | Diederiks |
| 2003/0014379 A1 | 1/2003 | Saias |
| 2003/0149603 A1 | 8/2003 | Ferguson et al. |
| 2003/0158887 A1 | 8/2003 | Megiddo |
| 2004/0143559 A1 | 7/2004 | Ayala |
| 2004/0210545 A1 | 10/2004 | Branke et al. |
| 2004/0254901 A1 | 12/2004 | Bonabeau et al. |
| 2005/0033672 A1 | 2/2005 | Lasry et al. |
| 2005/0136480 A1 | 6/2005 | Brahmachari |
| 2005/0187848 A1 | 8/2005 | Bonissone et al. |
| 2005/0197875 A1 | 9/2005 | Kauffman |
| 2005/0198103 A1 | 9/2005 | Ching |
| 2005/0256760 A1 | 11/2005 | Siddhanti |
| 2006/0218107 A1 | 9/2006 | Young |
| 2006/0247973 A1 | 11/2006 | Mueller |
| 2007/0094161 A1 | 4/2007 | Calabro |
| 2007/0100907 A1 | 5/2007 | Bayer |
| 2007/0143198 A1 | 6/2007 | Brandes et al. |
| 2007/0143759 A1 | 6/2007 | Ozgur et al. |
| 2007/0150435 A1 | 6/2007 | Murakawa |
| 2007/0185990 A1 | 8/2007 | Ono et al. |
| 2008/0071588 A1 | 3/2008 | Eder |
| 2008/0228644 A1 | 9/2008 | Birkestrand et al. |
| 2009/0125370 A1 | 5/2009 | Blondeau et al. |
| 2009/0307638 A1 | 12/2009 | Mcconaghy |
| 2009/0327178 A1 | 12/2009 | Jacobson |
| 2010/0018293 A1 | 1/2010 | Monkowski |
| 2010/0030720 A1 | 2/2010 | Stephens |
| 2010/0111991 A1 | 5/2010 | Raitano |
| 2010/0182935 A1 | 7/2010 | David |
| 2010/0256795 A1 | 10/2010 | Mclaughlin |
| 2010/0257228 A1 | 10/2010 | Staggs |
| 2010/0257605 A1 | 10/2010 | Mclaughlin |
| 2010/0274736 A1 | 10/2010 | Hodjat et al. |
| 2010/0274742 A1 | 10/2010 | Hodjat et al. |
| 2010/0293119 A1 | 11/2010 | Ferringer et al. |
| 2011/0040596 A1 | 2/2011 | Chen |
| 2011/0161264 A1 | 6/2011 | Cantin |
| 2011/0246834 A1 | 10/2011 | Rajashekara |
| 2012/0239517 A1 | 9/2012 | Blondeau |
| 2012/0239592 A1 | 9/2012 | Esbensen |
| 2012/0313798 A1 | 12/2012 | Markram |
| 2013/0006901 A1 | 1/2013 | Cantin |
| 2013/0124440 A1 | 5/2013 | Hodjat et al. |
| 2013/0132042 A1 | 5/2013 | Chan |
| 2013/0138436 A1 | 5/2013 | Yu |
| 2013/0254142 A1 | 9/2013 | Hodjat |
| 2013/0311412 A1 | 11/2013 | Lazar |
| 2014/0006316 A1 | 1/2014 | Hodjat |
| 2014/0011982 A1 | 1/2014 | Marasco |
| 2014/0019388 A1 | 1/2014 | Kingsbury |
| 2014/0229362 A1 | 8/2014 | Hodjat |
| 2015/0046181 A1 | 2/2015 | Adjaoute |
| 2015/0136602 A1 | 5/2015 | Jovanovich |
| 2015/0242760 A1 | 8/2015 | Miao |
| 2015/0288573 A1 | 10/2015 | Baughman |
| 2015/0331908 A1 | 11/2015 | Duffy |
| 2015/0356461 A1 | 12/2015 | Oriol |
| 2016/0048753 A1 | 2/2016 | Sussillo |
| 2016/0063359 A1 | 3/2016 | Szegedy |
| 2016/0232445 A1 | 8/2016 | Srinivasan |
| 2016/0242690 A1 | 8/2016 | Principe |
| 2016/0283563 A1 | 9/2016 | Hodjat |
| 2016/0307071 A1 | 10/2016 | Perronnin |
| 2016/0328253 A1 | 11/2016 | Majumdar |
| 2016/0329047 A1 | 11/2016 | Tur |
| 2016/0329407 A1 | 11/2016 | Takemura |
| 2016/0350671 A1 | 12/2016 | Morris, II et al. |
| 2016/0364522 A1 | 12/2016 | Frey |
| 2017/0001093 A1 | 1/2017 | Mollice |
| 2017/0060963 A1 | 3/2017 | Whittaker |
| 2017/0063908 A1 | 3/2017 | Muddu |
| 2017/0103172 A1 | 4/2017 | Fink |
| 2017/0109355 A1 | 4/2017 | Li |
| 2017/0116520 A1 | 4/2017 | Min |
| 2017/0132528 A1 | 5/2017 | Aslan |
| 2017/0148433 A1 | 5/2017 | Catanzaro |
| 2017/0192638 A1 | 7/2017 | Iscoe et al. |
| 2017/0193366 A1 | 7/2017 | Miikkulainen et al. |
| 2017/0193367 A1 | 7/2017 | Miikkulainen et al. |
| 2017/0193403 A1 | 7/2017 | Iscoe et al. |
| 2017/0213156 A1 | 7/2017 | Hammond |
| 2017/0256254 A1 | 9/2017 | Huang |
| 2017/0262737 A1 | 9/2017 | Rabinovich |
| 2017/0270225 A1 | 9/2017 | Chen et al. |
| 2017/0293849 A1 | 10/2017 | Hodjat et al. |
| 2017/0323219 A1 | 11/2017 | Shahrzad |
| 2017/0323636 A1 | 11/2017 | Xiao |
| 2018/0018590 A1 | 1/2018 | Szeto et al. |
| 2018/0053092 A1 | 2/2018 | Hajizadeh |
| 2018/0114115 A1 | 4/2018 | Liang |
| 2018/0114116 A1 | 4/2018 | Liang |
| 2018/0157972 A1 | 6/2018 | Hu |
| 2018/0240041 A1 | 8/2018 | Koch |
| 2018/0293498 A1 | 10/2018 | Campos |
| 2018/0357552 A1 | 12/2018 | Campos |
| 2018/0357566 A1 | 12/2018 | Liu |
| 2018/0365557 A1 | 12/2018 | Kobayashi |
| 2018/0365564 A1 | 12/2018 | Huang |
| 2019/0065954 A1 | 2/2019 | Bittner, Jr. |
| 2019/0147298 A1 | 5/2019 | Rabinovich |
| 2019/0244108 A1 | 8/2019 | Meyerson |
| 2019/0332678 A1 | 10/2019 | Ishida |
| 2020/0311556 A1 | 10/2020 | Francon |
| 2021/0004676 A1 | 1/2021 | Jaderberg |
| 2021/0050116 A1 | 2/2021 | Sabeti |
| 2021/0097443 A1 | 4/2021 | Li |
| 2021/0183515 A1 | 6/2021 | Neumann |
| 2021/0312297 A1 | 10/2021 | Francon |
| 2022/0027744 A1 | 1/2022 | Krishnan |

(56) References Cited

U.S. PATENT DOCUMENTS

| | | | |
|---|---|---|---|
| 2022/0027837 | A1 | 1/2022 | D'Attilio |
| 2022/0326923 | A1 | 10/2022 | Prashanth |

FOREIGN PATENT DOCUMENTS

| | | | |
|---|---|---|---|
| EP | | 2422278 | 2/2012 |
| JP | | H0810804 | 1/1996 |
| JP | | 08-110804 | 4/1996 |
| JP | | H09114797 | A | 5/1997 |
| JP | | 2001325041 | 11/2001 |
| JP | | 2003044665 | 2/2003 |
| JP | | 2004240671 | 8/2004 |
| JP | | 2004302741 | 10/2004 |
| JP | | 2005190372 | A | 7/2005 |
| JP | | 2007052247 | 3/2007 |
| JP | | 2007207173 | 8/2007 |
| JP | | 2007522547 | 8/2007 |
| JP | | 2008129984 | A | 6/2008 |
| WO | WO 2005/073854 | | 8/2005 |
| WO | | 2010120440 | A2 | 10/2010 |
| WO | WO 2010/127039 | | 11/2010 |
| WO | WO 2010/127042 | | 11/2010 |
| WO | | 2017161233 | 9/2017 |
| WO | | 2018211138 | 11/2018 |
| WO | | 2018213840 | 11/2018 |
| WO | | 2018223822 | A1 | 12/2018 |
| WO | | 2019081705 | 5/2019 |
| WO | WO 2019/217876 | | 11/2019 |

OTHER PUBLICATIONS

Grushka-Cohen, A framework for optimizing COVID-19 testing policy using a Multi Armed Bandit approach, pp. 1-9 , Jul. 2020.*
Lu, Evolutionary optimization with hierarchical surrogates, Swarm and Evolutionary Computation 47. pp. 21-32 (Year: 2019).*
Rowland, Model selection methodology in supervised learning with evolutionary computation, BioSystems 72, pp. 187-196. (Year: 2003).*
Utech, J., et al., "An evolutionary algorithm for drawing directed graphs," Proc. of the Int. Conf. on Imaging Science, Systems and Technology, 8 pages, 1998.
Valsalam, V.K., et al., "Using Symmetry and Evolutionary Search to Minimize Sorting Networks," Journal of Machine Learning Research 14, The University of Texas at Austin, Department of Computer Science, Copyright Sep. 2013, pp. 303-331.
Wissner-Gross, et al., "Causal Entropic Forces," Physical Review Letters, PRL 110.168702, American Physical Society, Apr. 19, 2013, 5 pages.
Xu, et al., "Inference of Genetic Regulatory Networks With Recurrent Neural Network Models Using Particle Swarm Optimization," Missouri University of Science and Technology, Oct. 2017, 36 pages, [retrieved on Feb. 14, 2019], Retrieved from the Internet: http://scholarsmine.mst.edu/cgi/viewcontent.cgi?article=1751&context=ele_comeng_facwork.
Yang et al., "Deep multi-task representation learning: A tensor factorisation approach," arXiv preprint arXiv: 1605.06391 (2016), 12 pages.
Yang Fan, et al., "Learning to Teach," ICLR 2018, arXiv: 1805.03643vl, May 9, 2018, 16 pp.
Yin et al., "ABCNN: Attention-Based Convolutional Neural Network for Modeling Sentence Pairs", Transactions of the Association for Computational Linguistics, (Dec. 16, 2015), vol. 4, pp. 259-272, XP081355040
Zhang, Loy, "Facial Landmark Detection by Deep Multi-Task Learning," In Proceedings of ECCV'14, 2014, 15 pages.
Yao & Islam, 2008, "Evolving Artificial Neural Network Ensembles" (Year: 2008).
Oehmcke et al., "Knowledge Sharing for Population Based Neural Network Training," Springer (2018) (Year: 2018).

Ma et al., A multi-population differential evolution with best-random mutation strategy for large-scale global optimization (Jan. 2020) (Year: 2020).
Extended EPO Search Report, App. No. 19878418.3-1203/3942483 PCT/US2019061198, May 27, 2022.
Elsken Thomas et al., Efficient Multi-Objective Neural Architecture Search via Lamarckian Evolution, ICLR 2019, Feb. 26, 2019 (URL: https://arxiv.org/pdf/1804.09081.pdf).
Lu Zhichao et al., NSGA-NET neural architecture search using multi-objective genetic algorithm, Proceedings of the Genetic and Evolutionary Computation Conference, ACMPUB27, NY, NY, Jul. 13, 2019.
International Search Report and Written Opinion issued in App. No. PCT/US2022/032656, mailing date Nov. 4, 2022, 9 pages.
Francon et al., "Effective Reinforcement Learning through Evolutionary Surrogate-Assisted Prescription", ACM, Jul. 12, 2020, retrieved on [Nov. 10, 2022]. Retrieved from the internet <URL: https://dl.acm.org/doi/pdf/10.1145/3377930.3389842>.
Miikkulainen et al., "From Prediction to Prescription: Evolutionary Optimization of Non-Pharmaceutical Interventions in the COVID-19 Pandemic", arxiv.org, Aug. 1, 2020, retrieved on [Nov. 10, 2022]. Retrieved from the internet <URL: https://arxiv.org/pdf/2005.13766.pdf>.
"CS 224D: Deep Learning for NLP, Lecture Notes: Part IV", 12 pp., Spring, 2015, 12 pages.
"CS 224D: Deep Learning for NLP, Lecture Notes: Part V", 6 pp., Spring, 2015, 6 pages.
"Revisiting Knowledge Distillation: A Teacher-Free Framework," ICLR 2020, 15 pp.
"CS 224D: Deep Learning for NLP, Lecture Notes: Part III". 14 pp., Spring, 2016.
Jun. 22, 2011 Office Action in U.S. Appl. No. 12/267,287, 16 pp.
Aug. 1, 2012 Office Action in U.S. Appl. No. 13/443,546, 12 pp.
Ajad Abbasi, et al., "Modeling Teacher-Student Techniques in Deep Neural Networks for Knowledge Distillation," Computer Science, 2020 International Conference on Machine Vision and Image Processing (MVTP), 2020, 6 pp.
Al-Haj Baddar, "Finding Better Sorting Networks," Dissertation to Kent State University for PhD, May 2009, 86 pages.
Alex Castrounis, Innoarchtech, "Production vs. Development AI and Machine Learning," published by O'Reilly Media, Copyright InnoArchiTech LLC 2020, 24 pages.
Alex Castrounis, Innoarchtech, "Advanced Analytics Packages, Frameworks, and Platforms," 29 pages, published by O'Reilly Media, Copyright InnoArchiTech LLC 2020.
Alex Castrounis, Innoarchtech, "Python vs. R for AI, Machine Learning, and Data Science," published by O'Reilly Media, Copyright InnoArchiTech LLC 2020, 27 pages.
Anooj, "Clinical decision support system: Risk level prediction of heart disease using weighted fuzzy rules", 2012 (Year: 2012). 14 pages.
Ares "A soft computing framework for classifying time series based on fuzzy sets of events", 2015 (Year: 2015). 20 pages.
Atin Sood, et al., "NEUNETS: An Automated Synthesis Engine For Neural Network Design," arXiv: 1901.06261vl, Jan. 17, 2019, 14 pp.
AU 2010241594—Examination Report dated Oct. 8, 2013, 3 pages.
AU 2010241597—Examination Report dated Nov. 4, 2013, 4 pages.
Barret Zoph, et al., "Neural Architecture Search With Reinforcement Learning," arXiv: 1611.01578v2, Feb. 15, 2017, 16 pp.
Berg "Fuzzy Classification Using Probability-Based Rule Weighting", IEEE, 2002 (Year: 2002). 6 pages.
Bilen et al. "Integrated Perception with Recurrent Multi-Task Neural Networks", NIPS, 2016, pp. 9.
Bilen, et al., "Integrated perception with Reccurrent Multi-Task Neural Networks,"NIPS 2016 ,9 pp.
Bredeche et al., "On-Line , On-Board Evolution of Robot Controllers", Artifical Evolution: 9th International Conference, Evolution Artificielle , EA, Strasbourg, France, vol. 5975, (20090000), pp. 110-121, URL: https://dl.acm.org/citation.cfm?id=1883723.1883738, (Mar. 15, 2019), XP019146179.

(56) References Cited

OTHER PUBLICATIONS

Bredeche, Nicolas, et al., "On-line, on-board evolution of robot controllers," International Conference on Artificial Evolution, Springer, Berlin, Heidelberg, 13 pages, 2009.

Canadian Examination Report issued in App. No. CA3129731, dated Oct. 24, 2022, 4 pages.

Caruana, R. Multitask learning. In Learning to learn, pp. 95-133. Springer US, 1998, (Year: 1998).

Chenglin Yang, et al., "Snapshot Distillation: Teacher-Student Optimization in One Generation," arXiv: 1812.00123vl, Dec. 1, 2018, 10 pp.

Cruz-Ramirez et al, 2011, "Selecting the Best Artificial Neural Network Model from a Multi-Objective Differential Evolution Pareto Front" (Year: 2011).

Cruz-Ramirez, 2010, "Memetic pareto differential evolutionary artificial neural networks to determine growth multi-classes in predictive microbiology" (Year: 2010).

Cui et al, Oct. 2018, "Evolutionary Stochastic Gradient Descent for Optimization of Deep Neural Networks" (Year: 2018).

Davarynejad, "Fuzzy Fitness Granulation in Evolutionary Algorithms for complex optimization," Master of Science Thesis, Ferdowsi Univ. of Mashhad, Jun. 2007, 30 pages.

Deb, et al., "A fast and elitist multiobjective genetic algorithm: NSGA-II," IEEE Transactions on Evolutionary Computation, 6(2), 2002, pp. 182-197.

Derrick Mwiti, "Research Guide: Model Distillation Techniques For Deep Learning" [online], Nov. 20, 2019 [retrieved on Oct. 5, 2020], 17 pp., Retrieved From the Internet: https://heartbeat.fritz.ai/research-guide-model-distillation-techniques-for-deep-learmng-4al00801c0eb.

Devin, Coline, et al., "Learning Modular Neural Network Policies For Multi-Task and Multi-Robot Transfer," arXiv: 1609.07088vl, Sep. 22, 2016, 8 pp.

Di Gao, et al., "Private Knowledge Transfer via Model Distillation with Generative Adversarial Networks," arXiv: 2004.0463lvl, Apr. 5, 2020, 8 pp.

Dong, "Multi-Task Learning for Multiple Language Translation," In Proc. of ACL, pp. 1723-1732, 2015.

E. Meyerson and R. Miikkulainen, "Beyond Shared Hierarchies: Deep Multitask Learning Through Soft Layer Ordering," ICLR, 14 pages, 2018.

Esparcia-Alcazar et al. "Evolving Recurrent Neural Network Architectures by Genetic Programming", 1997, pp. 6, https://citeseerx.ist.psu.edu/viewdoc/download?doi=10.1.1.40.226&rep=rep1&type=pdf.

Fernando et al., "Pathnet: Evolution channels gradient descent in super neural networks," arXiv preprint arXiv:1701.08734 (2017), 16 pages.

Freitas, A. "A review of evolutionary algorithms for data mining." Soft Computing for Knowledge Discovery and Data Mining. Springer US, 2008. 79-111.

Galea, "Iterative vs Simultaneous Fuzzy Rule Induction", IEEE, 2005 (Year: 2005). 6 pages.

Garcia-Pedrajas et al., "COVNET: A Cooperative Coevolutionary Model for Evolving Artificial Neural Networks", IEEE Transactions on Neural Networks, vol. 14, No. 3, (2003). (Year: 2003) 22 pages.

Garcia-Pedrajas, et al., "Cooperative Coevolution of Artificial Neural Network Ensembles For Pattern Classification," IEEE Transactions on Evolutionary Computation, vol. 9, No. 3, 32 pages,Jun. 3, 2005.

Garcia-Pedrajas, et. al., "Cooperative-Coevolution-of-Artificial-Neural-Networks", 2005, 32 pages.

Garciarena et al., Jul. 2018, "Evolved GANs for generating Pareto set approximations" (Year: 2018).

Gaurav Kumar Nayak, et al., "Zero-Shot Knowledge Distillation in Deep Networks," arXiv: 1905.08114vl, May 20, 2019, 17 pp.

Gomes et al., "Devising Effective Novelty Search Algorithms: A Comprehensive Empirical Study," Madrid, Spain, Copyright Jul. 11-15, 2015, ACM, 8 pages.

Gomes et al., "Evolution of Swarm Robotics Systems with Novelty Search," published in Swarm Intelligence, vol. 7, Issue 2, ANTS Special Issue, Copyright Sep. 2013, pp. 115-144.

Gomes et al., "Progressive Minimal Criteria Novelty Search," Lisboa, Portugal, in Advances in Artificial Intelligence, Springer-Verlag Berlin Heidelberg, Copyright 2012, pp. 281-290.

Gonzalez, et al., "Evolving Loss Functions With Multivariate Taylor Polynomial Parameterization," Version 2, published arXiv: 2002.00059v2), Feb. 10, 2020, 8 pages.

Gonzalez, et al., "Evolving Loss Functions With Multivariate Taylor Polynomial Parameterizations," Version 1, published arXiv: 2002.00059v1, Jan. 31, 2020. 12 pages.

Gonzalez, et al., "Optimizing Loss Functions Through Multivariate Taylor Polynomial Parameterization," Version 3 (published arXiv:2002.00059v3), Jun. 6, 2020, 13 pages.

Robinet et al ("Inducing High-Level Behaviors from Problem-Solving Traces Using Machine-Learning Tools" 2007) (Year: 2007).

Gopalakrishnan, G. et al., "Optimal Sampling in a Noisy Genetic Algorithm for Risk-Based Remediation Design," Bridging the gap: meeting the world's water and environmental resources challenges, Proc. World Water Congress 2001, 8 pp.

Gupta et al., "An Overview of methods maintaining Diversity in Generic Algorithms," International Journal of Emerging Technology and Advanced Engineering, vol. 2, Issue 5, New Delhi, India, May 2012, pp. 56-60.

H. Li, et al., "Visualizing the loss landscape of neural nets," Advances in Neural Information Processing Systems 31, pp. 6389-6399 (Curran Associates, Inc., 2018), arXiv:1712.09913v3, Nov. 7, 2018.

Haitong Li, "Exploring Knowledge Distillation of Deep Neural Networks for Efficient Hardware Solutions," CS 230 Final Report, Department of Electrical Engineering, Stanford, CA, 6 pp., 2018.

Hansen, et al., "Completely derandomized self-adaptation in evolution strategies," Evolutionary Computation, vol. 9, No. 2, pp. 159-195, 2001.

Hanting Chen, et al., "Data-Free Learning of Student Networks," arXiv: 1904.01186v4, Dec. 31, 2019, 9 pp.

Hodjat et al., "Maintenance of a Long Running Distributed Genetic Programming System for Solving Problems Requiring Big Data",In: Riolo et al., Genetic Programming Theory and Practice XI, Mar. 10, 2014, Genetic and Evolutionary Computation, pp. 65-83 (Year: 2014).

Hodjat et al., "nPool: Massively Distributed Simultaneous Evolution and Cross-Validation in EC-Star", ppt at GPTP May 2015, 16 pages.

Hornby, "ALPS: The Age-Layered Population Structure for Reducing the Problem of Premature Convergence," GECCO '06, Seattle, WA, Jul. 2006, 8 pp.

Ilya Loshchilov, "Surrogate-Assisted Evolutionary Algorithms," https://tel.archives-ouvertes.fr/tel-00823881/document, 2013. 264 pages.

International Preliminary Report on Patentability for PCT App. PCT/US2019/061198,dated Nov. 18, 2020, 24 pp.

International Search Report and Written Opinion for Application No. PCT/US2018/064520, dated March 4. 2019. 8 pages.

International Search Report and Written Opinion for PCT App. No. PCT/US19/61198, dated Mar. 11, 2020, 15 pp.

International Search Report and Written Opinion for PCT Application No. PCT/US18/64428, dated Mar. 26, 2019, 12 pp.

International Search Report and Written Opinion for PCT Application No. PCT/US18/65472, dated Mar. 27, 2019, 8 pp.

International Search Report and Written Opinion for PCT Application No. PCT/US18/66610, dated Apr. 15, 2019, 8 pp.

International Search Report and Written Opinion for PCT Application No. PCT/US2019/017175, dated Jun. 5, 2019, 10 pp.

International Search Report mailed Jun. 29, 2010 in PCT/US 10/32841, 3 pages.

Ishibuchi, "Three-objective genetics-based machine learning for linguistic rule extraction", IEEE, 2005 (Year: 2005). 25 pages.

J.T. Barron, "A General and Adaptive Robust Loss Function," arXiv: 1701.03077, 2018, 19 pages.

(56) References Cited

OTHER PUBLICATIONS

Jaemin Yoo, et al., "Knowledge Extraction With No Observable Data," 33rd Conference on Neural Information Processing Systems (NeurIPS 2019), Vancouver, Canada, 2019, 10 pp.

Jaimes & Coello, 2005, "MRMOGA: Parallel Evolutionary Multiobjective Optimization using Multiple Resolutions" (Year: 2005).

James Bradbury, et al., "Quasi-Recurrent Neural Networks," arXiv:1611. 01576v2, Nov. 21, 2016, 11 pp.; Retrieved from the Internet: https//arxiv.org/pdf/1611.01576.pdf?fbclid=1wAR3hreOvBGmJZe54-631X49XedcbsQoDYIRu87BcCHEBf_vMKF8FDKK_7Nw.

Jason Liang, et al., "Evolutionary Neural AutoML for Deep Learning," GECCO '19, Jul. 13-17, 2019, Prague, Czech Republic (https://arxiv.org/pdf/1902.06827.pdf).

Jee-weon Jung, et al, "Distilling the Knowledge of Specialist Deep Neural Networks in Acoustic Scene Classification," Detection and Classification of Acoustic Scenes and Events 2019, New York, New York, Oct. 25-26, 2019, 5 pp.

Ji Wang, et al., "Private Model Compression via Knowledge Distillation," arXiv: 1811.05072vl, Nov. 13, 2018, 9 pp.

Jin & Sendhoff, 2008, "Pareto-Based Multiobjective Machine Learning: An Overview and Case Studies" (Year: 2008).

JP 2010-533295—Office Action, dated Apr. 16, 2013, 3 pp. (English translation). 3 pages.

JP 2012-508660—Office Action dated Apr. 1, 2014, 8 pages.

JP 2012-508663—Office Action dated Apr. 1, 2014, 6 pages.

Jul. 27, 2012 Final Office Action in U.S. Appl. No. 12/267,287, 14 pp.

Julian G. Zilly, Rupesh Kumar Srivastava, Jan ICoutnik, and Jurgen Schniidhuber, "Recurrent Hiehwav Networks." CoRR abs/1607. 03474. 2016 (Arxiv: 1607.03474} 13 pages.

Jun. 16, 2011 Written Opinion from Singapore Patent Office in related application SG 201003127-68 pp.

Jun. 16, 2011 Written Opinion from Singapore Patent Office in related application SG 201093127-6, 9 pp.

K. Janocha and W. M. Czarnecki, "On Loss Functions for Deep Neural Networks in Classification," arXiv: 1702.05659, 10 pages, 2017.

Kang, Zhuoliang, et al., "Learning With Whom to Share in Multi-Task Feature Learning," Proceedings of the 28th International Conference on Machine Learning, Bellevue, WA, USA, 2011, 8 pp.

Kenneth O. Stanley and Risto Miikkulainen, "Evolving Neural Networks Through Augmenting Topologies," Evolutionary Computation, 10(2):99-127, 2002.

Kipfer et al., "UberFlow: A GPU-Based Particle Engine," Computer Graphics and Visualization, The Eurographics Association, Copyright 2004, 9 pages.

Krcah, P., et al., "Combination of Novelty Search and Fitness-Based Search Applied to Robot Body-Brain Co-Evolution," Charles University, Prague Czech Republic, in Proceedings of the 13th Czech-Japan Seminar on Data Analysis and Decision Making in Service Science, 2010, 6 pages.

Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pp.

Kwedlo, "Learning Decision Rules Using a Distributed Evolutionary Algorithm", 2002 (Year: 2002). 10 pages.

Lahsasna, "Design of a Fuzzy-based Decision Support System for Coronary Heart Disease Diagnosis", (Year: 2012). 14 pages.

Lee, Chi-Ho, et al., "Evolutionary ordered neural network with a linked-list encoding scheme," Proceedings of IEEE International Conference on Evolutionary Computation, IEEE, 5 pages, 1996.

Lehman et al., "Evolving a Diversity of Creatures through Novelty Search and Local Competition," Proceedings of the Genetic and Evolutionary Computation Conference, ACM, New York, NY, 2011, 8 pages.

Lehman et al., "Abandoning Objectives: Evolution through the Search for Novelty Alone," Evolutionary Computation journal, MIT Press, Copyright 2011, pp. 189-223.

Lehman et al., "Efficiently Evolving Programs through the Search for Novelty," Proceedings of the Genetic and Evolutionary Computation Conference, ACM, New York NY, Copyright 2010, 8 pages.

Lehman et al., "Extinction Events Can Accelerate Evolution," PLoS One, journal.pone.0132886, Aug. 12, 2015, 16 pages.

Lehman et al., "Overcoming Deception in Evolution of Cognitive Behaviors," University of Texas at Austin, ACM, Jul. 12-16, 2014, 8 pages.

Lehman et al., "Revising the Evolutionary Computation Abstraction: Minimal Criteria Novelty Search," Proceedings of the Genetic and Evolutionary Computation Conference, ACM, Copyright 2010, 8 pages.

Lehman, Joel, et al., "Exploiting Open-Endedness to Solve Problems Through the Search for Novelty," ALIFE, 8 pages, 2008.

Pan et al ("A Classification-Based Surrogate-Assisted Evolutionary Algorithm for Expensive Many-objective Optimization" Feb. 2019) (Year: 2019).

Yousefi, N., Georgiopoulos, M. and Anagnostopoulos, G.C., 2015. Multi-task learning with group-specific feature space sharing. In Machine Learning and Knowledge Discovery in Databases: European Conference, ECML PKDD 2015, Porto, Portugal, Sep. 7-11, 2015, Proceedings, Part II 15 (pp. 120-136). Springer International Publishing.

CS412 KL-divergence, computer science, Illinois university. 2017 (Year: 2017).

U.S. Appl. No. 14/595,991—Final Office Action dated Feb. 27, 2018, 25 pages.

U.S. Appl. No. 14/595,991—Response to Final Office Action dated Feb. 27, 2018, filed May 22, 2018, 32 pages.

U.S. Appl. No. 14/595,991—Response to Final Office Action dated Feb. 27, 2018, filed Jul. 27, 2018, 41 pages.

U.S. Appl. No. 13/184,307—Response dated Jan. 22, 2014, 19 pages.

U.S. Appl. No. 13/184,307—Response dated Jun. 23, 2014, 32 pages.

U.S. Appl. No. 13/358,381—Response dated Oct. 3, 2014, 21 pages.

U.S. Appl. No. 13/358,381—Amendment After Allowance filed Feb. 13, 2015, 20 pages.

U.S. Appl. No. 13/540,507—Response filed Oct. 15, 2014, 20 pages.

U.S. Appl. No. 13/895,238—Office Action dated Jan. 2, 2014, 17 pages.

U.S. Appl. No. 13/943,630—Amendment After Allowance dated Mar. 15, 2016, 16 pages.

U.S. Appl. No. 13/943,630—Notice of Allowance dated Jan. 21, 2016, 28 pages.

U.S. Appl. No. 13/943,630—Notice of Allowance dated May 19, 2016, 2 pages.

U.S. Appl. No. 13/943,630—Office Action dated May 27, 2015, 42 pages.

U.S. Appl. No. 13/943,630—Response to Office Action dated May 27, 2015 filed Sep. 23, 2015, 8 pages.

U.S. Appl. No. 13/945,630—Amendmend After Allowance dated Dec. 9, 2015, 7 pages.

U.S. Appl. No. 13/945,630—Final Office Action dated Aug. 4, 2015, 22 pages.

U.S. Appl. No. 13/945,630—Notice of Allowance dated Nov. 18, 2015, 8 pages.

U.S. Appl. No. 13/945,630—Office Action dated Mar. 12, 2015, 18 pages.

U.S. Appl. No. 13/945,630—Resonse to Office Action dated Mar. 12, 2015 filed Jul. 13, 2015, 9 pages.

U.S. Appl. No. 13/945,630—Response filed Nov. 4, 2015, 12 pp.

U.S. Appl. No. 14/014,063—Office Action dated May 7, 2014, 19 pages.

U.S. Appl. No. 14/539,908—Notice of Allowance dated Mar. 17, 2016, 15 pages.

U.S. Appl. No. 14/539,908—Office Action dated Oct. 1, 2015, 33 pages.

U.S. Appl. No. 14/539,908—Response filed Feb. 1, 2016, 18 pp.

U.S. Appl. No. 14/595,991—Office Action, dated Feb. 27, 2018, 19 pp.

(56)                    References Cited

OTHER PUBLICATIONS

U.S. Appl. No. 14/595,991—Response to Office Action dated May 10, 2017, filed Nov. 10, 2017, 29 pages.
U.S. Appl. No. 15/794,905, titled Evolution of Deep Neural Network Structures, 46 pages, filed Oct. 26, 2017.
U.S. Appl. No. 15/794,913 titled "Cooperative Evolution of Deep Neural Network Structures," filed Oct. 26, 2017.
U.S. Appl. No. 15/915,028, titled "Asynchronous Evaluation Strategy For Evolution of Deep Neural Networks," filed Mar. 3, 2018.
U.S. Appl. No. 62/468,224, titled "Asynchronous Evaluation Strategy For Evolution of Deep Neural Networks," filed Mar. 7, 2017.
U.S. Appl. No. 62/598,409, titled "Evolving Multitask Neural Network Structure," filed Dec. 13, 2017.
U.S. Appl. No. 62/627,161, titled "From Nodes to Networks: Evolving Recurrent Neural Networks," filed Feb. 6, 2018.
U.S. Appl. No. 62/627,658, titled "From Nodes to Networks: Evolving Recurrent Neural Networks," filed Feb. 7, 2018.
Unpublished Article, Modular Universal Reparameterization: Deep Multi-Task Learning Across Diverse Domains, 10 pp.
U.S. Appl. No. 13/184,307—Office Action dated Mar. 21, 2014, 38 pages.
U.S. Appl. No. 13/358,381—Office Action dated Jul. 8, 2014, 30 pages.
U.S. Appl. No. 13/540,507—Office Action dated Sep. 9, 2014, 25 pages.
U.S. Appl. No. 13/945,630—Response to Final Office Action dated Aug. 4, 2015 filed Nov. 4, 2015, 12 pages.
U.S. Appl. No. 14/539,908—Response to Office Action dated Oct. 1, 2015 filed Feb. 1, 2016, 18 pages.
U.S. Appl. No. 14/595,991—Office Action dated May 10, 2017, 32 pages.
U.S. Appl. No. 15/794,905—Non Provisional Application filed Oct. 26, 2017, 60 pages.
U.S. Appl. No. 15/794,913—Non-Provisional Application filed Oct. 28, 2017, 73 pages.
Liang, et al, "Population-Based Training for Loss Function Optimization," 10 pages, arXiv:2002.04225vl (Feb. 11, 2020).
Lin Wang, et al., "Knowledge Distillation and Student-Teacher Learning for Visual Intelligence: A Review and New Outlooks," Journal of Latex Class Files, vol. 14, No. 8, Apr. 2020, 38 pp., arXiv: 2004/05937v3, May 4, 2020.
Lopez Haimes et al., "MRMOGA: parallel evolutionary multi-objective optimization using multiple resolutions," In: Proceedings of IEEE Congress on Evolutionary Computation, 2294-2301, 2005.
Meyerson, Elliot, "Discovering Multi-Purpose Modules Through Deep Multitask Learning," Dissertation Presented to the Faculty of the Graduate School of The University of Texas at Austin, Dec. 2018, 275 pp.
Miikkulainen et al., Mar. 3, 2017, "Evolving Deep Neural Networks" (Year: 2017).
Miikkulainen et al., Ascend by Evolv: AI-Based Massively Multi-variate Conversion Rate Optimization, AI Magazine (2020). 16 pages.
Miikkulainen, Risto, et al., "Evolving Deep Neural Networks," Mar. 4, 2017, 8 pp.
Minsoo Kang, et al., "Towards Oracle Knowledge Distillation With Neural Architecture Search," arXiv: 1911.13019vl, Nov. 29, 2019, 9 pp.
Misra et al., "Cross-stitch networks for multi-task learning," In Proceedings of the IEEE Conference on Computer Vision and Pattern Recognition, pp. 3994-4003. 2016.
Moriarty etal., "Hierarchical Evolution of Neural Networks", IEEE (1998). (Year: 1998) 6 pages.
Moriarty, David E., et al., "Forming neural networks through efficient and adaptive coevolution," Evolutionary Computation 5.4, 28 pages, 1997.
N. Hansen, et al, "Adapting arbitrary normal mutation distributions in evolution strategies: The covariance matrix adaptation," In Proceedings of IEEE International Conference on Evolutionary Computation, pp. 312-317, IEEE, 1996.

N. Hansen, et al., "Evaluating the CMA evolution strategy on multimodal test functions," International Conference on Parallel Problem Solving from Nature, Springer, pp. 282-291, 2004.
Notice of Allowance for U.S. Appl. No. 13/358,381, dated Nov. 19, 2014, 5 pp.
Notice of Allowance for U.S. Appl. No. 13/540,507, dated Oct. 31, 2014, 9 pp.
O'Reilly et al., "EC-Star: A Massive-Scale, Hub and Spoke, Distributed Genetic Programming System", In: Riolo etal, Genetic Programming Theory and Practice X, Apr. 19, 2013, Genetic and Evolutionary Computation, pp. 73-85 (Year: 2013).
Pantridge et al., Evolution of Layer Based Neural Networks: Preliminary Report, GECCO '16, pp. 1015-1022, Jul. 2016. (Year: 2016).
Paul Micaelli, et al., "Zero-Shot Knowledge Transfer via Adversarial Belief Matching," 33rd Conference on Neural Information Processing Systems, (NEURIPS 2019), Vancouver, CA, arXiv: 1905. 09768v4, Nov. 25, 2019, 13 pp.
Pouya Bashivan, et al., "Teacher Guided Architecture Search," arXiv: 1808.01405v3, Sep. 6, 2019, 15pp.
R. Miikkulainen, J. Liang, E. Meyerson, et al., 2017, "Evolving Deep Neural Networks," CoRR, abs/1703.00548, Mar. 2017. 73 pages.
R. Poli, W. B. Langdon, N. F. Mcphee, J. R. Koza, "Genetic programming: An introductory tutorial and a survey of techniques and applications", University of Essex, School of Computer Science and Electronic Engineering, Technical Report, (Oct. 2007), No. CES-475, ISSN 1744-8050, XP055038163.
Raphael Gontijo Lopes, et al., "Data-Free Knowledge Distillation for Deep Neural Networks," arXiv: 1710.07535v2, Nov. 23, 2017, 8 pp.
Rennie, Annealed dropout training of deep networks, 2014 IEEE Spoken Language Technology Workshop (SLT) 2014 (Year: 2014) 6 pages.
Risto Miikkulaiiien, "Evolving Multitask Neural Network Structure," The University of Texas at Austin and Sentient Technologies. Inc . Aug. 26. 2013, 22 pages.
Rosenbaum, et al., "Routing Networks: Adaptive Selection of Non-Linear Functions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2. 16 pages.
Ruder, "An Overview of Multi-Task Learning in Deep Neural Networks," In: Cornell University Library /Computer Science/ Machine Learning, Jun. 15, 2017 [online] [retrieved on Mar. 15, 2019], Retrieved from the Internet: https://arxrv.org/abs/1706. 05098, 14 pages.
Salge, C., et al, "Empowerment—An Introduction," published in Guided Self-Organization: Inception, Chap 4, University of Hertfordshire, Copyright 2014, pp. 67-114.
Sanchez, "Advocating the Use of Imprecisely Observed Data in Genetic Fuzzy Systems", IEEE, 2007 (Year: 2007). 12 pages.
Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019. 10 pages.
Santiago Gonzalez, et al., "Improved Training Speed, Accuracy, and Data Utilization Through Loss Function Optimization," Version 2, arXiv: 1905.11528v2, dated Feb. 10, 2020. 7 pages.
Santiago Gonzalez, et al., "Improved Training Speed, Accuracy, and Data Utilization Through Loss Function Optimization," Version 3, arXiv: 1905.11528v3, dated Apr. 27, 2020. 7 pages.
Scott, E. O., et al., "Understanding Simple Asynchronous Evolutionary Algorithms," Jan. 17-20, 2015, 15 pp.
Secretan, J., et al., "Picbreeder: A Case Study in Collaborative Evolutionary Exploration of Design Space," Evolutionary Computation journal, MIT Press, Copyright 2011, 30 pages.
Shahrzad, et al., "Tackling the Boolean Multiplexer Function Using a Highly Distributed Genetic Programming System," in Genetic Programming Theory and Practice XII, 7 pp. , 2015.

(56)　　　　References Cited

OTHER PUBLICATIONS

Shazeer et al., "Outrageously large neural networks: The sparsely-gated mixiure-of-experts layer," arXiv preprint arXiv:1701.08538 (2017), 19 pages.
Shi, 2008, "An Empirical Comparison of Evolution and Coevolution for Designing Artificial Neural Network Game Players" (Year: 2008).
Snoek, et al., "Scalable Bayesian Optimization Using Deep Neural Networks", 2015, 13 pages.
Stanley et al. "Evolving neural networks through augmenting topologies." Evolutionary computation 10.2, 29 pages (2002) (Year: 2002).
Stanley et al., Why greatness cannot be planned: the myth of the objective, Genet. Program Evolvable Mach.,m 16:559-561, 2015.
Stanley, 2002, "Evolving Neural Networks Through Augmenting Topologies" (Year: 2002).
Stanley, et al., "Why Greatness Cannot Be Planned: The Myth of the Objective," New York, NY, Springer (2015). 2 pages.
Stanley, Kenneth O., et al., "Real-Time Evolution of Neural Networks in the Nero Video Game," AAAI, vol. 6, 2006, 4 pp.
Storsveen et al., 2008, "Evolving a 2D Model of an Eye using CPPNs" (Year: 2008).
Supplementary European Search Report dated Oct. 12, 2012 in EP 10770288, 12 pages.
Supplementary European Search Report dated Oct. 9, 2012 in EP 107702871, 11 pages.
Timothy Hospedales, et al., "Meta-Learning in Neural Networks: A Survey," arXiv: 2004.05439vl, Apr. 11, 2020, 23 pp.
Torresen, "A Dynamic Fitness Function Applied to Improve the Generalisation when Evolving a Signal Processing Hardware Architecture," Proc. EvoWorkshops 2002, 267-299 (12 pp).
U.S. Appl. No. 13/184,307—Notice of Allowance dated Aug. 4, 2014, 9 pages.
U.S. Appl. No. 13/184,307—Office Action dated Oct. 21, 2013, 16 pages.
Deychakiwsky Normalized Cross-Entropy—Deylemma, github.i io 2020 (Year: 2020).
Pan, L. et al., "A Classification-Based Surrogate-Assisted Evolutionary Algorithm for Expensive Many-objective Optimization", IEEE, https://ieeexplore.ieee.org/document/8281523, Feb. 1, 2019.
Robinet, V. et al., "Inducing High-Level Behaviors from Problem-Solving Traces Using Machine-Learning Tools", IEEE, https://ieeexplore.ieee.org/document/4287270, Aug. 13, 2007.
Canadian Examination Report issued in App. No. CA 3,131,688, dated Sep. 12, 2023, 4 pages.
Alejandro Barredo Arrietz, et al., "Explainable Artificial Intelligence (XAI): Concepts, Taxonomies, Opportunities and Challenges Toward Responsible AI," http://arxiv.org/pdf/1910.10045.pdf, 2019.
European Parliamentary Research Service, "Understanding Algorithmic Decision-Making: Opportunities and Challenges," https://www.europarl.europa.eu/RegData/etudes/STUD/2019/624261/EPRS_STU(2019)624261_EN.pdf, 2019.
Blen M. Keneni, "Evolving Rule Based Explainable Artificial Intelligence for Decision Support System of Unmanned Aerial Vehicles," Evolving_Rule_Based_Explainable_Artificial_Intelli.pdf, 2018.
Riccardo Guidotti, et al., "A Survey of Methods for Explaining Black Box Models," https://dl.acm.org/doi/fullHtml/10.1145/3236009, 2018.
Ilya Loshchilov, "Surrogate-Assisted Evolutionary Algorithms," https://tel.archives-ouvertes.fr/tel-00823881/document, 2013.
Alan Diaz-Manriquez, et al., "A Review of Surrogate Assisted Multiobjective Evolutionary Algorithms," http://downloads.hindawi.com/journals/cin/2016/9420460.pdf, 2016.
Erwan Le Merrer, et al., "The Bouncer Problem: Challenges to Remote Explainability," https://arxiv.org/pdf/1910.01432.pdf, 2020.
Alain Chabrier, IBM, "Explaining Decision Optimization Prescriptions," https://medium.com/ibm-watson/explaining-decision-optimiza ion-prescriptions-7103abbc44eS, 2019.
Zhiwei Zeng, et al., "Context-Based and Explainable Decision Making With Argumentation," http://ifaamas.org/Proceedings/aamas2018/opdfs/p1114.pdf, 2018.
Jakob Bossek, et al., "One-Shot Decision-Making With and Without Surrogates," https://arxiv.org/pdf/1912.08956v1.pdf, 2019.
Cynthia Rudin, "Stop Explaining Black Box Machine Learning Models for High Stakes Decision and Use Interpretable Models Instead," https://www.nature.com/articles/s42256-019-0048-x, 2019.
Maribel Lopez, "Preparing for AI Ethics and Explainability in 2020," https://www.forbes.com/sites/maribellopez/2020/01/21/preparing-for-ai-ethics-and-explainability-in-2020/#15b37b022f6e, 2020.
Goodman, et al., "European Union (EU) regulations on algorithmic decision-making and a 'right to explanation,'" arXiv: 1606.08813v3, Aug. 2016.
Qiu, X. et al., "Quantifying Point-Prediction Uncertainty in Neural Networks via Residual Estimation with an I/O Kernel," In Proceedings of the Eighth International Conference on Learning Representations (ICLR) (2020).
Hodjat, B. et al., "PRETSL: Distributed Probabilistic Rule Evolution for Time-Series Classification," In Genetic Programming Theory and Practice XIV. Springer, 139-148 (2018).
Meyerson, E. et al., "Discovering evolutionary stepping stones through behavior domination," In Proceedings of the Genetic and Evolutionary Computation Conference (GECCO 2017).
Miikkulainen, R. et al., Sentient ascend: AI-based massively multivariate conversion rate optimization, In Proceedings of the Thirtieth Innovative Applications of Artificial Intelligence Conference, AAAI (2018).
Miikkulainen et al., Ascend by Evolv: AI-Based Massively Multivariate Conversion Rate Optimization, AI Magazine (2019).
Johnson et al., "Flavor-Cyber-Agriculture: Optimization of plant metabolites in an open-source control environment through surrogate modeling," PLoS One (2019), https://doi.org/10.1371/journal.pone.0213918.
Stanley, K. et al., "Designing neural networks through neuroevolution," Nature Machine Intelligence, vol. 1, p. 24-35 (Jan. 2019).
Risto Miikkulainen, "Creative AI Through Evolutionary Computation," arXiv: 1901.03775v2, Feb. 22, 2020.
Diesenroth, M. and Rasmussen, C. E., "PILCO: A model-based and data-efficient approach to policy search," In Proceedings of the $28^{th}$ International Conference on Machine Learning (ICML) (ICML '11), pp. 465-472, 2011.
Ha, D. and Schmidhuber, Jr., "Recurrent World Models Facilitate Policy Evolution," In Advances in Neural Information Processing Systems 32 (NIPS '18), Curran Associates, Inc., Red Hook, NY, USA, pp. 2455-2467, 2018.
Wahlström, N., Schön, T. B., and Deisenroth, M. P., "From pixels to torques: Policy learning with deep dynamical models," ar Xiv preprint arXiv: 1502.02251, 2015.
Mnih, V., Kavukcuoglu, K., Silver, D., Rusu, A. A., Veness, J., Bellemare, M. G., Graves, A., Riedmiller, M., Fidjeland, A. K., Ostrovski, G., and others, "Human-level control through deep reinforcement learning," Nature 518, 7540, pp. 529-533, 2015.
Hasselt, H. V., "Double Q-learning," In Advances in Neural Information Processing Systems 23, J. D. Lafferty, C. K. I. Williams, J. Shawe-Taylor, R. S. Zemel, and A. Culotta (Eds.), Curran Associates, Inc., pp. 2613-2621, 2010.
Wang, Z., Schaul, T., Hessel, M., Van Hasselt, H., Lanctot, M., and De Freitas, "Dueling Network Architectures for Deep Reinforcement Learning," In Proceedings of the $33^{rd}$ International Conference on Machine Learning (ICML) (ICML '16), vol. 48, JMLR org., 1995-2003.
Mnih, V., Badia, A. P., Mirza, M., Graves, A., Lillicrap, T., Harley, T., Silver, D., and Kavukcuoglu, "Asynchronous methods for deep reinforcement learning," (ICML) (ICML '16), pp. 1928-1937, 2016.
Schulman, J., Wolski, F., Dhariwal, P., Radford, A., and Klimov, O., "Proximal Policy Optimization Algorithms," CoRR abs/1707.06347, 2017.
Houthooft, R., Chen, Y., Isola, P., Stadie, B., Wolski, F., Ho, O. J., and Abbeel, P., "Evolved policy gradients," In Advances in Neural Information Processing Systems 31, Curran Associates, Inc., pp. 5400-5409, 2018.

(56)            References Cited

OTHER PUBLICATIONS

Khadka, et al., "Evolution-Guided Policy Gradient in Reinforcement Learning," 32nd Conference on Neural Information Processing Systems, 2018.

Pourchot, et al., "CEM-RL: Combining Evolutionary and Gradient-Based Methods for Policy Search," ICLR, 2019.

Application as filed for U.S. Appl. No. 16/424,686, filed May 29, 2019.

Application as filed for U.S. Appl. No. 16/502,439, filed Jul. 3, 2019.

Application as filed for U.S. Appl. No. 16/879,934, filed May 21, 2020.

Hodjat, et al., "Chapter 5: Introducing an Age-Varying Fitness Estimation Function," Genetic Programming Theory and Practice X, Ed. Riolo, et al., Springer, Apr. 19, 2013, pp. 59-71.

Li, Xiaodong and Kirley, Michael, "The Effects of Varying Population Density in a Fine-Grained Parallel Genetic Algorithm," 2002, CEC'02, Proceedings of the 2002 Congress on Evolutionary Computation, vol. 2, IEEE, 2002.

Fidelis, Marcos Vinicius, Heitor S. Lopes, and Alex A. Freitas, "Discovering Comprehensible Classification Rules With a Genetic Algorithm," Proceedings of the 2000 Congress on Evolutionary Computation, vol. 1, IEEE, 2000.

International Search Report and Written Opinion for PCT Application No. PCT/US2008/82876, Dec. 23, 2008, 8 pp.

Koza, J. R., "Genetic Programming: On the Programming of Computers by Means of Natural Selection," Dec. 1992, MIT Press, pp. 1-609.

Extended European Search Report for EP Application No. EP 08847214, 9 pp.

Enee, Gilles, et al., "Classifier Systems Evolving Multi-Agent System With Distributed Elitism," Proceedings of the 1999 Congress on Evolutionary Computation (CEC'99), vol. 3:6, Jul. 1999, pp. 1740-1746.

Tanev, I., et al., "Scalable Architecture For Parallel Distributed Implementation of Genetic Programming on Network of Workstations," J. Systems Architecture, vol. 47, Jul. 2001, pp. 557-572.

Streichert, F., "Introduction to Evolutionary Algorithms," paper to be presented Apr. 4, 2002 at the Frankfurt MathFinance Workshop, Mar. 30, 2002, Frankfurt, Germany, XP55038571, 22 p., Retrieved from the Internet: http://www.ra.cs.uni-tuegingen.de/mitarb/streiche/publications/Introduction_to_volutionary_Algorithms.pdf.

Written Opinion from Singapore Patent Office in related application SG 201003127-6, Jun. 16, 2011, 9 pp.

Exam Report for related application AU 2008323758, Apr. 20, 2012, 2 pp.

Sakauchi, et al., Unifine: A Next Generation Financial Solution System of Nihon Unisys Ltd., Technology Review 'Unisys,' Japan, Nihon Unisys Ltd., Feb. 28, 2006, vol. 25, No. 4, pp. 14-15.

Office Action from JP 2010-533295, dated Apr. 16, 2013, 12 pp.

Laumanns, Marco, et al., "A Unified Model for Multi-Objective Evolutionary Algorithms with Elitism," IEEE, pp. 46-53, 2000.

Ahn, Change Wook, et al., "Elitism-Based Compact Genetic Algorithms," IEEE, Transactions on Evolutionary Computation, vol. 7, No. 4, pp. 367-385, 2003.

Hornby, Gregory S., "The Age-Layered Population Structure (ALPS) Evolutionary Algorithm," ACM, GECCO '09, 7 pp., 2009.

Hornby, G. S., "ALPS: The Age-Layered Population Structure for Reducing the Problem of Premature Convergence," GECCO '06, Seattle, Jul. 2006, authored by an employee of the U.S. Government, therefore in the public domain, 8 pp.

Hornby, G. S. "A Steady-State Version of the Age-Layered Population Structure EA," Chapter 1 of Genetic Programming Theory and Practice VII, Riolo, et al., editors, Springer 2009, 16 pp.

Hornby, G. S., "Steady-State ALPS for Real-Valued Problems," GECCO '09, Montreal, Jul. 2009, Assoc. of Computing Machinery, 8 pp.

Idesign lab, "ALPS—The Age-Layered Population Structure," UC Santa Cruz web article printed Mar. 17, 2011, 3 pp., http://idesign.ucsc.edu/projects/alsp.html.

Gaspar-Cunha, A., et al., "A Multi-Objective Evolutionary Algorithm Using Neural Networks to Approximate Fitness Evaluations," Int'l. J. Computers, Systems and Signals, 6(1), pp. 18-36, 2005.

Kosorukoff, A., "Using Incremental Evaluation and Adaptive Choice of Operators in a Genetic Algorithm," Proc. Genetic and Evolutionary Computation Conference, GECCO, Sep. 2002, 7 pp.

Nelson, A., "Fitness Functions in Evolutionary Robotics: A Survey and Analysis," Robotics and Autonomous Systems 57, 2009, 345-370.

Wu, A. S., et al., "An Incremental Fitness Function for Partitioning Parallel Tasks," Proc. Genetic and Evolutionary Computation Conf., Aug. 2001, 8 pp.

Whitehead, B. A., "Genetic Evolution of Radial Basis Function Coverage Using Orthogonal Niches," IEEE Transactions on Neural Networks, 7:6, Nov. 1996, 1525-28.

Bui, L. T., et al., "Local Models: An Approach to Distributed Multi-Objective Optimization," Computational Optimization and Applications, vol. 42, No. 1, Oct. 2007, pp. 105-139.

Castillo, Tapia M. G., et al., "Applications of Multi-Objective Evolutionary Algorithms in Economics and Finance: A Survey," Proc. IEEE Congress on Evolutionary Computation, Sep. 2007, pp. 532-539.

Ducheyne, E., et al., "Is Fitness Inheritance Useful for Real-World Applications?," Evolutionary Multi-Criterion Optimization, ser. LNCS 2631, Spring 2003, pp. 31-42.

Juille, H., "Evolution of Non-Deterministic Incremental Algorithms as a New Approach for Search in State Spaces," Proc. 6th Int'l. Conf. on Genetic Algorithms, 1995 8 pp.

International Search Report mailed Jul. 2, 2010 in PCT/US10/32847.

International Search Report mailed Jun. 29, 2010 in PCT/US10/32841.

Sacks, J., et al., "Design and Analysis of Computer Experiments," Statistical Science, 4:4, 1989. 409-435.

Torresen, J., "A Dynamic Fitness Function Applied to Improve the Generalisation When Evolving a Signal Processing Hardware Architecture," Proc. EvoWorkshops, 2002, 267-299 (12 pp.).

Bartlett II, J. E., et al., "Organizational Research: Determining Appropriate Sample Size in Survey Research," IT, Learning, and Performance Journal, 19(1), Spring 2001, 8 pp.

Fitzpatrick, J. M., et al., "Genetic Algorithm in Noisy Environments," Machine Learning 3:101-120, May 1988.

Leon, C., et al., "Parallel Hypervolume-Guided Hyperheuristic for Adapting the Multi-Objective Evolutionary Island Model," Proc. 3rd Int'l. Workshop on Nature Inspired Cooperative Strategies for Optimization Studies in Computational Intelligence, vol. 236, Nov. 2008, pp. 261-272.

Lopez, Jaimes A., et al., "MRMOGA: Parallel Evolutionary Multiobjective Optimization Using Multiple Resolutions," Proc. IEEE Congress on Evolutionary Computation, vol. 3, Sep. 2005, pp. 2294-2301.

Davarynejad, M., et al., "A Novel General Framework for Evolutionary Optimization: Adaptive Fuzzy Fitness Granulation," CEC, Sep. 2007, 6 pp.

Davarynejad, M., "Fuzzy Fitness Granulation in Evolutionary Algorithms For Complex Optimization," Master of Science Thesis, Ferdowsi Univ. of Mashhad, Jun. 2007, 30 pp.

Salami, M., et al., "A Fast Evaluation Strategy for Evolutionary Algorithms," Applied Soft Computing 2/3F (2003), 156-173.

M.-R. Akbarzadeh-T., et al., "Friendship Modeling for Cooperative Co-Evolutionary Fuzzy Systems: A Hybrid GA-GP Algorithm," Proc. 22nd Int'l. Conf. of N. American FIPS, Jul. 2003, pp. 61-66.

Mouret, J. B., et al., "Encouraging Behavioral Diversity in Evolutionary Robotics: An Empirical Study," MIT, Evolutionary Computation, 20(1):91-133, 2012.

Myers, Raymond H. and Montgomery, Douglas C., "Response Surface Methodology: Process and Product Optimization Using Designed Experiments," John Wiley and Sons, Inc., New York, 1995.

Poli, R., et al., "Genetic Programming: An Introductory Tutorial and a Survey of Techniques and Applications," Univ. Essex School of Computer Science and Electronic Engineering Technical Report No. CES-475, Oct. 2007, 112 pp.

(56)            References Cited

OTHER PUBLICATIONS

Georgilakis, P. S., "Genetic Algorithm Model for Profit Maximization of Generating Companies in Deregulated Electricity Markets," Applied Artificial Intelligence, Jul. 2009. 23:6, 538-552.

Refaeilzadeh, P., et al., "Cross Validation," entry, Encyclopedia of Database Systems, eds. Ozsu and Liu, Springer, 2009, 6 pp.

Remde, S., et al., "Evolution of Fitness Functions to Improve Heuristic Performance," Lion, Dec. 8-10, 2007 II, LNCS 5313, pp. 206-219.

Schoreels, C., "Agent Based Genetic Algorithm Employing Financial Technical Analysis For Making Trading Decisions Using Historical Equity Market Data," IEEE/WIC/ACM International Conference on Intelligent Agent Technology (IAT2004), Beijing, China, Sep. 20-24, 2004, pp. 421-424.

Bongard, J. C., et al., "Guarding Against Premature Convergence While Accelerating Evolutionary Search," GECCO '10: Proceedings of the $12^{th}$ Annual Conference on Genetic and Evolutionary Computation, 8 pp. (2010).

Gorunescu, et al., "Evolutionary strategy to develop learning-based decision systems, Application to breast cancer and liver fibrosis stadiallization" [online], Jun. 2014 [retrieved on May 21, 2020], Journal of Biomedical Informatics, vol. 49, pp. 1-32, Retrieved from the Internet: https://reader.elsevier.com/reader/sd/pii/S1532046414000173?token=E3DB70CBA3796F20A3C08ABA8E0657EED29D4423C65CF9959714AC34ADS80F5755F248C38C14CEBE59D726C456A820.

Kaelbling, et al., Reinforcement Learning: A Survey [online], 1996 [retrieved May 21, 2020], Journal of Artificial Intelligence Research, vol. 4, pp. 237-285, Retrieved from the Internet: https://www.cs.cmu.edu/~tom/10701_sp11/slides/Kaelbling.pdf.

International Search Report and Written Opinion for PCT App. No. PCT/US20/25046, dated Jun. 23, 2020, 9 pp.

Risto Miikkulainen, et al., "Creative AI Through Evolutionary Computation: Principles and Examples," SN Computer Science, 2:163, 2021, https://doi.org/10.1007/s42979-021-00540-9, 7 pp.

Risto Miikkulainen, "From Prediction to Prescription: Evolutionary Optimization of Non-Pharmaceutical Interventions in the COVID-19 Pandemic," arXiv: 2005.13766v3, Aug. 1, 2020, 34 pp.

Risto Miikkulainen, et al., "From Prediction to Prescription: Evolutionary Optimization of Nonpharmaceutical Interventions in the COVID-19 Pandemic," IEEE Transactions on Evolutionary Computation, vol. 25, No. 2, Apr. 2021, 16 pp.

Mahmoudpour et al., Diagnosis of Distributed Denial of Service Attacks using the Combination Method of Fuzzy Neural Network and Evolutionary Algorithm, Indian Journal of Science and Technology, vol. 8(28), DOI: 10.17485/ijst/2015/v8i28/81820, Oct. 2015; pp. 1-7 (Year: 2015).

Alesawy et al., Elliptic Curve Diffie-Hellman Random Keys Using Artificial Neural Network and Genetic Algorithm for Secure Data over Private Cloud, Inform. Technol. J., 15 (3): 77-83, 2016 (thru ResearchGate); Total pages: 9 (Year: 2016).

Oreski et al., Hybrid system with genetic algorithm and artificial neural networks and its application to retail credit risk assessment, Expert Systems with Applications 39 (2012); pp. 12605-12617 (Year: 2012).

Golovin, et al., "Google Vizier: A Service for Black-Box Optimization," Proceedings of the $23^{rd}$ ACM SIGKDD International Conference on Knowledge Discovery and Data Mining, pp. 1487-1495, 2017.

Liang, et al., "Evolutionary Architecture Search for Deep Multitask Networks," arXiv: 1803.03745, 2018.

Meyerson, et al., "Pseudo-Task Augmentation: From Deep Multitask Learning to Intratask Sharing and Back," arXiv: 1803.04062, 2018.

Rawal, et al., "From Nodes to Networks: Evolving Recurrent Neural Networks," arXiv: 1803.04439. 2018.

Zhang, et al., "Evolutionary Computation Meets Machine Learning: A Survey," IEEE Computational Intelligence Magazine, vol. 6, No. 4, DOI 10.1109/MCI.2011.942584, 2011.

Bergstra, et al., (2013), "Hyperopt: A Python Library for Optimizing the Hyperparameters of Machine Learning Algorithms," Proceedings of the $12^{th}$ Python in Science Conference (SCIPY 2013).

Alois Pourchot et al. , "CEM-RL: Combining evolutionary and gradient-based methods for policy search" , arXiv preprint arXiv:1810.01222v3, Oct. 2, 2018. 19 pages.

Open Ai: "Deep Deterministic Policy Gradient—Spinning Up documentation", Nov. 12, 2018, URL: https://web.archive.org/web/20181112044227/https://spinningup.openai.com/en/latest/algorithms/ddpg.html [retrieved on Feb. 15, 2023], 7 pages.

Tobias Peter: "Using Deep Learning as a surrogate model in Multi-objective Evolutionary Algorithms", Jan. 1, 2018, URL:https://www.ci.ovgu.de/is_media/Master+und+Bachelor_Arbeiten/MasterThesis_TobiasPeter-download-p-4614.pdf [retrieved on Feb. 14, 2023], 115 pages.

Extended European Search Report issued in App. No. EP20778409.1 on Feb. 27, 2023, 11 pages.

* cited by examiner

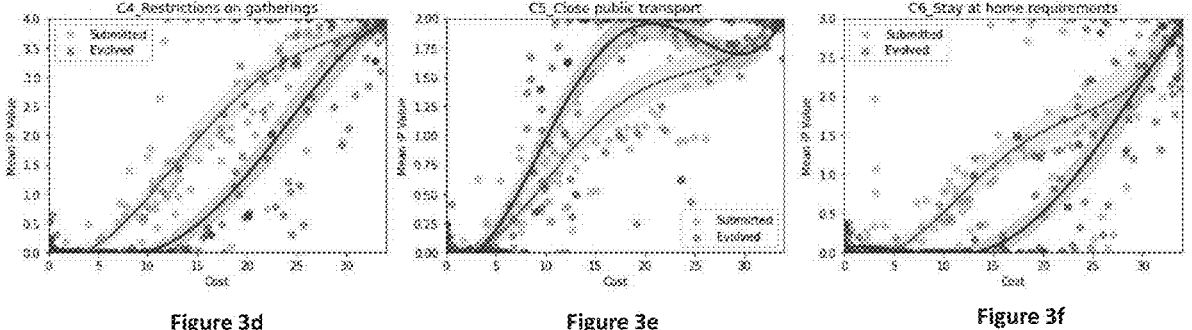
Figure 3d                    Figure 3e                    Figure 3f

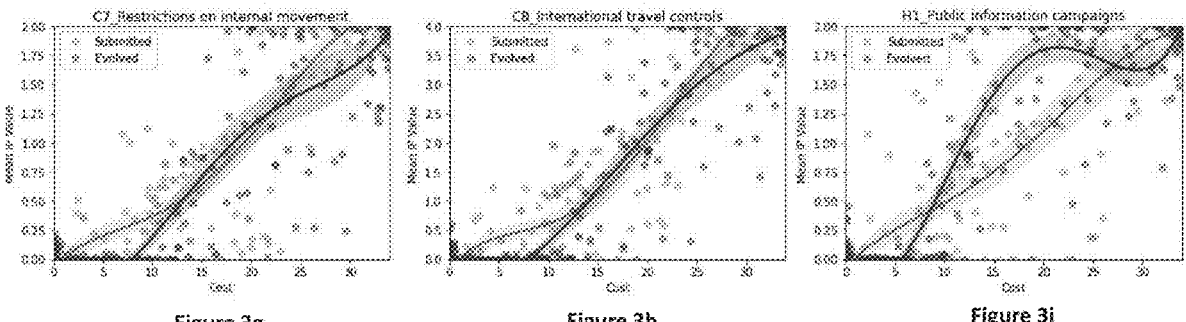
Figure 3g                    Figure 3h                    Figure 3i

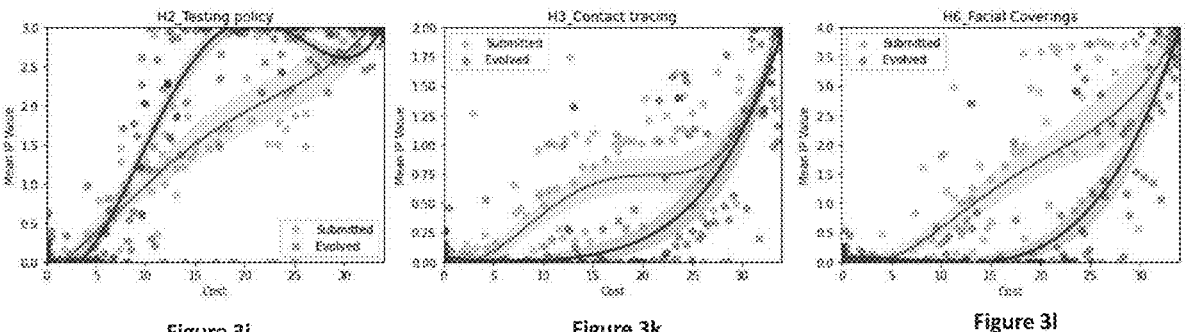
Figure 3j                    Figure 3k                    Figure 3l

Each Line is an Initial Individual

Generation

SYSTEM AND METHOD FOR GENERATING IMPROVED PRESCRIPTORS

CROSS-REFERENCE TO RELATED APPLICATIONS

The present application claims the benefit of priority to U.S. Provisional Patent Application No. 63/208,277, "System and Method For Generating Improved Prescriptors" which was filed on Jun. 8, 2022 and which is incorporated herein by reference in its entirety.

The following documents are also incorporated herein by reference: U.S. application Ser. No. 16/424,686 entitled SYSTEMS AND METHODS FOR PROVIDING SECURE EVOLUTION AS A SERVICE which was filed on May 29, 2019; U.S. patent application Ser. No. 16/831,550 entitled PROCESS AND SYSTEM INCLUDING AN OPTIMIZATION ENGINE WITH EVOLUTIONARY SURROGATE-ASSISTED PRESCRIPTIONS filed Mar. 26, 2020; U.S. application Ser. No. 16/902,013 entitled PROCESS AND SYSTEM INCLUDING EXPLAINABLE PRESCRIPTIONS THROUGH SURROGATE-ASSISTED EVOLUTION; U.S. patent application Ser. No. 17/355,971 entitled AI BASED OPTIMIZED DECISION MAKING FOR EPIDEMIOLOGICAL MODELING filed Jun. 23, 2021 and Miikkulainen et al., From Prediction to Prescription: Evolutionary Optimization of Nonpharmaceutical Interventions in the COVID-19 Pandemic, IEEE TRANSACTIONS ON EVOLUTIONARY COMPUTATION, VOL. 25, NO. 2, APRIL 2021.

Additionally, one skilled in the art appreciates the scope of the existing art which is assumed to be part of the present disclosure for purposes of supporting various concepts underlying the embodiments described herein. By way of particular example only, prior publications, including academic papers, patents and published patent applications listing one or more of the inventors herein are considered to be within the skill of the art and constitute supporting documentation for the embodiments discussed herein.

BACKGROUND

Field of the Embodiments

The subject matter described herein, in general, relates to a system and method for generating improved prescriptor models, and, in particular, to a system and method for combining and improving sets of diverse prescriptors by distilling and injecting them into Evolutionary Surrogate-assisted Prescription (ESP).

Description of Related Art

Solving societal problems on a global scale requires the collection and processing of ideas and methods from diverse sets of international experts. As the number and diversity of human experts/teams increase, so does the likelihood that some combinations and refinements of this collected knowledge will reveal improved policy opportunities. However, the difficulty in effectively extracting, combining, and refining complementary information in an increasingly large and diverse knowledge base presents a challenge.

Building predictive models for strategic decision making has an underlying limitation of non-specification of optimal outcomes. Since the optimal decision-making outcome remains unknown, with domains being only partially observable and decision variables interacting in a non-linear fashion, adopting conventional machine learning based approaches such as gradient descent, linear programming or other traditional optimization approaches may not be a suitable proposition.

For a superior and sophisticated decision-making strategy, it is recommended that an option to choose from multiple strategies based on their merits is provided. Accordingly, given availability of historical data on past decisions along with corresponding outcomes, a surrogate predictive model can be utilized to perform relevant search, evaluation, and discovery of most optimum strategy. However, even with a previously proposed ESP solution, as the initial population fed to the model consists only of neural networks with randomly generated weights, low quality random solutions are generated, a problem which the present disclosure attempts to address.

SUMMARY OF THE EMBODIMENTS

In a first non-limiting exemplary embodiment, a computer-implemented method for generating optimized prescriptor models for optimal decision making, includes: generating a set of prescriptor models having a context space and an action space; and distilling each of the prescriptor models into a functional form evolvable with an evolutionary algorithm framework over multiple generations.

In a second non-limiting exemplary embodiment, a method for developing optimized prescriptor models for determining optimal decision policy outcomes includes: building a predictor surrogate model using historical training data to predict an outcome; receiving multiple known model candidates for determining decision policy outcomes, wherein the multiple known models are in one or more formats incompatible with an evolutionary algorithm frame; distilling the multiple known model candidates into a functional architecture that is compatible with the evolutionary algorithm framework; feeding the predictor surrogate model in an evolutionary algorithm framework to train a prescriptor model using evolution over multiple generations, wherein an initial population of candidate prescriptor models includes the distilled multiple known model candidates, and further wherein subsequent generations are evolved based on results of prior generations until a set of optimized prescriptor models are determined.

In a third non-limiting exemplary embodiment, a method for automatic discovery of intervention policies (IP) to optimize one or more objectives related to an epidemiological event, includes: training a predictor model, Pd (C, A)=O, implemented on a processor, the predictor model being configured to receive input training data, the input historical training data sets (C, A, O) including context information (C), actions (A) performed in a given context, and outcomes (O) resulting from action performed in the given context; establishing an initial population of candidate prescriptor models, said establishing including receiving multiple known model candidates for determining intervention policies, wherein the multiple known models are in one or more formats incompatible with an evolutionary algorithm framework; distilling the multiple known model candidates into a functional architecture that is compatible with the evolutionary algorithm framework; evolving prescriptor models, Ps (C)=A, implemented on a processor, wherein the prescriptor models are evolved over multiple generations using the trained predictor model as a surrogate to evolve a subset of the candidate prescriptor models in the initial population, the evolved prescriptor models being configured to receive context information as input data, wherein the context information includes epidemiological event data; and output actions that optimize the one or more objectives as outcomes corresponding to the received context information, wherein the output actions include implementation of intervention policies.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIGS. 3a, 3b, 3c, 3d, 3e, 3f, 3g, 3h, 3i, 3j, 3k, 3l are plots showing trends of how stringency tends to increase as the overall cost of the policy increases on a per policy basis, in accordance with embodiments herein;

DETAILED DESCRIPTION OF THE EMBODIMENTS

Figure 1A:
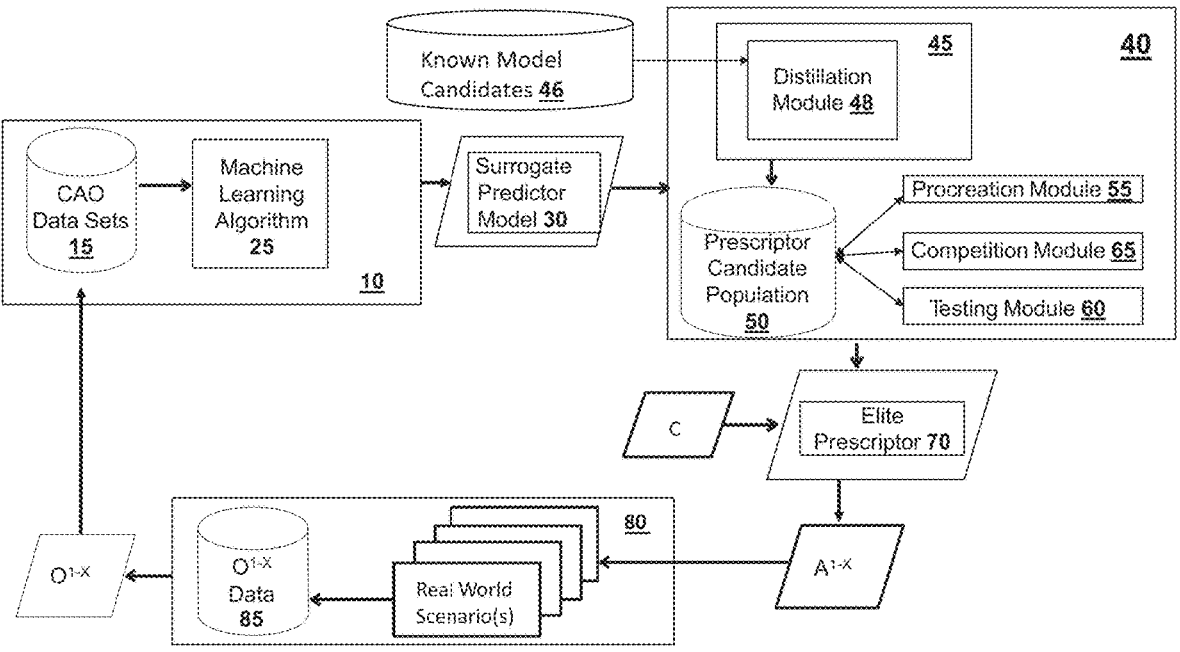
FIGS. 1a and 1b an exemplary evolutionary framework incorporating a D&E method therein in accordance with the embodiments herein.

In describing the preferred and alternate embodiments of the present disclosure, specific terminology is employed for the sake of clarity. The disclosure, however, is not intended to be limited to the specific terminology so selected, and it is to be understood that each specific element includes all technical equivalents that operate in a similar manner to accomplish similar functions. The disclosed embodiments are merely exemplary methods of the invention, which may be embodied in various forms.

The evolutionary AI framework described herein with respect to the embodiments meets a set of unique requirements. It incorporates expertise from diverse sources with disparate forms. It is multi-objective since conflicting policy goals must be balanced. And the origins of final solutions generated by the framework are traceable, such that credit can be distributed back to humans based on their contributions. The framework is implemented in accordance with the following general and high-level steps. First, define the problem in a manner formal enough so that solutions from diverse experts can be compared and combined in a standardized manner. Second, solicit and gather solutions from a diverse set of experts, wherein solicitation can take the form of an open call or a direct appeal to known experts. Third, convert or "distill" the internal structure of each gathered solution into a canonical form using machine learning. Finally, evolve the distilled solutions through combination and adaptation using an AI system to discover innovations that realize the complementary potential of the expert-developed solutions.

In one significant aspect of the present disclosure, a system and method of generating high performance prescriptors is provided, capable of achieving high performance solution quickly. In one specific embodiment, the prescriptors are distilled into neural networks and further evolved using Evolutionary Surrogate-assisted Prescription (ESP). The Learning Evolutionary Algorithm Framework (LEAF) AI-enables manual decision processes using prescriptors to create and iteratively enhance recommendations, improving processes and achieving business goals in a principled AI-based manner.

Initially, ESP is described in detail in the co-owned patent applications listed above which are incorporated herein by reference. Briefly, the embodiment herein comprises of a system and method of developing models that predict or provide recommendations with enhanced accuracy. The first phase of predictor development involves providing for accurate, localized predictions based on historical data. Next, during second phase, prescriptor models are developed for determining optimal outcomes. Here, prescriptors are not evaluated with live data; instead, the recommendations are evaluated using predictor model of first phase. Accordingly, the predictor model is fed to evolutionary algorithm framework to train a prescriptor model using evolution over multiple generations, wherein subsequent generations are evolved based on results of prior generations until an optimized prescriptor model is determined.

In one general embodiment, a process for developing an optimized prescriptor model comprises: building a predictor surrogate model on historical training data to predict an outcome; the historical training data including context information (C), actions (A) performed in an included context, and historical C, A, outcome (O) data sets (C, A, O). Now, a prescriptor model is evolved with trained predictor model over a number of generations until a predetermined convergence metric is met to discover the optimal prescriptor models.

In one preferred embodiment of present disclosure, these prescriptor models are improved by distilling them into neural networks and evolving them further using Evolutionary Surrogate-assisted Prescription (ESP). The embodied method handles diverse sets of prescriptors in that it makes no assumptions about the form of the input (i.e., contexts) of the initial prescriptors; it relies only on the prescriptions made in order to distill each prescriptor to a neural network with a fixed form.

An overall exemplary evolutionary system with distillation is shown in the schematic of FIG. 1a and includes a surrogate predictor model generation subsystem 10 which includes at base, a database 20 for storing (C, A, O) training datasets, and at least one module for implementing the selected machine learning algorithm 25, which outputs a trained surrogate predictor model 30. The trained surrogate predictor model is used to evaluate fitness of evolved prescriptor model candidates as part of the evolution process implemented by the prescriptor evolution subsystem 40. The prescriptor evolution subsystem 40 includes a prescriptor model candidate generator 45 and a prescriptor candidate population database 50 which can be continually update in accordance with evolving candidates. The prescriptor model candidate generator 45 further includes a distillation module 48 which operates to convert known model candidates into a predetermined fixed neural network format suitable for evolution. In a preferred embodiment, prior to distillation, the known model candidates are previously developed models for providing a solution in a shared action space, but not necessarily a shared context space. As discussed in the detailed example below, these known model candidates 46 may include models previously developed by human and/or machine experts and may be in any implementation format.

The prescriptor candidates are evaluated for fitness against the surrogate predictor model 30 by testing module 60 and ranked or otherwise filtered and compared to one another in accordance with the requirements of a competition module 65. Elite prescriptor model(s) 70 are selected for application to real world scenarios by the real world application subsystem 80. A procreation module 55 is used to re-seed and update the prescriptor candidate population database 50 in accordance with known procreation processes. Finally, the outcomes from application of the elite prescriptor model 70 actions to real work scenarios are stored in outcome database 85 and shared with database 20 to update the (C, A, O) training data.

As is appreciated by those skilled in the art, additional modules and processors, servers and databases may be incorporated to perform different or additional tasks, including data processing/filtering/translation as required for different domains and data sources. Further, aspects of the overall system or subsystems may be performed by different entities. For example, the surrogate predictor model generation subsystem 10 and the prescriptor evolution subsystem 40 may be operated by a service provider and provided as a SaaS product, while the real world application subsystem 80 may be operated exclusively by a customer, thus protecting confidential business and other data. The following co-owned patent applications are incorporated herein by reference herein: U.S. patent application Ser. No. 16/424,686 entitled Systems And Methods For Providing Secure Evolution As A Service and U.S. patent application Ser. No. 16/502,439 entitled Systems And Methods For Providing Data-Driven Evolution Of Arbitrary Data Structures.

Figure 1B:
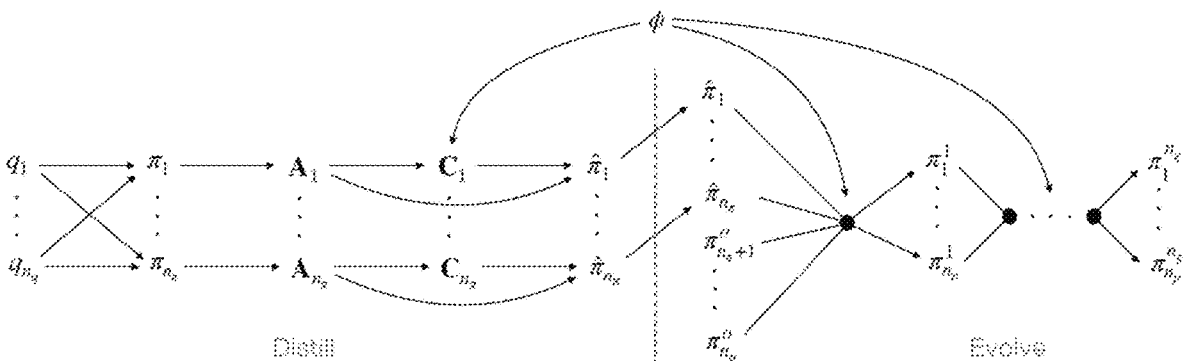

For distilling these known models candidates into neural networks, distillation module 48 aims to integrate these prescriptors into a run of ESP in order to improve both the set of prescriptors and ESP itself. Referring to FIG. 1*b*, consider a fixed set of prescriptors $\pi_1, \ldots, \pi_N$. Each $\pi_i$ is a prescriptor in the sense of ESP, that is, it is a function that maps contexts $c_i \in C_i$ to actions $a_i \in A_i$. For the present method, prescriptors are not required to have a shared context space; they are only required to have a shared action space, i.e. $C_i \neq C_j$ for i≠j, but $A_i = A_j \forall i$, j is required. No further assumptions are made as to the functional form of any $\pi_i$, e.g., it could be a neural network, a complicated hand-coded program, or some sort of stochastic search algorithm. This is the sense in which the set of prescriptors can be diverse: they can have any context space and any underlying implementation. The goal is to integrate these prescriptors into a run of ESP in order to improve both the set of prescriptors and ESP itself.

Now, in order to evolve prescriptors in ESP, they all need to have the same context space $C_*$, and have a functional form that ESP can evolve. For the present method, ESP prescriptors are represented as differentiable neural networks with a fixed architecture having a context space $C_*$, and with action space $A_* = A_1 = \ldots = A_N$. For each $\pi_i$, suppose following is a set of actions $a_i^1, \ldots, a_i^K$ prescribed by $\pi_i$ in K scenarios with corresponding contexts $c^1, \ldots, c^K \in C_*$.

Now each $\pi_i$ is distilled into a prescriptor of the form evolvable with ESP by training the ESP neural network to mimic the prescriptions of $\pi_i$. This distillation is framed as a standard supervised learning problem, where the neural network $\hat{\pi}_i$ is trained to fit the input-output pairs $\{(a_i^k, c^k)\}_{k=1}^K$. In one working embodiment, this training may be performed by gradient descent, e.g., using Keras and including standard methods to avoid overfitting, i.e., early stopping and use of validation and test sets. The result of training is a neural network $\hat{\pi}_i \approx \pi_i$, which has a form that ESP can evolve.

The distillation above results in evolvable neural networks $\hat{\pi}_1, \ldots, \hat{\pi}_K$ which approximate $\pi_1, \ldots, \pi_N$, respectively. These distilled models can then be placed into the initial population of a run of ESP, whose goal is to optimize actions $a \in \mathcal{A}_*$ given contexts $c \in C_*$. In standard ESP, the initial population (i.e., before any evolution takes place) consists only of neural networks with randomly generated weights. By replacing random neural networks with the distilled neural networks, ESP starts from diverse high-quality solutions, instead of low-quality random solutions. ESP can then be run as usual from this starting point. Throughout this description, the process of distillation and evolution is referenced as D&E.

Some noteworthy advantages of replacing random neural networks with distilled neural networks in accordance with the description herein, include:

Improved efficiency of ESP: Evolution does not have to start from scratch, so it achieves high-performing solutions more quickly Diversity in ESP: The distilled models can behave quite different from solutions ESP would discover on its own. Evolving using this raw material allows ESP to discover innovations that would not be discovered otherwise.

Quantitative improvement of ESP solutions: The above two advantages combine to enable ESP to generate higher-performing solutions (e.g., expanded Pareto front of cost vs. impact) compared to running from scratch (random initial solutions) given the same amount of computation.

Quantitative improvement of initial prescriptor set: From the perspective of the initial set of fixed prescriptors, merit is seen in the way ESP combines and builds upon the raw material in these prescriptors to find even better sets of solutions (again, e.g., it discovers an expanded Pareto front).

One skilled in the art will appreciate that the system and process described herein is applicable to many scenarios. In one timely example, the application of distilled prescriptor models to generate responses to pandemic challenges is described in detail herein. In particular, distilled prescriptor models are used in ESP to optimize the tradeoff between new cases of infection and policy intervention cost for managing the COVID-19 pandemic.

The pandemic response generation system and method, according to one exemplary embodiment, develop models that predict local outbreaks with more accuracy, along with prescriptive intervention and mitigation approaches that minimize infection cases and economic costs. Further, it improves the human-developed solutions and the evolutionary optimization system, by integrating the human-developed solutions into the evolutionary process by a system of distillation. It therefore allows for a more tightly coupled human-AI collaboration. A secondary advantage of the approach is that it supports such improvements even in the absence of direct access to the original human-developed models. That is, the process relies only on a data set of sample input-output pairs collected from these models. In essence, the distilled and evolved prescriptors foster an ecosystem that makes it easier to implement accurate and rapid prescriptions and enable ongoing improvements to the model as new interventions, treatments, and vaccinations become available.

The open platform for experiment enabled increased and higher-quality data, accurate predictions, stronger regional intervention plans, and continual improvement as new interventions such as vaccinations and treatments become available. It provides a platform for shared human and machine creativity and problem-solving that fosters innovation and provides for an evidence-based decision making to combat future emergencies, functioning ultimately a tool for future humanitarian crises.

The experiment initiates with gathering input-output pair for each model, wherein the input does not need to be the input of the model used when producing the output; the input must only be of a fixed form across the various models and consist of information the model could have used to produce its output. Now, for each model, a neural network is trained with a fixed given form to mimic that model's behavior by training it in a supervised fashion on the input-output pairs, i.e., distilling the model into a neural network. All these trained neural networks are now placed into the initial population to optimize the same application the initial human-developed models were developed to solve.

In accordance with one illustrative embodiment, the distilled models are trained using Keras and Tensorflow, which are APIs well-known to those skilled in the art for building and training models. They are trained with batch size 32, for up to 100 epochs, with early stopping if validation loss did not improve after 5 epochs. The validation loss used is ordinal MAE (mean absolute error), i.e., MAE of outputs rounded to the nearest integer, since in the application outputs are required to be integral in each range. A key requirement of the process is that all human-developed models adhere to the same prescriptor API. This adherence allows distillation of all human-developed models into neural networks with equivalent structure. The distilled models are trained directly in a supervised fashion without access to the human-developed models themselves. Thus, they use only the input-output examples from human-developed models, and not the auxiliary information that is used by alternative distillation methods.

To illustrate this idea, a phasic predictor model is developed. In phase one, the goal is to devise a predictor model that provides accurate, localized predictions of COVID-19 transmission based on local data, unique intervention strategies, community resilience characteristics, and mitigation policies and practices. Precisely, history of cases and interventions in a country or region are used as input to predict the number of cases likely in the future. A sample dataset comprised of case and intervention plan data and example predictors (not region specific) are utilized in phase one to develop predictors. In one exemplary embodiment, these example predictors may include a linear regressor and long short term memory (LSTM) based predictor network. Further, intervention plans may include school and workplace closure policies, travel restrictions, testing, and contact tracing. Furthermore, data from a plurality of data sources can be retrieved from government organizations, demographic or economic data, data on healthcare factors, social distancing, adherence to policies, and more to create a unique dataset. Next, a predictor is generated based on a novel and exhaustive dataset derived from above, which is utilized in phase two for prescriptor development.

In one example embodiment, generality of a predictor model is assessed, wherein the predictor takes as input the active and historical intervention plans for each region and will need to output a prediction for all. Performance on specialty regions is evaluated based on output of those regions. A predictor output can consist of multiple models, for example those specializing in different regions, which can be accessed through the same call. Thus, a predictor can estimate the number of future cases for a given region(s)—considering the local intervention plans in effect from a created dataset over a given time. In one preferred embodiment, the predictor outputs include optional fields, such as confidence intervals, death rates, hospitalization rates, ventilators needed, and other outputs.

At the conclusion of phase one of the predictor development, as indicated above, the predictor generated is evaluated against live data for a predetermined evaluation period on all regions and then separately on the specialty regions. Once approved of their quantitative accuracy over a long term for a specific region of which an intervention plan is produced, the predictor transits to next phase of prescriptor development in phase two.

In the second phase, prescriptors are developed, encompassing rapid creation of custom, non-pharmaceutical and other intervention plan prescriptions and mitigation models to help decision-makers minimize COVID-19 infection cases while lessening economic and other negative implications of the virus. For example, machine-generated prescriptions may provide policymakers and public health officials with actionable locally based, customized, and least restrictive intervention recommendations, such as mandatory masks and reduced restaurant capacity.

During phase two, prescriptor development involves use of machine learning to make more accurate recommendations to stakeholders. Here, intervention plans are prescribed by the model that simultaneously minimizes the number of future cases as well as the stringency (i.e., economic and quality-of-life cost) of the recommended interventions. Thus, based on a time sequence of the number of cases in a region and the past intervention plans in place, prescriptor models (for any region) are developed that generate useful intervention plans that policy makers can implement for their region. Each prescriptor balances a tradeoff between two objectives: minimizing the number of daily COVID-19 cases while minimizing the stringency of the recommended interventions (as a proxy to their economic and quality-of-life cost).

As understood, intervention plan costs can differ across regions. For example, closing public transportation may be much costlier in London than it is in Los Angeles. Such preferences are expressed as weights associated with each intervention plan dimension, given to the prescriptor as input for each region. The prescriptor recommendations along the stringency objective is evaluated according to these weights, so the prescriptor model should consider them in making recommendations. This is a significant aspect for two reasons: (1) such prescriptors can be more readily customized to a particular region for future live site testing that may occur, making it easier to adopt them, and (2) this is a new technical challenge beyond the current state of the art, promoting scientific advances in machine learning. Prescriptors are developed and evaluated separately both in the base case of equal weights and in the more advanced case where the weights are chosen randomly.

Also during phase two, instead of being evaluated against a stream of live data (recommendations of real-world), the prescriptors are evaluated using a standard predictor model from phase one and a collection of neural networks to represent different trade-offs between COVID-19 cases and the stringency of the intervention plan. The prescriptor models are general and not specific to any region. The aim is to develop improved prescriptors that are either general or region-specific, based on selection of any of machine learning or other methods.

Thus, prescriptions may be generated through a variety of approaches. A possible approach may involve the following: a prescription is generated for each day, and a predictor is asked to predict the number of cases for the next day. The generated intervention plans ("IPs") and the predicted cases then become input to the prescriptor and the predictor for the next day. In this manner, the prescriptions can be rolled out day-by-day indefinitely into the future.

Another possible prescriptor generation approach involves a schedule of intervention plans generated over several days, weeks, or months based on the case and intervention plan history up to that point, and consulting the predictor only occasionally. Overall, an attempt is to create models to predict the course of the COVID-19 pandemic and to prescribe non-pharmaceutical interventions (NPIs) that would help with mitigation for all regions. Evaluation on specialty regions is based on the output for those regions. Note that the prescriptor submission can comprise multiple models, such as those specializing in different regions, which can be accessed through the same call. Here again the prescriptor is evaluated in a same manner as predictor, except the evaluation is now based on a much longer period of unseen/live data.

The prescriptors are evaluated based on the estimates that the predictor model makes on all regions and separately on specialty regions. For a given simulation period, e.g., 60-90 days, the prescriptor is called with the date and weights, obtaining prescriptions for each region. The prescriptor is required to meet two primary objectives: estimation of the number of cases for each region; and calculation of total intervention plan stringency for each region with the specified weights for the region. The weights for each region are drawn from a uniform distribution within [0 . . . 1] and normalized to sum up to one. The prescriptor's performance in this region is then calculated as the number of other prescriptors its Pareto-dominates (i.e., is better along both objectives) in this space.

Next, a second level of quantitative assessment is based on how well it may serve as a stepping stone in creating improved prescriptors through further collaborative machine learning—i.e., a population-based search—in the following process:

1. The prescriptor is distilled into an equivalent neural network via supervised learning of the prescriptions it made, as specified above in first assessment. It is then queried with a "syllabus" of situations (case and IP history and stringency evaluation weights) to obtain a training set. A neural network similar to the evolved prescriptor samples is then trained with it.
2. The network is then inserted into the prescriptor population along with all other submissions for that region.
3. The prescriptors are evolved further, optimizing the two objectives specified in first assessment.

4. In the final Pareto front, evaluation is based on number of descendants of the prescriptor. The greater the number of descendants, the higher the evaluation score.

Thus, the present method is used to combine and improve the prescriptor submissions, and then the results are evaluated.

Here, the models are made usable in real-world settings, which provide interactivity and actionability in a visual and well-communicated format. The model may also take into consideration vulnerable groups that may include the unemployed, working poor, unhoused individuals, children, the elderly, people with disabilities, ethnic minorities, and other marginalized groups. Hence, the given prescriptor model enables prediction of local outbreaks with more accuracy along with prescriptive intervention based on above discussed predictor-prescriptor model approach. The analysis of the experimental runs also show that ESP achieves a systematic mixing of the prescriptor models which is consistent across multiple runs, suggesting the method is able to reliably take advantage of the initial prescriptors that lead to new innovative solutions.

In the following particular example, the detailed general description above of using the D&E framework to search for optimized policies for curbing pandemic impacts is applied to the global challenge of determining optimal responses to the COVID-19 pandemic. Specifically, in this example, the framework is applied to automate the development of further solutions to the COVID-19 pandemic using multiple, disparate and diverse solutions initially developed by human experts.

As a starting point, the initial prescriptor solution set is comprised of solutions submitted as part of the XPRIZE Pandemic Response Challenge. By way of background, XPRIZE challenge was run over a period from October 2020 through March 2021. The goal of the challenge was to motivate experts around the world to develop automated tools to help policy-makers make better, more informed decisions about how to respond to a quick-moving pandemic. Compared to human-only decision-making, such tools could better take advantage of the broad swaths of data that were being made available at the time. More than 100 teams participated in the challenge, from 38 countries, submitting high-performing models with highly-diverse implementations. The XPRIZE consisted of the two development phases described above. That is, in Phase 1, teams were tasked at developing predictors to predict the change in new COVID-19 cases in approximately 200 geographic regions (hereafter "Geos") around the world given schedules of planned IPs for each Geo. The top teams then moved on to Phase 2, in which they were tasked at developing prescriptors to prescribe schedules of policies for governments to trade-off between number of predicted new cases (computed w.r.t. a predictor) and cost of implementing the policies (e.g., economic, social, or political cost). The XPRIZE formal problem definition, requirements, API, and code utilities for the challenge are publicly available. The following introductory document is descriptive of the challenge at a high-level and is incorporated herein by reference in its entirety: XPRIZE Challenge Guidelines, Jan. 25, 2020.

IPs are defined by levels of stringency of various policy areas, including restrictions on schools, workplaces, the size of gatherings, and international travel, along with approaches such as public information campaigns and mask requirements. These IPs, along with the meanings of their integer stringency levels, are defined in a data set collected by Oxford University (hereafter "Oxford data set"). The following working document provides information regarding data collection and location of data sets and is incorporated herein by reference: Hale, Thomas, et al., "Variation in Government Responses to COVID-19" Version 13.0. Blavatnik School of Government Working Paper. 11 Mar. 2022. The Oxford data set contains collected values for each of 5 these IPs for over 200 Geos (e.g., country, U.S. state, . . . ) since the beginning of the pandemic, i.e., January 2020.

Ground truth data on new cases across these same Geos is also provided in this data set. For the challenge, there were twelve categories of IPs (a subset of the total set of policies in the Oxford data set), each of which could take on up to five values, which can be ordered in terms of their stringency, and are assigned integer values from 0 to 4. The challenge IP set is shown below in Table 1.

TABLE 1

| NPI Name | Level 0 | Level 1 | Level 2 | Level 3 | Level 4 |
|---|---|---|---|---|---|
| C1_School closing | no measures | recommend closing or all schools open with alterations resulting in significant differences compared to non-Covid-19 operations | require closing (only some levels or categories, e.g. just high school, or just public schools) | require closing all levels | no data |
| C2_Workplace closing | no measures | recommend closing (or recommend work from home) or all businesses open with alterations resulting in significant differences compared to non-Covid-19 operation | require closing (or work from home) for some sectors or categories of workers | require closing (or work from home) for all-but-essential workplaces (e.g. grocery stores, doctors) | no data |
| C3_Cancel public events | no measures | recommend cancelling | require cancelling | no data | no data |
| C4_Restrictions on gatherings | no restrictions | restrictions on very large gatherings (the limit is above 1000 people) | restrictions on gatherings between 101-1000 people | restrictions on gatherings between 11-100 people | restrictions on gatherings of 10 people or less |
| C5_Close public transport | no measures | recommend closing (or significantly reduce volume/route/means of transport available) | require closing (or prohibit most citizens from using it) | no data | no data |
| C6_Stay at home requirements | no measures | recommend not leaving house | require not leaving house with exceptions for daily exercise, grocery shopping, and 'essential' trips | require not leaving house with minimal exceptions (e.g., allowed to leave once a week, or only one person can leave at a time, etc.) | no data |
| C7_Restrictions on internal movement | no measures | recommend not to travel between regions/cities | internal movement restrictions in place | no data | no data |
| C8_International travel controls | no restrictions | screening arrivals | quarantine arrivals from some or all regions | ban arrivals from some regions | ban on all regions or total border closure |
| H1_Public information campaigns | no Covid-19 public information campaign | public officials urging caution about Covid-19 | coordinated public information campaign (e.g. across traditional and social media) | Blank - no data | Blank - no data |
| H2_Testing policy | no testing policy | only those who both (a) have symptoms AND (b) meet specific criteria (e.g. key workers, admitted to hospital, came into contact with a known case, returned from overseas) | testing of anyone showing Covid-19 symptoms | open public testing (e.g. "drive through" testing available to asymptomatic people) | Blank - no data |

TABLE 1-continued

| NPI Name | Level 0 | Level 1 | Level 2 | Level 3 | Level 4 |
|---|---|---|---|---|---|
| H3_Contact tracing | no contact tracing | limited contact tracing; not done for all cases | comprehensive contact tracing; done for all identified cases | | |
| H6_Facial Coverings | No policy | Recommended | Required in some specified shared/public spaces outside the home with other people present, or some situations when social distancing not possible | Required in all shared/public spaces outside the home with other people present or all situations when social distancing not possible | Required outside the home at all times regardless of location or presence of other people |

In Phase 1, submitted predictors would take as arguments a set of Geos and range of dates to predict for, along with the future settings (i.e., policy prescriptions) for each of the twelve IPs at those dates. The prediction date range could be up to 90 days. In Phase 2, the teams were presented with a reference predictor $\phi$, and developed prescriptors to, depending on any historical context deemed necessary, e.g., past cases and past policies, generate future policy schedules. These schedules could then be fed into $\phi$ to produce estimates of new cases in a particular Geo. Formally, each prescriptor program $\pi$ takes as its argument a query q, consisting of the Geo and date range to predict for, and produces a matrix of actions $A \in \mathbb{Z}_5^{T \times 12}$, where T is the length of the date range in days (up to 90 days). That is, A consists of the setting of each IP for each of T future days.

These prescriptors are evaluated in a two-dimensional objective space. Their goal is to minimize the number of new cases, while simultaneously minimizing the cost of implementing their prescribed policies. The aggregated metric for the number of new cases was simply the sum or mean over the date range. The cost is more challenging to aggregate, in that different Geos at different times may have different relative social or economic costs of implementing each IP. For the challenge, the official judges developed various cost settings for each IP, which were fed as input to prescriptors to evaluate their ability to adapt to different relative costs. As a level benchmark, prescriptors were also evaluated with uniform costs, i.e., the IP settings were simply summed across IPs and averaged over time. This uniform weighting makes evaluation simpler and more interpretable, so that the different methodologies of different prescriptors can be usefully compared. For clarity of analysis, and to avoid incorporating additional highly uncertain and variable information into the work, it is this uniform cost setting that is considered in this paper. In this setting, the cost of a particular policy setting falls in a range from $c_{min}=0$ (no IPs used) to $c_{max}=34$ (all IPs set to their most stringent settings). Since there are competing objectives, teams were allowed to submit multiple prescriptors to cover the space of tradeoffs between reducing cost of IPs and reducing cases. Ideally, the set of prescriptors submitted by a team would result in a Pareto front of solutions, which would give a policy-maker a clear space of tradeoffs from which to select a solution.

All in all, 169 prescriptors (solutions) were submitted. These solutions spanned the entire tradeoff space, and dramatically outperformed the competition baselines. A broad array of different approaches were used across different teams, including hand-coded rules, machine learning approaches like random forests and neural networks, epidemiological models, hybrid approaches of all these, and evolutionary algorithms.

In this particular example, these 169 prescriptors are the starting point for application of the D&E process of the framework shown in the diagram of FIG. 1b. In the D&E process, first, queries $q_1, \ldots, q_{n_q}$ are each fed in to each of a set of preexisting black-box decision-making programs $\pi_1, \ldots, \pi_{n_\pi}$, yielding a dataset of actions $A_i$ for each program $\pi_i$. With the help of the environment predictor model $\phi$, a corresponding dataset of contexts $C_i$ is derived, which have a fixed form suitable for input to a neural network. The training dataset $(A_i, C_i)$ is then used to train a neural network $\hat{\pi}_i$ that approximates $\pi_i$, i.e., $\hat{\pi}_i$ is a distilled version of $\pi_i$. The distilled models $\hat{\pi}_1, \ldots, \hat{\pi}_{n_\pi} = \pi_1^o, \ldots, \pi_{n_\pi}^o$ are then placed in the initial population of an evolutionary algorithm (EA), along with randomly-generated solutions $\pi_{n_\pi+1}^o, \ldots, \pi_{n_p}^o$. The EA uses $\phi$ to evaluate the behavior of $\pi_1^o, \ldots, \pi_{n_p}^o$ and then generates the next population $\pi_{n_\pi+1}^o, \ldots, \pi_{n_p}^1$. This evaluate-generate process is repeated $n_g$ times, yielding the set of final evolved solutions $\pi_1^{n_g}, \ldots, \pi_{n_p}^{n_g}$. Through this process, evolution discovers improvements to the initial set of black-box programs, and, by bootstrapping the prior knowledge stored in these programs, evolution discovers solutions it would not have discovered from scratch.

In distillation, the goal is to fit a model with a fixed functional form to capture the behavior of each initial solution, by solving the following minimization problem:

$$\theta_i^* = \min_\theta \int_Q p(q) \|\pi_i(q) - \hat{\pi}_i(\kappa(\pi_i(q), \phi); \theta_i)\|_1 dq \approx \min_\theta \frac{1}{n_q} \sum_{j=1}^{n_q} \|\pi_i(q_j) - \hat{\pi}_i(\kappa(\pi_i(q_j), \phi); \theta_i)\|_1, \quad (1)$$

where $q \in Q$ is a query, $\pi_i$ is the initial solution, $\hat{\pi}_i$ is the distilled model with learnable parameters $\theta_i$, and $\kappa$ is a function that maps queries (which may be specified via a high-level API) to input data with a canonical form that can be used to train $\hat{\pi}_i$. In practice, $\hat{\pi}_i$ is trained by optimizing Eq. (1) with stochastic gradient descent using data derived from the $n_q$ queries for which data is available. Beyond the standard assumptions required for generalization in supervised learning, the key assumption required for distillation to be effective is that there exists $\theta_i^*$ such that $\hat{\pi}_i(\kappa(\pi_i(q),\phi); \theta_i^*) \approx \pi_i(q)$. This assumption is met as long as $\kappa$ is expressive enough to yield contexts that (approximately) uniquely identify the state of the world that $\pi_i$ uses to generate its actions $\pi_i(q)$, and $\hat{\pi}_i$ is expressive enough to (approximately)

capture the functionality of $\pi$. This distillation procedure is capture on the left side of FIG. 1b.

In the specific example described herein, the choices of $\kappa$ and $\hat{\pi}(\_;\theta)$ enable distillation to sufficiently capture the behavior of the initial existing solutions, by choosing $\kappa$ to generate real-valued time-series data, and letting $\hat{\pi}_i$ to be neural networks.

Next, once each of the $n_\pi$ human-developed models $\pi_i$ has been distilled via Eq. (1) into its respective approximation $\hat{\pi}_i$, the $\{\hat{\pi}_i\}_{i=1}^{n_\pi}$ can be placed into the initial population of an evolutionary process, so that they can be recombined to discover further solutions. Say the evolutionary algorithm (EA) has population size $n_p \geq n_\pi$. In standard evolution, the population is initialized with all random solutions. Here, instead the population is initialized with solutions $\hat{\pi}_1 = \pi_1^0, \ldots \hat{\pi}_{n_\pi} = \pi_{n_\pi}^0, \pi_{n_\pi+1}^0, \ldots \pi_{n_p}^0$, where $\pi_{n_\pi+1}^0, \ldots \pi_{n_p}^0$ are generated randomly. Along with their technically required role of filling out the initial population, these random solutions can provide an additional reservoir of exploratory resources for the algorithm. The algorithm then iterates over the following steps:

$$f_i^j = \text{Evaluate}(\pi_i^j, \phi) \forall i \in 1, \ldots, n_p. \qquad (2)$$

$$\{(\pi_k^j, f_k^j)\}_{k=1}^K = \text{Refine}(\{(\pi_i^j, f_i^j)\}_{i=1}^{n_p}), \text{ where } \{(\pi_k^j, f_k^j)\}_{k=1}^K \subset \{(\pi_i^j, f_i^j)\}_{i=1}^{n_p}. \qquad (3)$$

$$\{\pi_i^{j+1}\}_{i=1}^{n_p} = \text{Generate}(\{(\pi_k^j, f_k^j)\}_{k=1}^K). \qquad (4)$$

In the Evaluate step, objective (or fitness) values f (a vector when there are multiple objectives) are computed for each solution in the current population, using the environment predictor $\phi$. In the Refine step, based on these objective values, the population is refined to only include the most promising solutions. In the Generate step, new solutions are generated by combining and perturbing solutions in this refined set, so that there are again $n_p$ solutions in the population. One iteration through these steps is termed a generation. The process terminates after $n_g$ generations. This process is depicted on the right of FIG. 1b.

The Evaluate and Refine steps can generally be implemented independently of model representation. In this example, since neural networks are used to represent the $\hat{\pi}_i$, there is a plethora of possible methods to choose from to implement the Generate step. An established method is used which immediately supports the use of a predictor in evaluation, and which was previously used to evolve prescriptors for IP prescription from scratch, i.e., without taking advantage of distilled models. However, one skilled in the art will appreciate that due to the inherent flexibility of evolutionary algorithms, for any canonical form chosen for the distillation step, it is possible to devise appropriate implementations of Generate in the evolution step.

In this particular example, these 169 prescriptors were distilled into an evolvable neural network architecture equivalent to one previously used to evolve prescriptors from scratch in this domain as described in commonly owned U.S. patent application Ser. No. 17/355,971 (hereafter "'971 application") which is incorporated herein by reference in its entirety. Each distilled prescriptor is a multilayer perceptron ("MLP") with a single hidden layer of 32 units with tan h activation and orthogonal weight initialization. The MLP has one output for each IP, which also uses tan h activation, which is then discretized to yield an integer stringency setting. In addition to the 8 Containment and closure IPs referenced in the '971 application, 4 additional IPs from the Health systems IPs listed in an updated Oxford data set were used the XPRIZE Pandemic Response Challenge as shown in Table 1. The input to the neural network is COVID-19 case data for the previous 21 days.

The case data was presented as cases per 100K residents. This input was found to allow distilled models to fit the training data much more closely than the modified growth rate used in previous work. This improved training is due to the fact that cases per 100K gives a more complete picture of the state of the pandemic; the epidemiological-model-inspired ratio used in prior work explicitly captures the rate of change in cases, but makes it difficult to deduce how bad an outbreak is at any particular moment. Since many diverse submitted prescriptors took absolute case numbers into account, including this in the distillation process allows the distilled prescriptors more closely align with their source.

The output of the prescriptor neural network gives the prescribed IP settings for the next single day. Longer prescribed schedules are generated by autoregressively feeding the output of the prescriptor back into the predictor in a loop. Although it is possible to simplify prescriptions by limiting changes to less frequent periods than one day, here one day is used in order to accommodate the diverse policies of submitted prescriptors in the challenge, which were unconstrained.

The neural network $\hat{\pi}_i$ is trained to generate IPs that match those of $\pi_i$ for day t, given cases for the previous 21 days $t{-}21, \ldots, t{-}1$. The model can then generate multi-day rollouts by autoregressively feeding the generated IPs into the predictor $\phi$ to get predicted new cases for day t, which are used to update the input to $\hat{\pi}_i$.

Data for training $\hat{\pi}_i$ was gathered by collecting the prescriptions made by $\pi_i$ in the XPRIZE Pandemic Response Challenge. Data was gathered for all prescriptions made with uniform IP weights. This consisted of five date ranges, each of length 90 days, and 197 Geos, resulting in $\approx$100K training samples, for each prescriptor, a random 20% of which was used for validation for early stopping.

More formally, each (date range, Geo) pair defines a query q, with $\pi_i(q) \in \mathbb{Z}_5^{90 \times 12}$ the policy generated by $\pi_i$ for this Geo and date range. The predicted daily new cases for this Geo and date range given this policy is $\phi(\pi_i(q)) \in \mathbb{R}^{90}$. Let h be the vector of daily historical new cases for this Geo up until the start of the date range. This query leads to 90 training samples for $\hat{\pi}_i$: For each day t, the target is the prescribed actions of the original prescriptor $\pi_i(g)_t$, and the input is the prior 21 days of cases (normalized by 100K residents) taken from h for prior days before the start of the date range and from $\phi(\pi_i(q))$ for days in the date range.

These models were implemented and trained in Keras using the Adam optimizer. Mean absolute error (MAE) was used as the training loss (since policy actions were on an ordinal scale, with targets normalized to the range [0, 1]).

The method was implemented inside of the LEAF ESP framework, which was previously used to evolve prescriptors for IP prescription from scratch, i.e., without taking advantage of distilled models as described in U.S. patent application Ser. No. 16/831,550 and the '971 application which are incorporated herein by reference. The distillation above results in evolvable neural networks $\hat{\pi}_1, \ldots, \hat{\pi}_{n_\pi}$ which approximate $\pi_1, \ldots, \pi_{n_\pi}$, respectively. These distilled models were then placed into the initial population of a run of ESP, whose goal is to optimize actions given contexts. In standard ESP, the initial population (i.e., before any evolution takes place) consists only of neural networks with randomly generated weights. By replacing random neural networks with the distilled neural networks, ESP starts from diverse high-quality solutions, instead of low-quality random solutions. ESP can then be run as usual from this starting point.

In order to give distilled models a fair chance to reproduce, the population removal percentage was set to 0%, so that solutions could only be replaced once better ones are generated. Also, since the experiments were run as a quantitative evaluation of teams in the XPRIZE competition, distilled models were selected for reproduction inversely proportional to the number of submitted prescriptors for that team. This inverse proportional sampling creates fair sampling at the team level.

A baseline experiment of running evolution from scratch with randomly initialized initial population instead of distilled models was also run. Ten independent evolutionary runs of 100 generations each were run for both the distill & evolve and evolutionary baseline settings.

The task for evolution was to prescribe for 90 days starting on Jan. 10, 2021 for the 20 regions with the most total deaths. Internally, ESP uses the Pareto-based selection mechanism from NSGA-II to handle multiple objectives.

There are many ways to evaluate multi-objective optimization methods. In this description, we compare Pareto fronts. Quantifying performance in this manner is believed to be most useful to a real-world decision maker, because, ideally, the metrics are interpretable and have immediate implications for which method would be preferred in practice.

Each solution generated by each method m in the set of considered methods M yields a policy with a particular average daily cost $c \in [0,34]$ and a corresponding number of predicted new cases $a \geq 0$ [?]. Each method returns a set of solutions which yield a set of objective pairs $S_m = \{(c_i, a_i)\}_{i=1}^{N_m}$. Following the standard definition, one solution $s_1 = (c_1, a_1)$ is said to dominate another $s_2 = (c_2, a_2)$ if and only if $$(c_1 < c_2 \wedge a_1 \leq a_2) \vee (c_1 \leq c_2 \wedge a_1 < a_2),$$

i.e., it is at least as good on each metric and better on at least one. If $s_1$ dominates $s_2$, we write $s_1 \succeq s_2$. The Pareto front $F_m$ of method m is the subset of all $s_i = (c_i, a_i) \in S_m$ that are not dominated by any $s_j = (c_j, a_j) \in S_m$. The following metrics are considered and discussed briefly below: hypervolume (HV); hypervolume improvement (HVI); domination rate (DR); maximum case reduction (MCR); tradeoff coverage rate (TCR) and posterior tradeoff coverage rate (PTCR).

Dominated hypervolume is the most common general-purpose metric used for evaluating multi-objective optimization methods. Given a reference point in the objective space, the hypervolume is the amount of dominated area between the Pareto front and the reference point. The reference point is generally chosen to be a "worst-possible" solution, so the natural choice here is the point with maximum IP cost and number of cases reached when all IPs are set to 0. Call this reference point $s_o = (c_o, a_o)$. Formally, the hypervolume is given by $$\mathrm{HV}(m) = \int_{\mathbb{R}^2} 1[\exists s_* \in F_m : s_* \geq s \wedge s \geq s_o] ds, \qquad (5)$$

where 1 is the indicator function. Note that HV can be computed in time linear in the cardinality of $F_m$. The remaining metrics are relative, in the sense that they are computed with respect to the solutions generated by alternative methods.

HVI is simply the improvement in hypervolume compared to the Pareto front $F_{m_o}$ of a reference method $m_o$:

$$\mathrm{HVI}(m) = \mathrm{HV}(m) - \mathrm{HV}(m_o). \qquad (6)$$

The point of this metric is to normalize for the fact that the raw hypervolume metric is often dominated by empty unreachable solution space.

DR goes by other names such as "Two-set Coverage." It is the proportion of solutions in a reference front $F_{m_o}$ that are dominated:

$$DR(m) = \frac{1}{|F_{m_o}|} \cdot |\{s_o \in F_{m_o} : (\exists s \in F_m : s \succeq s_o)\}|. \qquad (7)$$

The above generic multi-objective metrics can be difficult to interpret from a policy-implementation perspective, since, e.g., hypervolume is in units of cost times cases, and the domination rate can be heavily biased by where solutions on reference Pareto front tend to cluster.

The following two metrics are more interpretable, and thus more directly usable by users of such a system. MCR is the maximum reduction in number of cases that a solution on a Pareto front gives over the reference front:

$$\mathrm{MCR}(m) = \max\{a_o - a_* \forall (s_o = (c_o, a_o) \in F_{m_o}, s_* = (c_*, a_*) \in F_m) : s_* \geq s_o\}. \qquad (8)$$

This means there is a solution in $F_{m_o}$ such that, one could reduce the number of cases by MCR(m), with no increase in cost. If MCR is high, then there are solutions on the reference front that can be dramatically improved. TCR captures how often a decision-maker would prefer solutions from one particular Pareto front among many. Say a decision-maker has a particular cost they are willing to pay when selecting a policy. The tradeoff coverage rate for a method is the proportion of costs whose nearest solution on the combined Pareto front $F_*$ (the Pareto front computed from the union of all $F_m \forall m \in M$):

$$TCR(m) = \frac{1}{c_{max} - c_{min}} \int_{c_{min}}^{c_{max}} 1[\arg\min_{s_* \in F_*} \|c - c_*\| \in F_m] dc, \qquad (9)$$

where $s_* = (c_*, a_*)$. Here, $c_{min} = 0$, and $c_{max} = 34$, since that is the sum of the maximum settings across all IPs. Note that TCR can be computed in time linear in the cardinality of $F_*$. TCR gives a complete picture of the preferability of each method's Pareto front, but is agnostic as to the real preferences of decision-makers. In other words, it assumes a uniform distribution over cost preferences. The final metric adjusts for the empirical estimations of such preferences, so that the result is more indicative of real-world value.

PTCR adjusts the TCR by the real-world distribution of cost preferences, estimated by their empirical probabilities $\hat{p}(c)$ at the same date across all geographies of interest:

$$\mathrm{PTCR}(m) = \int_{c_{min}}^{c_{max}} \hat{p}(c) \cdot 1[\arg\min_{s_* \in F_*} \|c - c_*\| \in F_m] dc. \qquad (10)$$

Note that TCR and PTCR are particular instantiations of the R1 metric, which is abstractly defined as the probability of selecting solutions from one set versus another given a distribution over decision-maker utility functions. In other words, PTCR estimates the percentage of time a decision-maker with a fixed stringency budget would choose a prescriptor from a given approach among those from all approaches. For D&E, PTCR is nearly 100%.

Figure 2A:
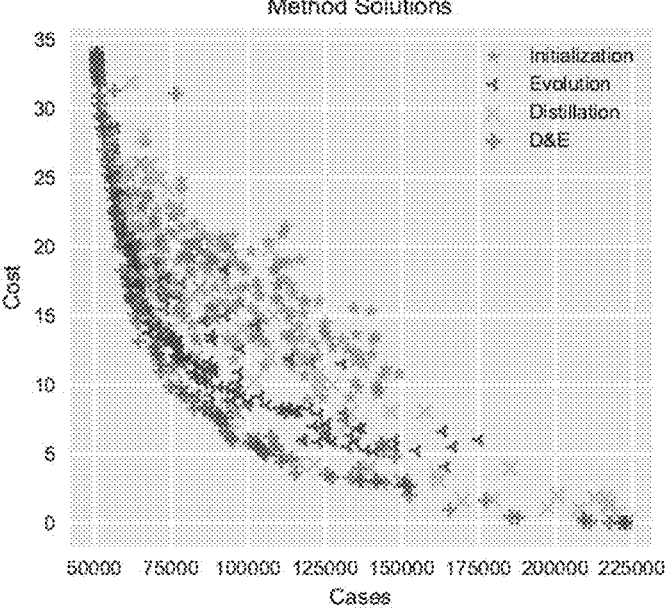
FIGS. 2a, 2b, 2c depict visualizations of comparative solutions, e.g., initialization, evolution from scratch, distillation and D&E, in accordance with embodiments herein.
Figure 2B:
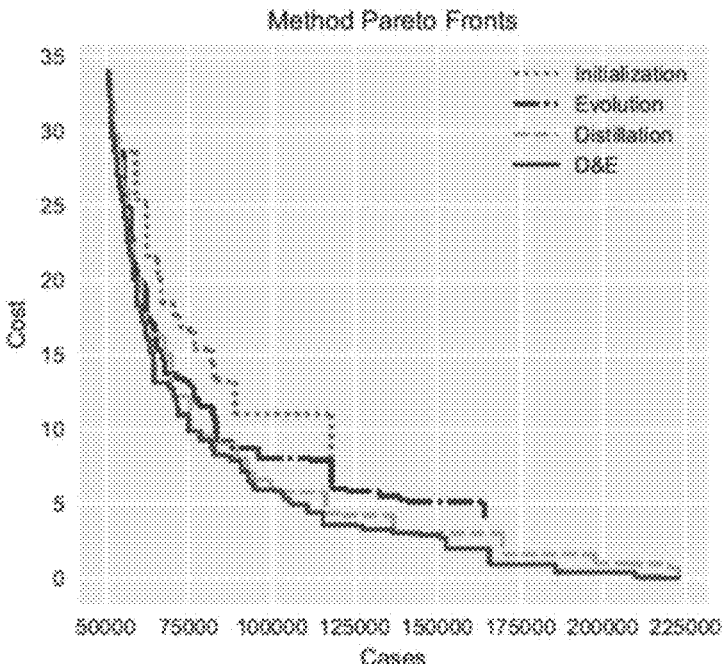
Figure 2C:
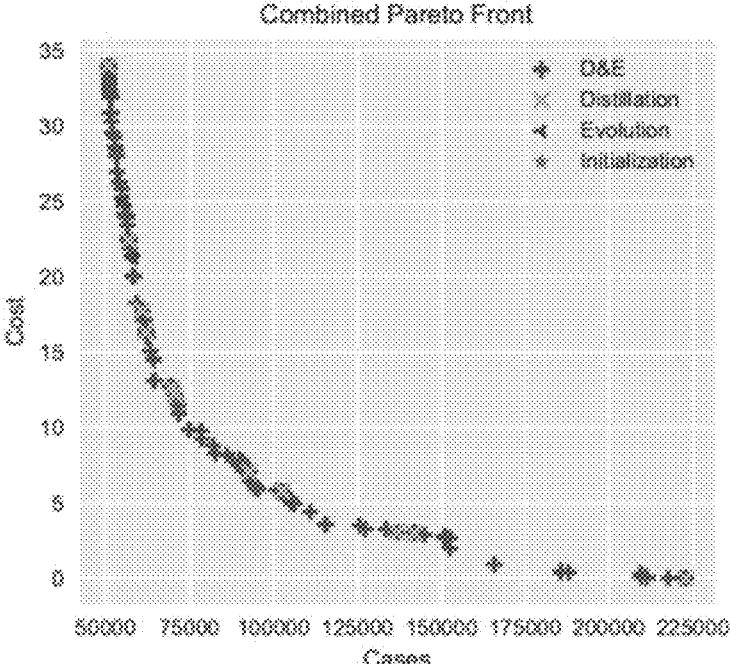
Figures 3A, 3B, 3C:
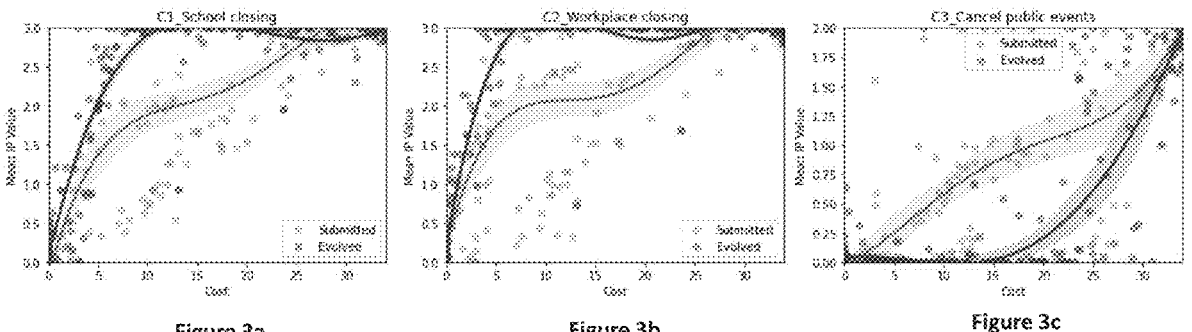

First, a visualization of where the solutions of the different methods fall in the objective is shown in FIG. 2a, 2b, 2c. FIG. 2a shows that D&E smoothly covers the tradeoff space. Some of the distilled models are high-performing, but most are significantly dominated by D&E. Raw evolution does reasonably well with high-cost models, but has difficulty with low-cost. These three methods all substantially outperform the random models at initialization, which find themselves in a dominated clump. FIG. 2*b* shows the Pareto front of each method. Distillation pushes clearly out from evolution and initialization, while D&E pushes even further. FIG. 2*c* shows the solutions on the combined Pareto front, i.e., computed over the union of all methods. From this plot it is clear that D&E yields the preferred solutions over the vast majority of the tradeoff space. Overall, the distilled models substantially outperform both initialization and evolution, thus confirming the efficacy of the distillation process, and D&E does even better, validating the motivation behind initializing evolution with the distilled models.

The results are measured quantitatively in Table 2. Results averaged over ten independent evolutionary runs.

TABLE 2

| Method | TCR | MCR | DR | HVI |
|---|---|---|---|---|
| Initialization | 0.00 | −3458 | 0.00 | −3.57e+6 |
| Evolution | 0.93 | 1795 | 6.06 | −2.30e+6 |
| Distillation | 2.25 | 0 | 0 | 0 |
| D&E | 97.26 | 32452 | 73.94 | 1.39e+5 |

For metrics in the table that require a reference Pareto front to measure performance against (HVI, DR, and MCR), Distillation is used as this reference, since Distillation represents the human-developed solutions, and the goal is to compare the performance of Human+AI (D&E) to human alone. D&E provides quantitative improvements over Distillation across the board. Most strikingly, the TCR of D&E is nearly 100%, meaning that a user, selecting a solution from the Pareto front based on the cost they are willing to pay, will prefer D&E nearly all the time. The D&E models also strongly outperform models evolved from scratch. In fact, the distilled models alone clearly dominate evolution from scratch, showing how evolution strongly benefits from the knowledge of the human-developed solutions. By bootstrapping this knowledge from the distilled models, evolution is able to discover policies that it would not discover on its own.

For each of the twelve IPs, FIGS. 3*a*-31 show trends of how an IP's stringency tends to increase as the overall cost of the policy increases, comparing the trend for the original submitted prescriptors versus the ones discovered with D&E. For some of the IPs, e.g., Restrictions on Internal Movement and International Travel Controls, the trends are very similar, but for some they are notably different. For example, both submitted and D&E models capture the fact that School Closing and Workplace Closing are high-impact interventions, in that their stringency increases quickly as cost moves from 0 to 5, but the preference of D&E models to use these IPs is even stronger, almost unanimously maxing out their stringency by cost 10. On the flip side, the submitted models steadily increase the use of Facial Covering interventions, while the D&E models only use it once the stringency of other interventions is sufficiently high, reflecting real-world evidence that mask-wearing has the biggest relative impact once the pandemic has been sufficiently suppressed through other policies. Overall, these plots show that D&E is not simply "hacking" the predictor by creating small trivial changes to Distilled models, but is coming up with prescriptors that generate fundamentally different policies.

At the high level visible from FIGS. 2*a*, 2*b*, 2*c*, it is clear that D&E models provide a more complete coverage of the overall cases v. cost trade-off space. However, a user may have a more specific set of constraints with which they are working. For example, they may have strong preferences on which IPs they would like to reduce the stringency of. FIGS. 3*a*-31 show that across the Pareto front, the D&E models also provide a more flexible set of choices than the distilled models alone. For example, if the user wants to reduce Facial Coverings there is a choice for them on the Pareto front. Notice that this flexibility is a side-effect of D&E, but one could also encode these constraints explicitly in the evolutionary process.

Now that it is clear that D&E provides benefits over the distilled models, we can look at how D&E provides this result. We first look at the suite of models at a high behavioral level. We define a simple notion of behavioral complexity. Any number of possible measures are possible here, but we choose one that is simple and interpretable, namely, the number of times the prescribed policy changes over the prescribed time period, summed over all Geos and IPs. Formally, it is defined empirically as $$\text{Complexity}(\pi): = \Sigma_{g \in G} \Sigma_{i \in I} \Sigma_{t=1}^{T-1} 1(\pi(q_{git} \neq \pi(q_{gi(t-1)})), \quad (11)$$

where G is the set of Geos, I is the set of IPs, and T is the length of prescriptions in days with t=0 indicating the first day of prescriptions.

Figure 4A:
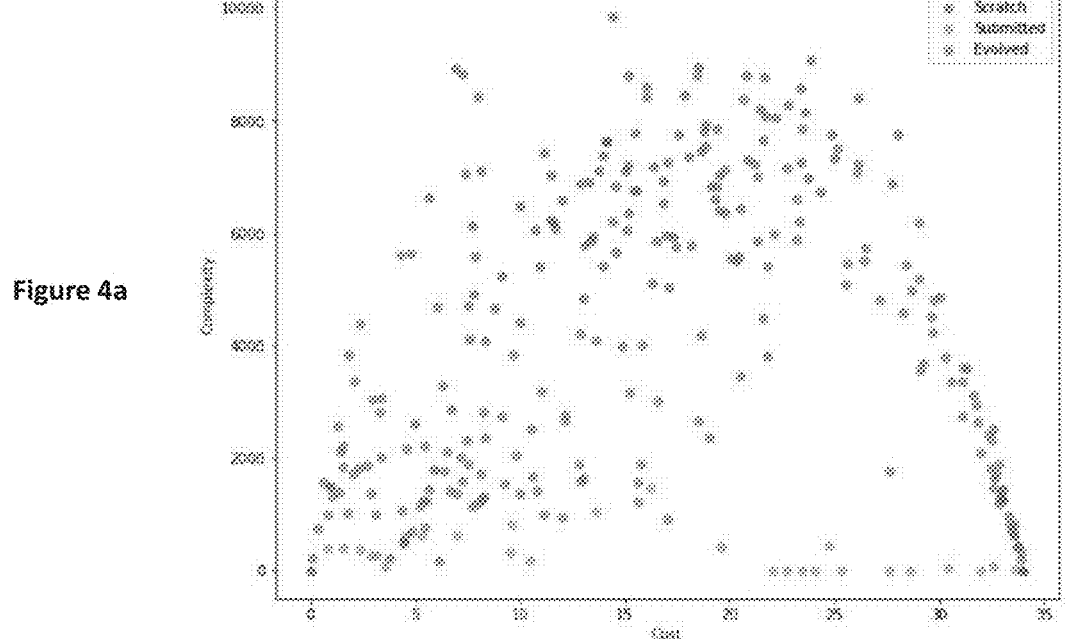
FIGS. 4a, 4b, 4c provide visualizations of policy complexities FIGS. 3a, 3b, 3c, in accordance with embodiments herein.
Figure 4B:
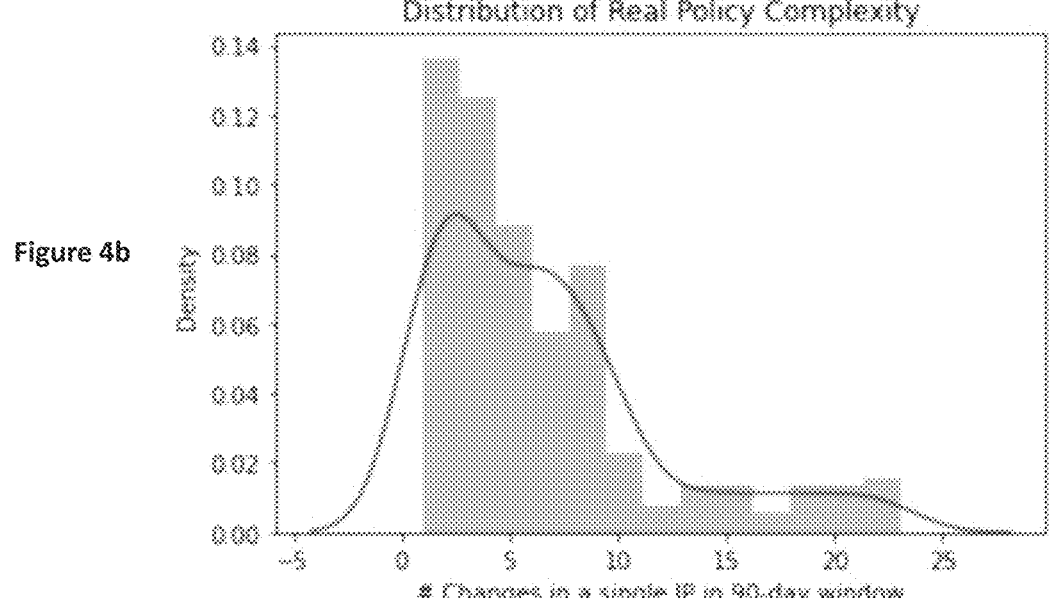
Figure 4C:
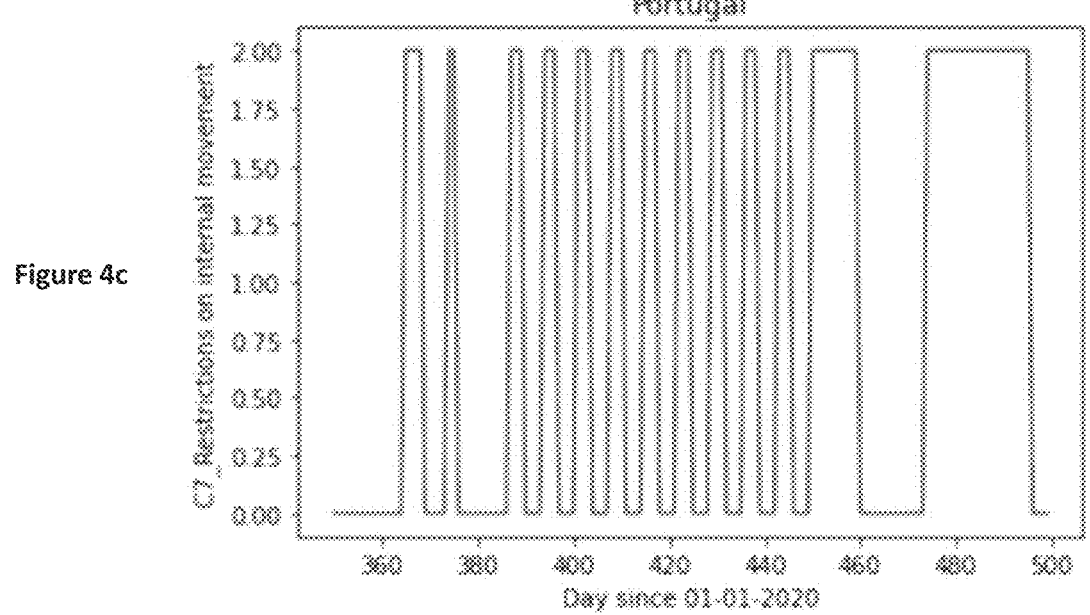
Figure 5A:
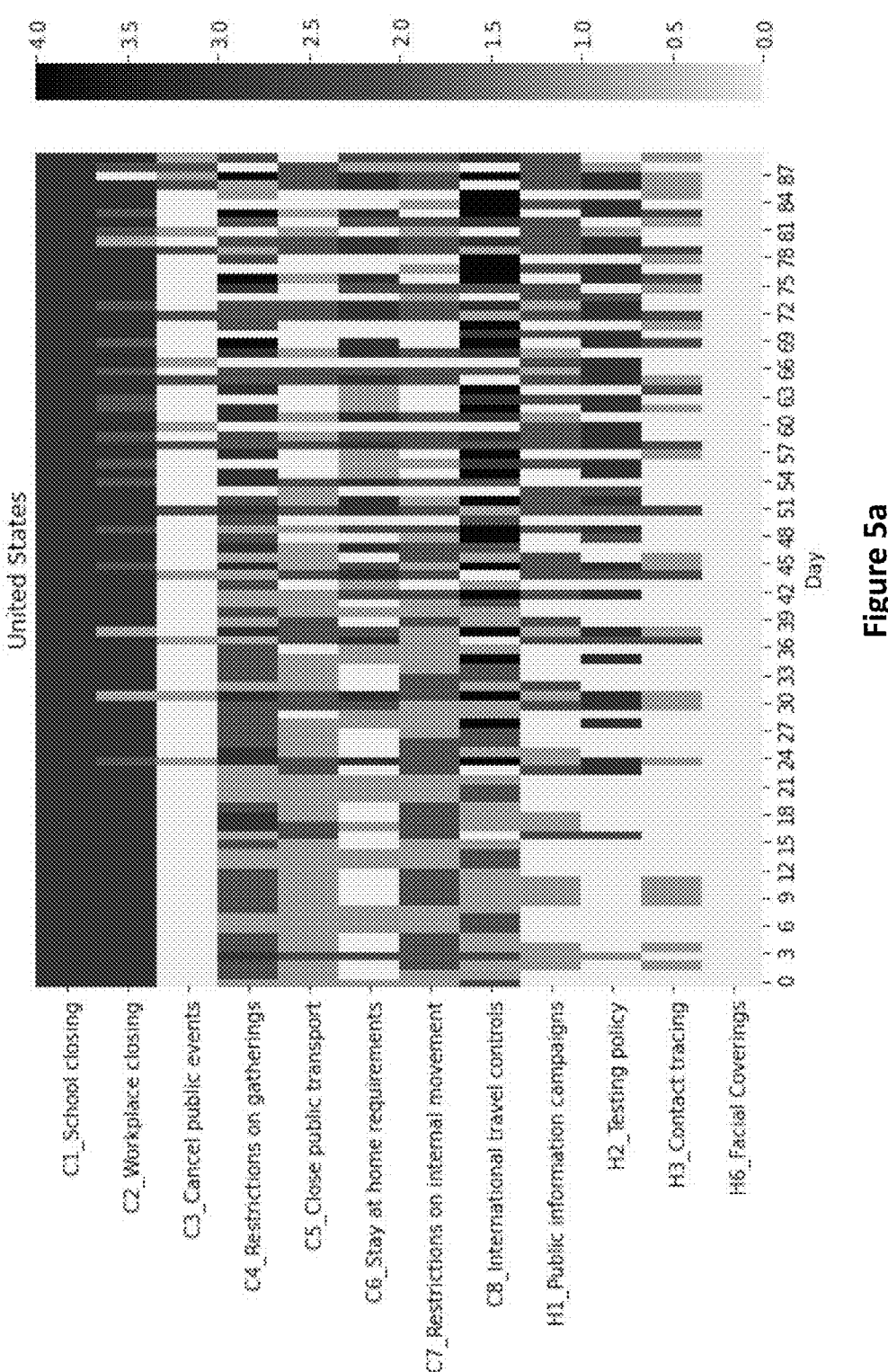
FIGS. 5a, 5b, 5c, 5d, 5e, 5f, 5g, 5h plot policies for the highest-complexity D&E prescriptor model on a daily cycle for select geographic regions/countries, in accordance with embodiments herein.
Figure 5B:
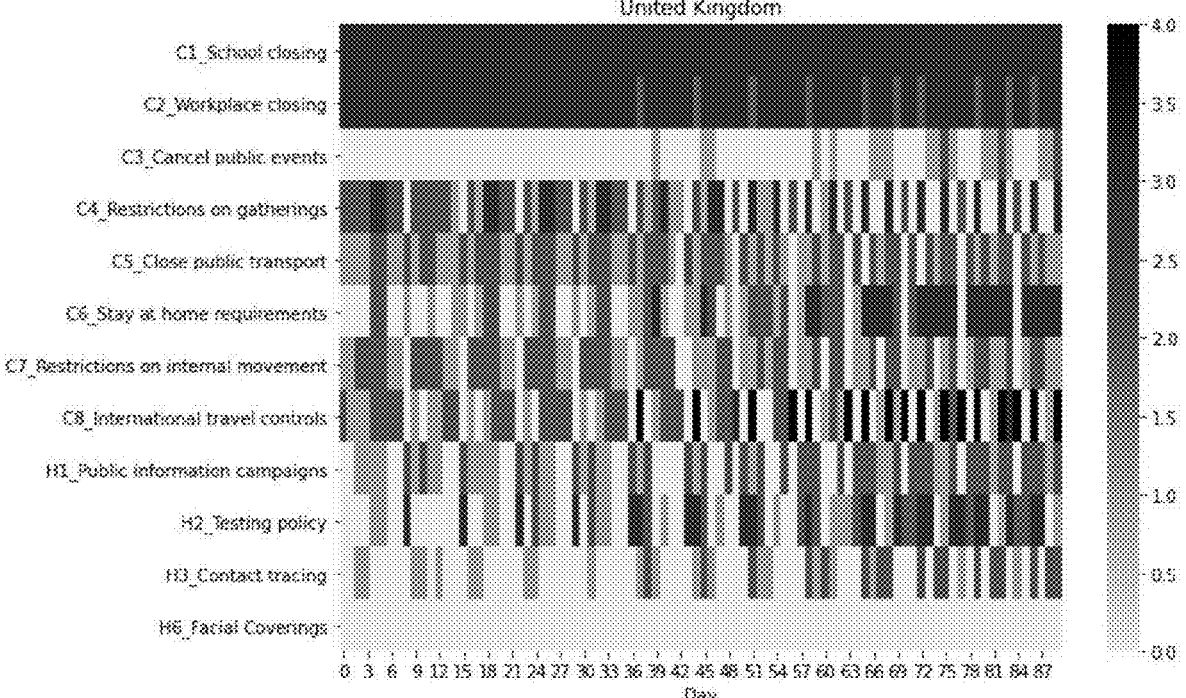
Figure 5C:
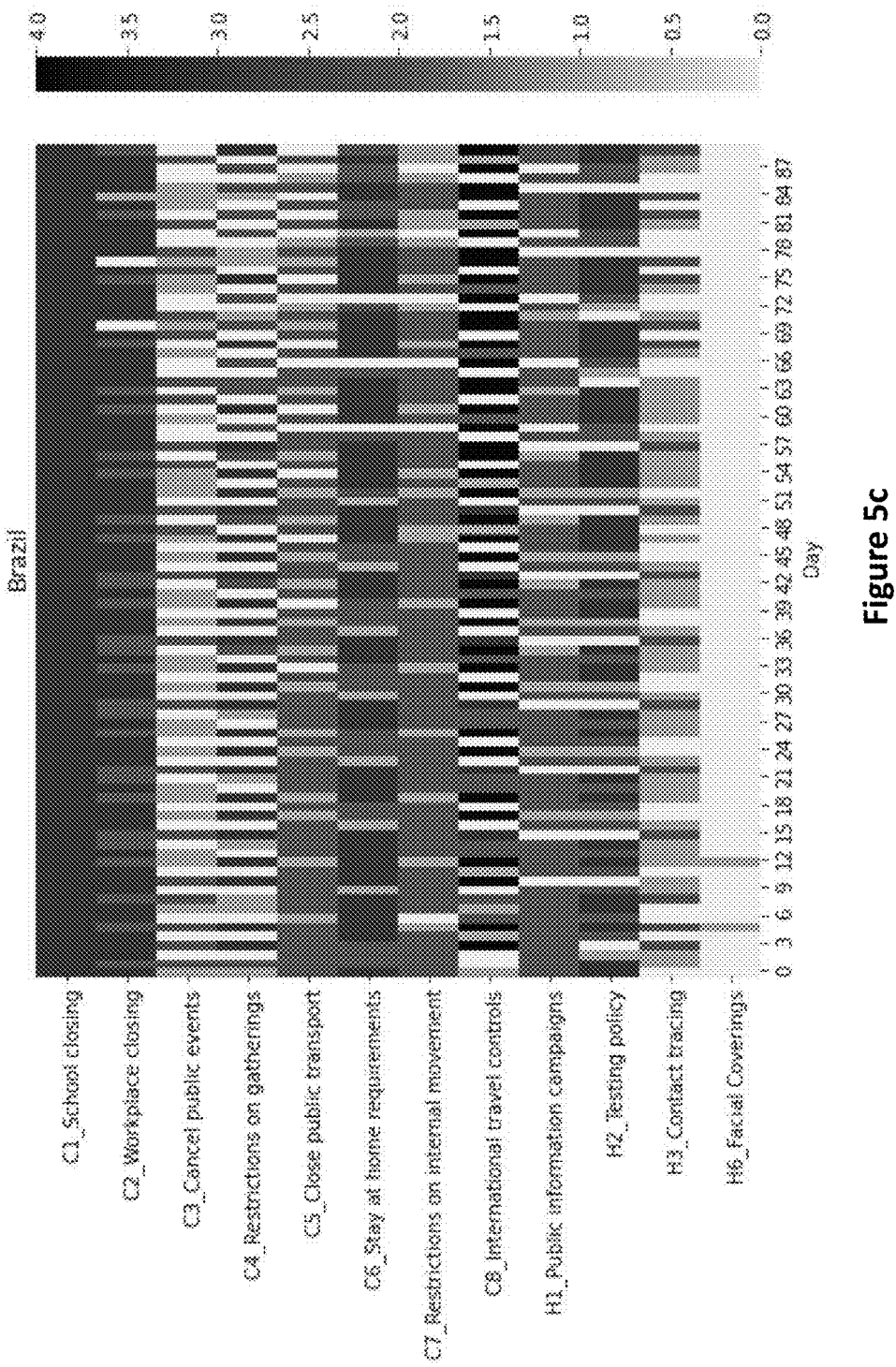
Figure 5D:
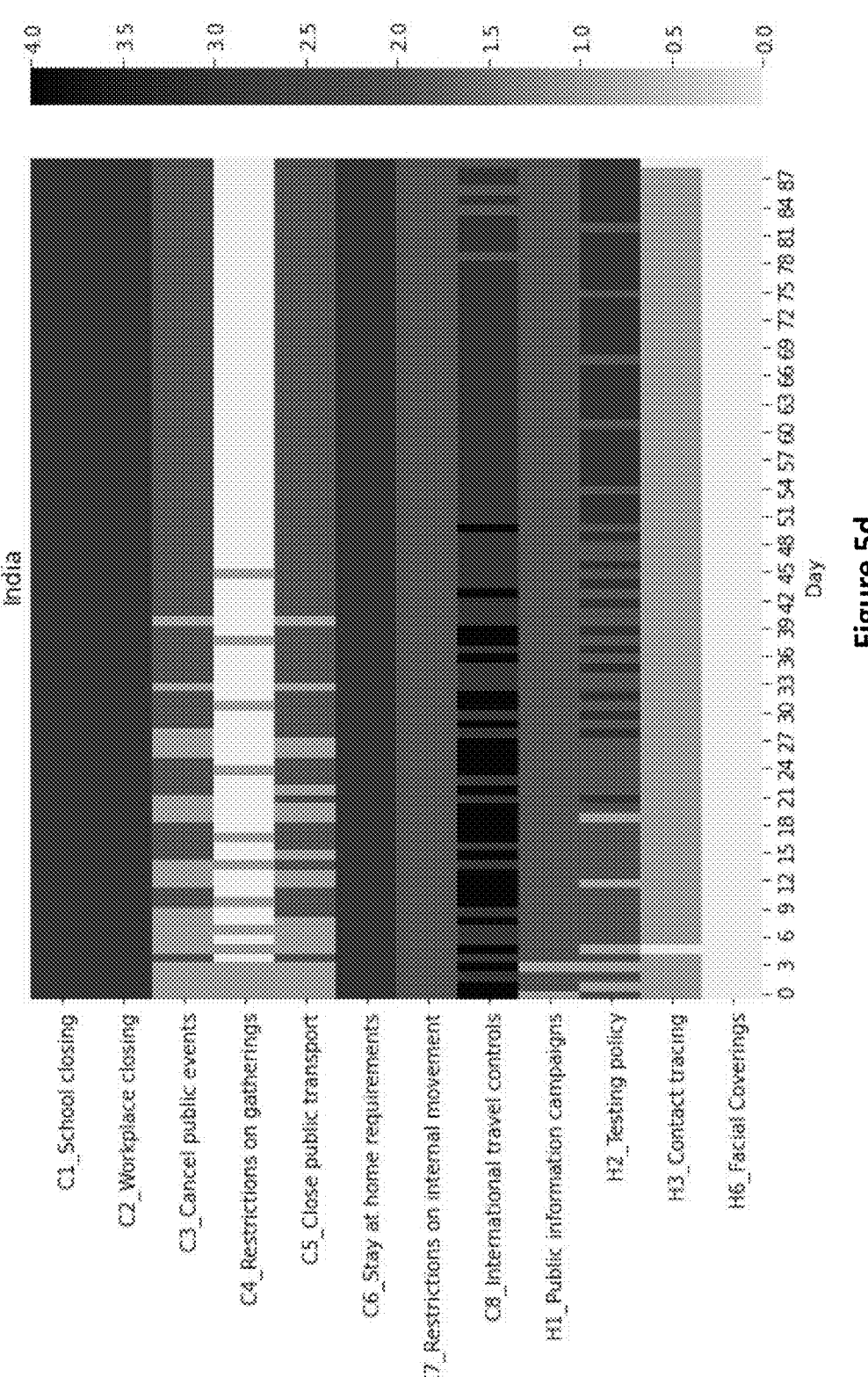
Figure 5E:
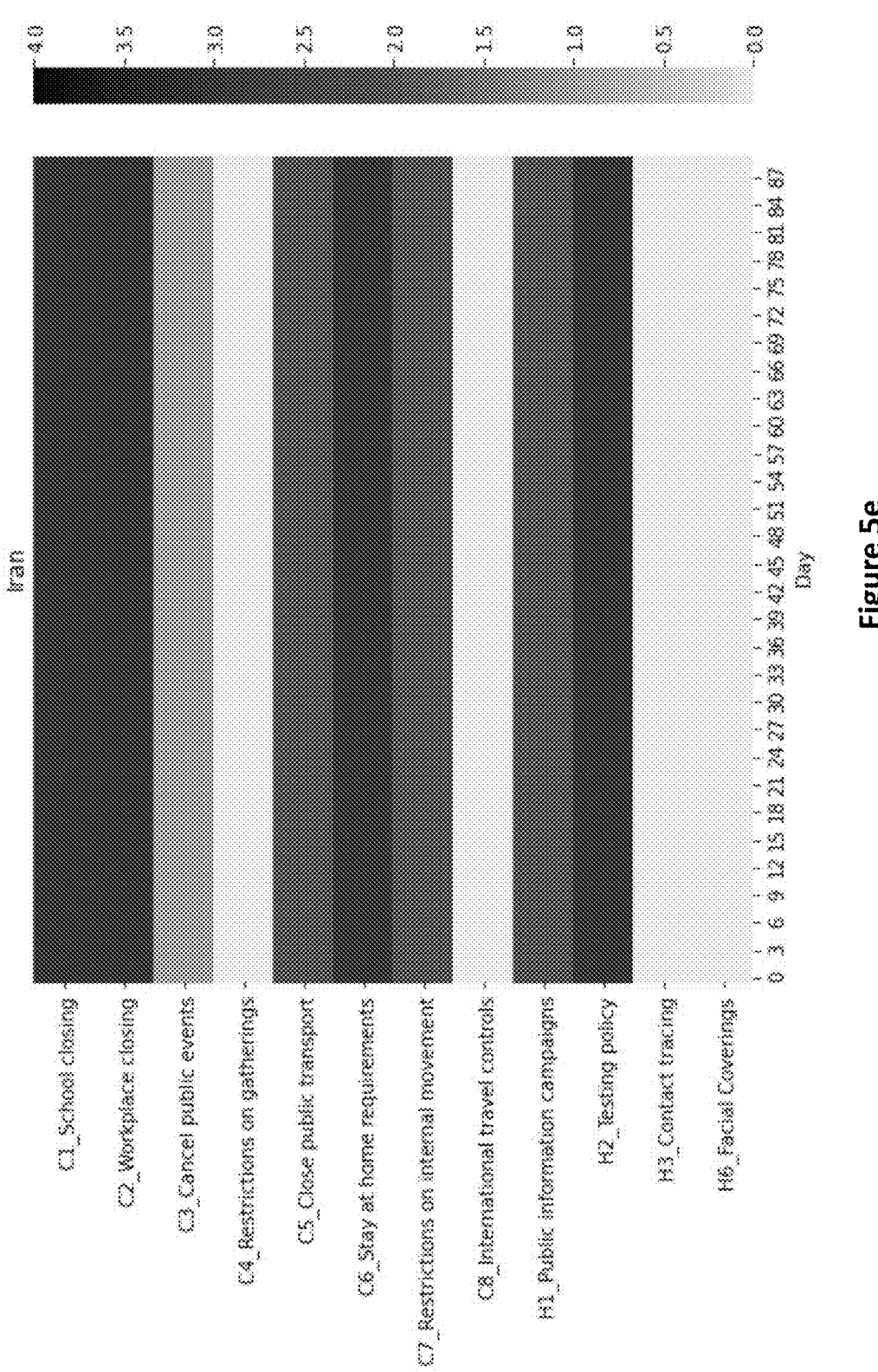
Figure 5F:
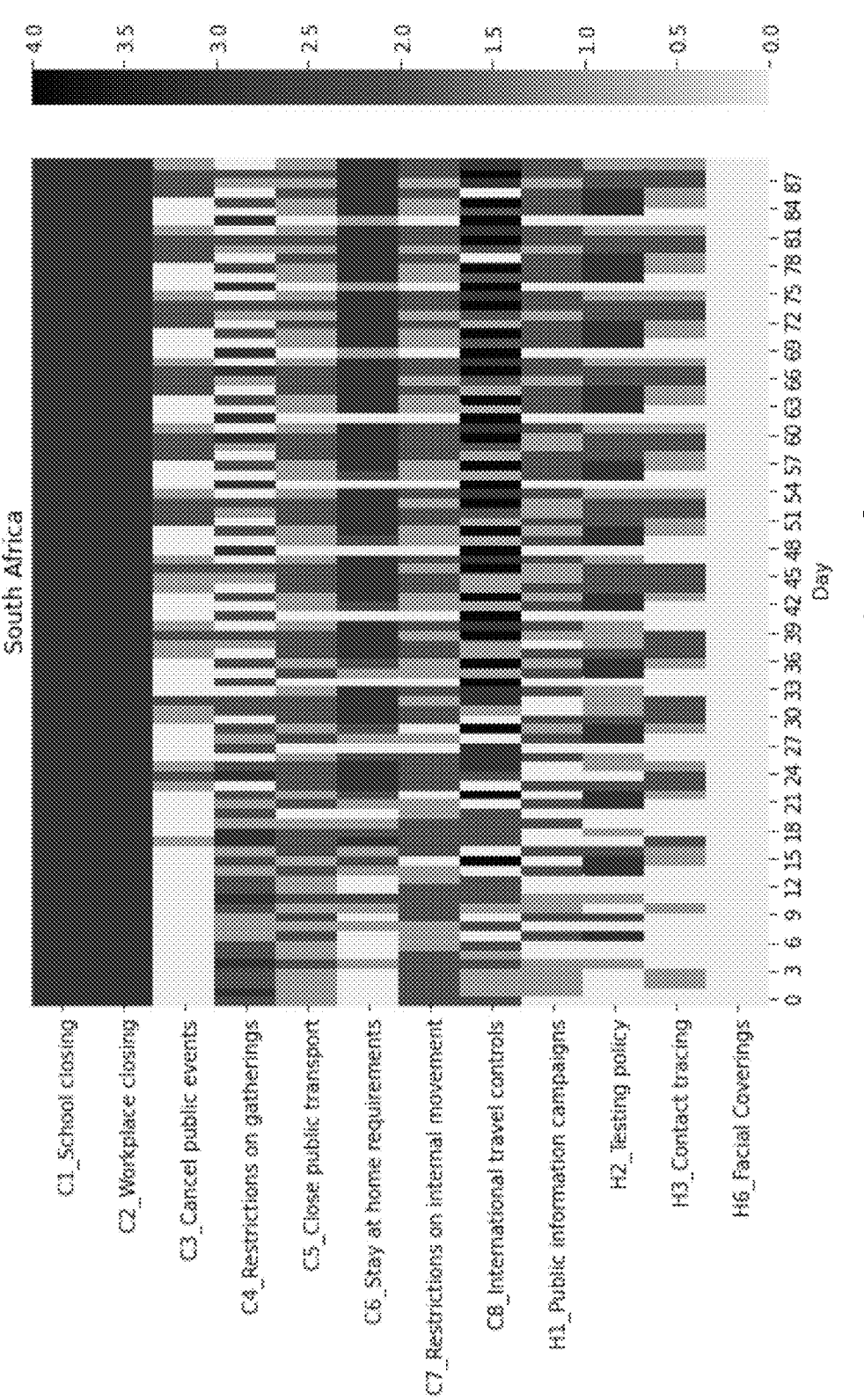
Figure 5G:
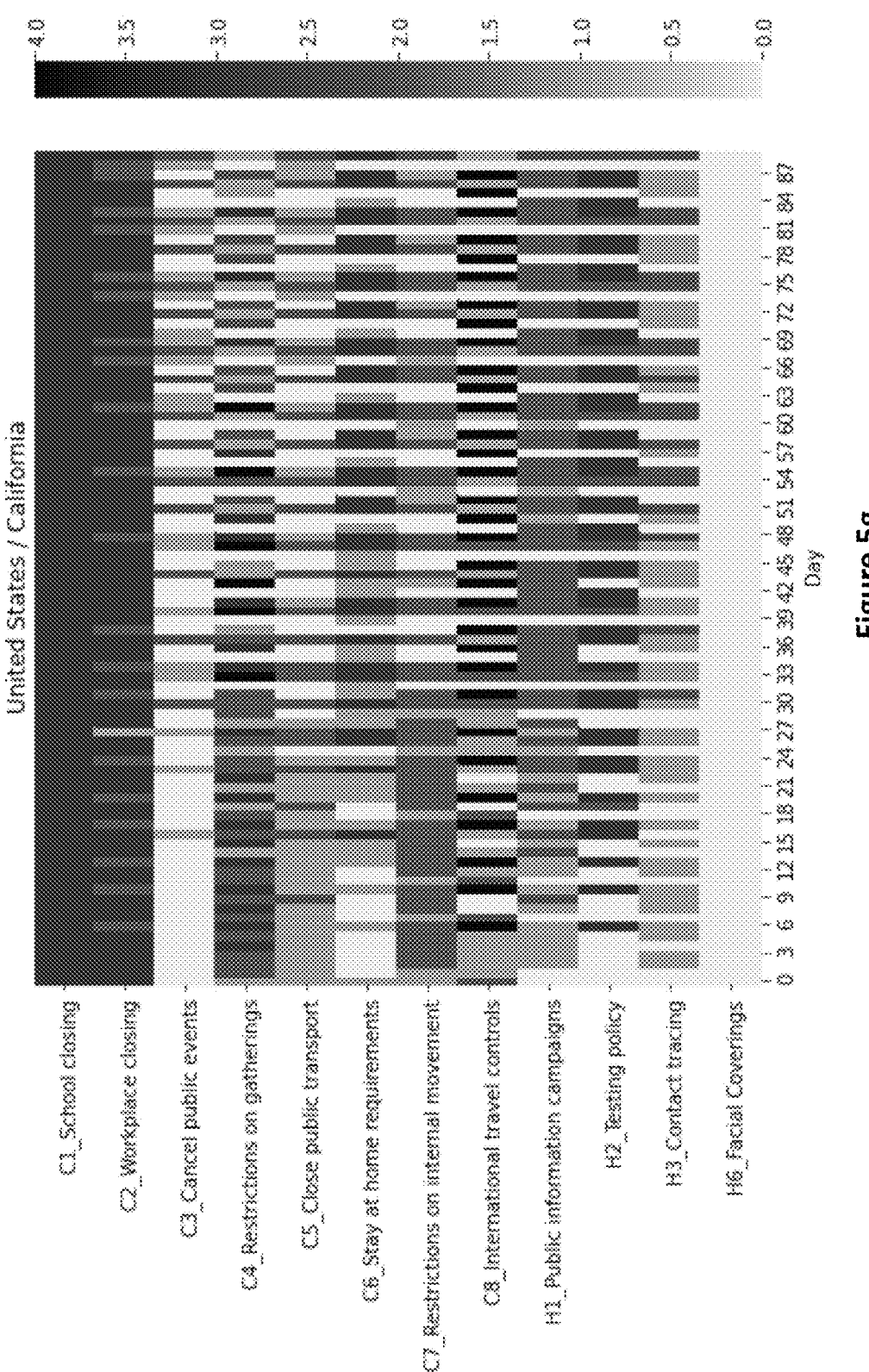
Figure 5H:
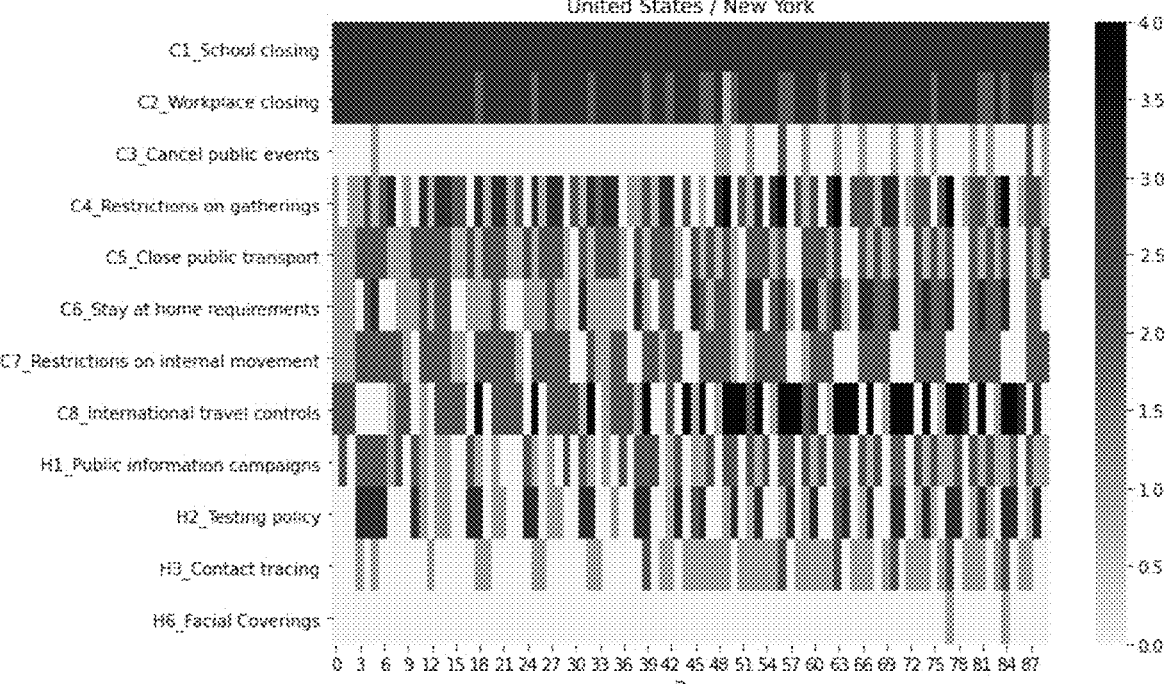
Figure 6A:
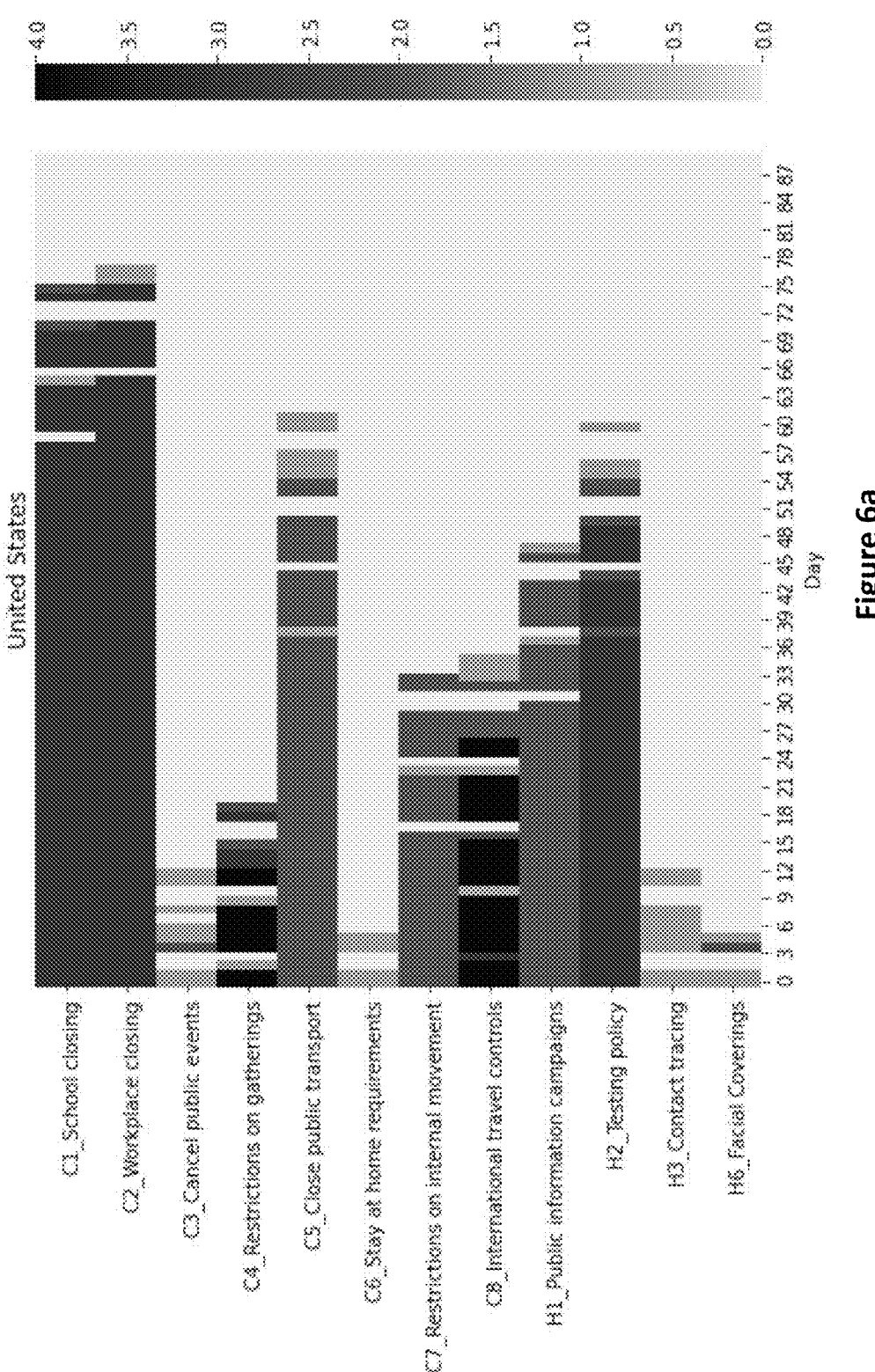
FIGS. 6a, 6b, 6c, 6d, 6e, 6f, 6g, 6h plot policies for the highest-complexity model submitted as part of the XPRIZE challenge on a daily cycle for select geographic regions/countries, in accordance with embodiments herein.
Figure 6B:
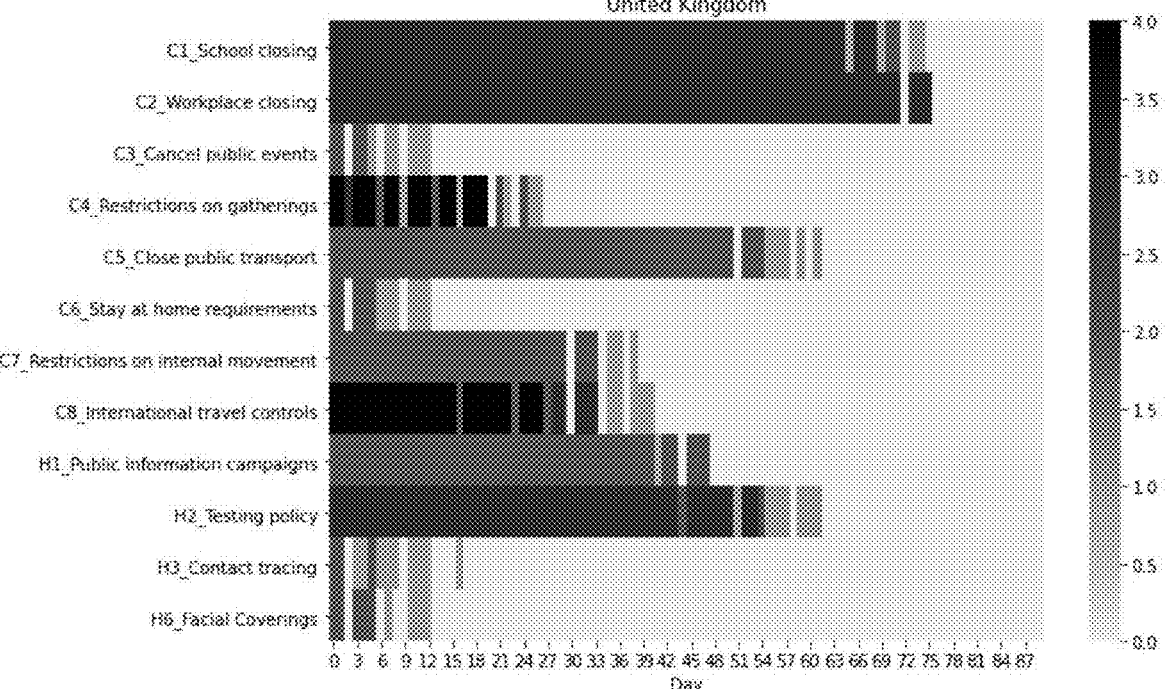
Figure 6C:
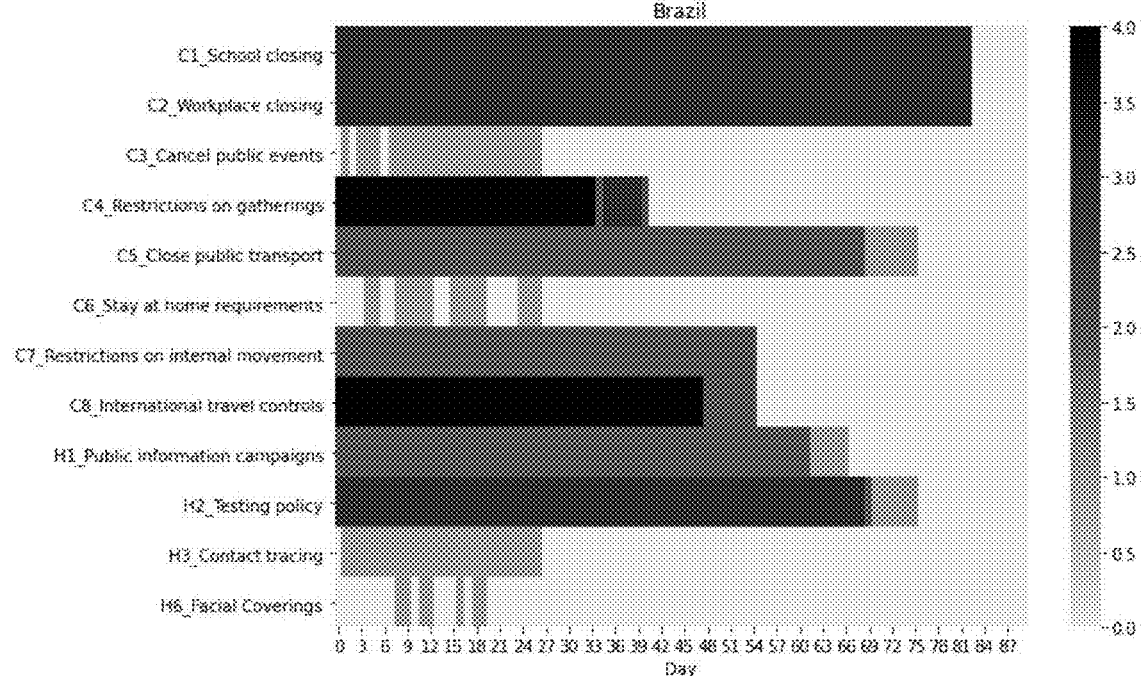
Figure 6D:
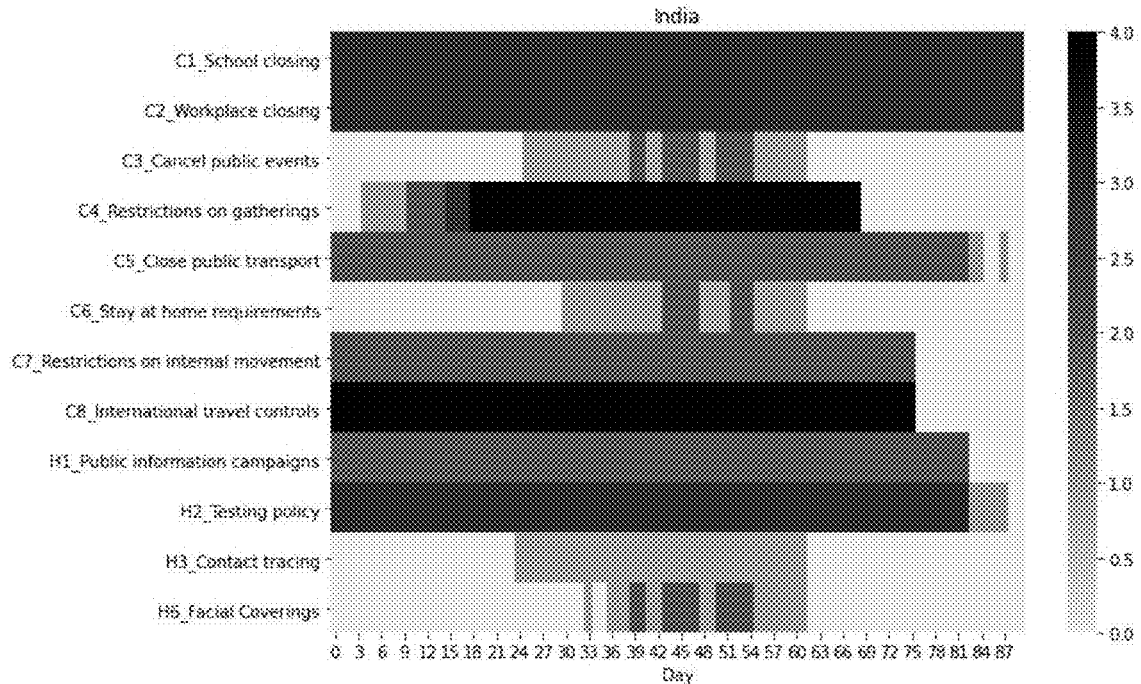
Figure 6E:
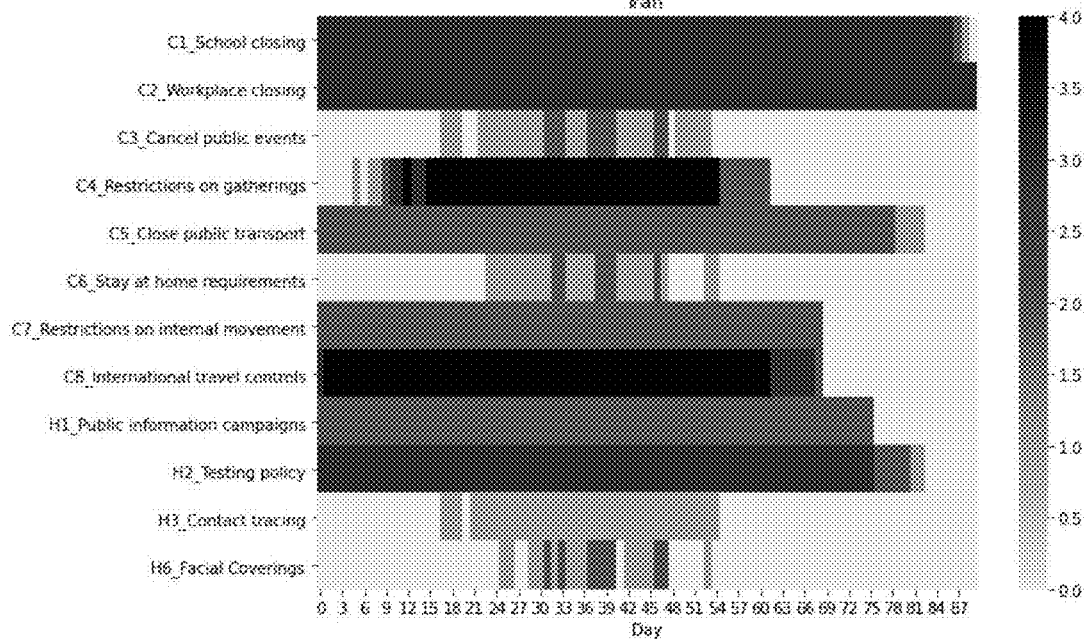
Figure 6F:
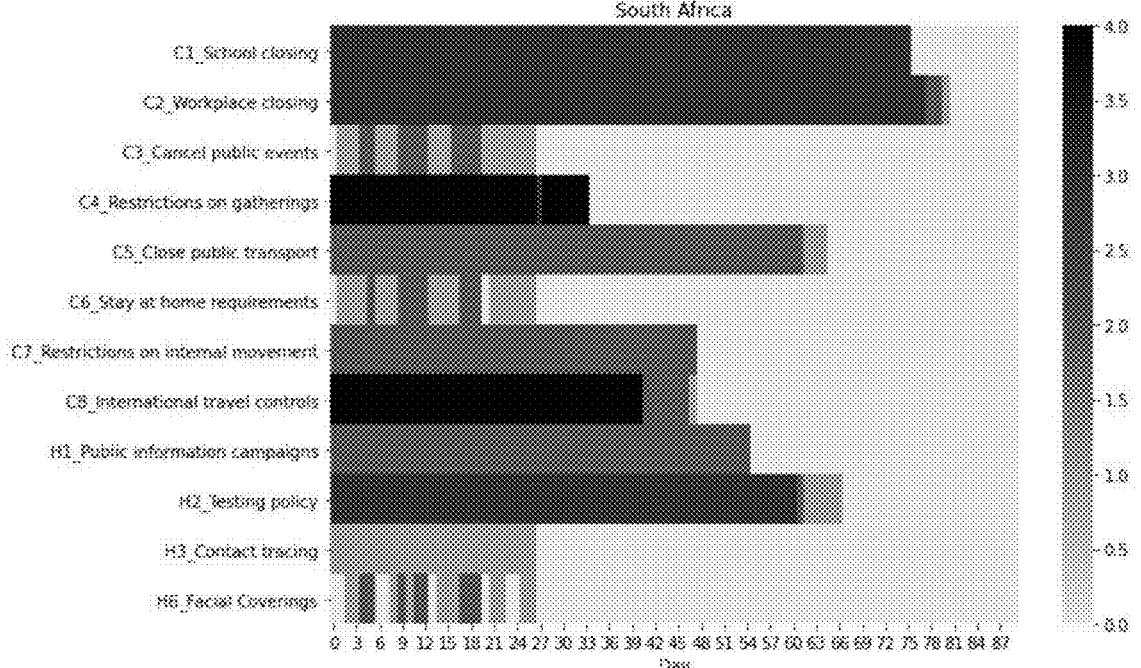
Figure 6G:
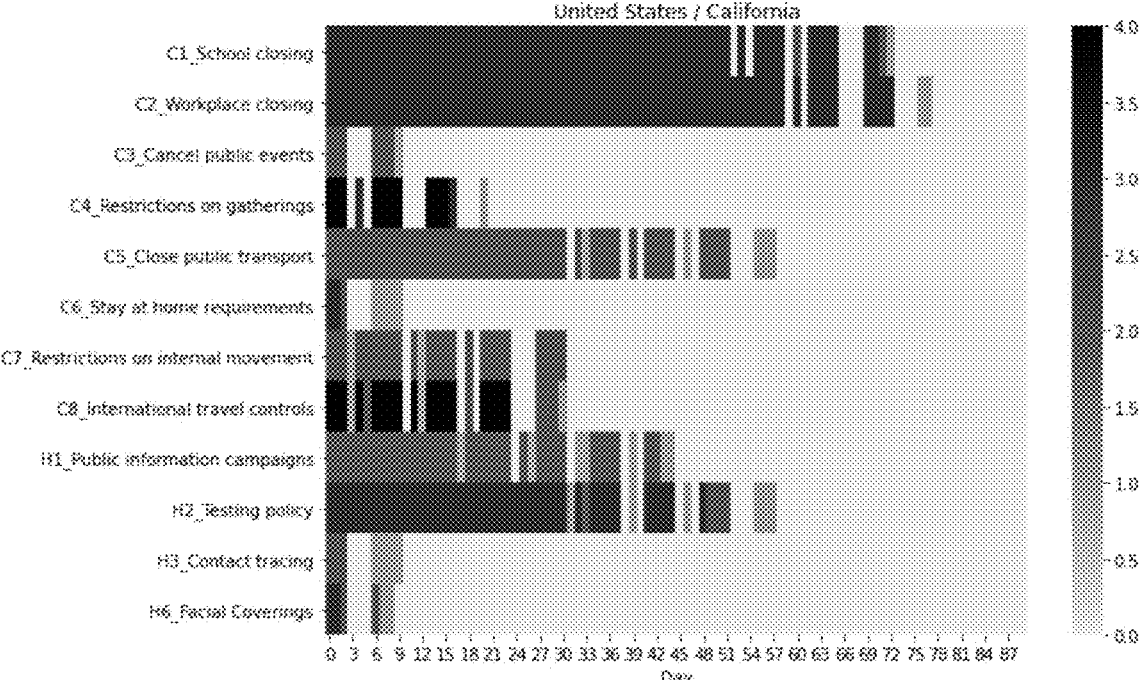
Figure 6H:
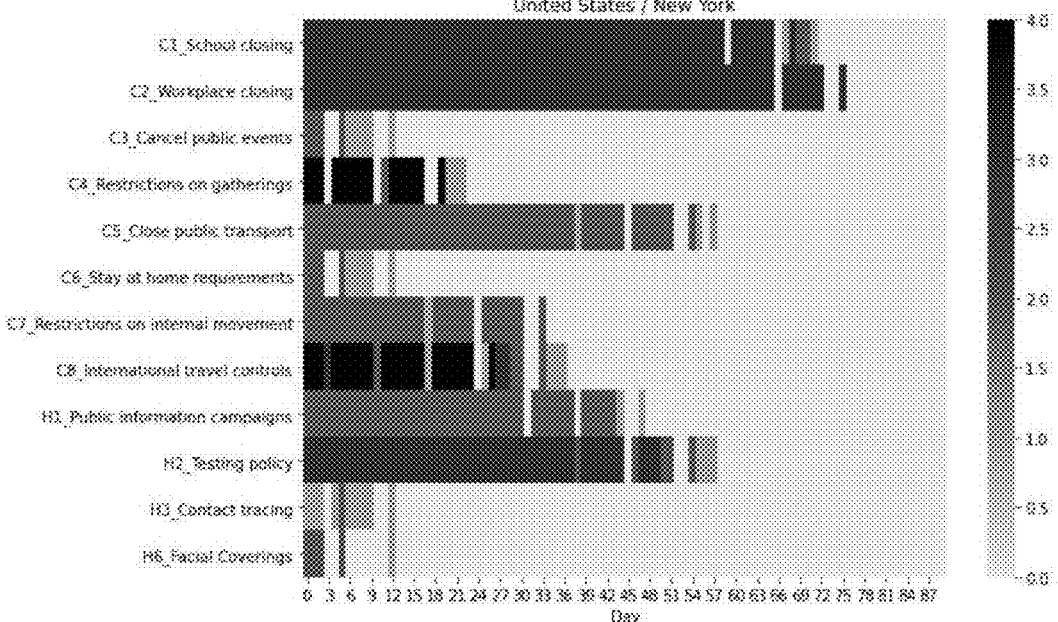
Figure 7A:
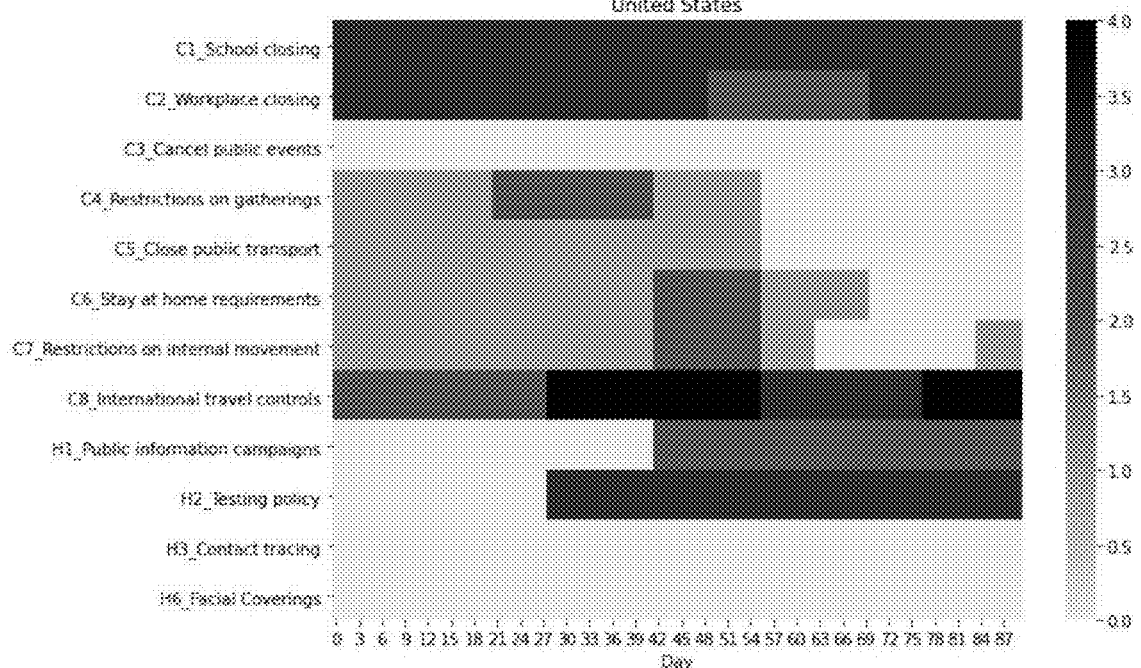
FIGS. 7a, 7b, 7c, 7d, 7e, 7f, 7g, 7h plots policies for the highest-complexity D&E prescriptor model on a weekly cycle for select geographic regions/countries, in accordance with embodiments herein.
Figure 7B:
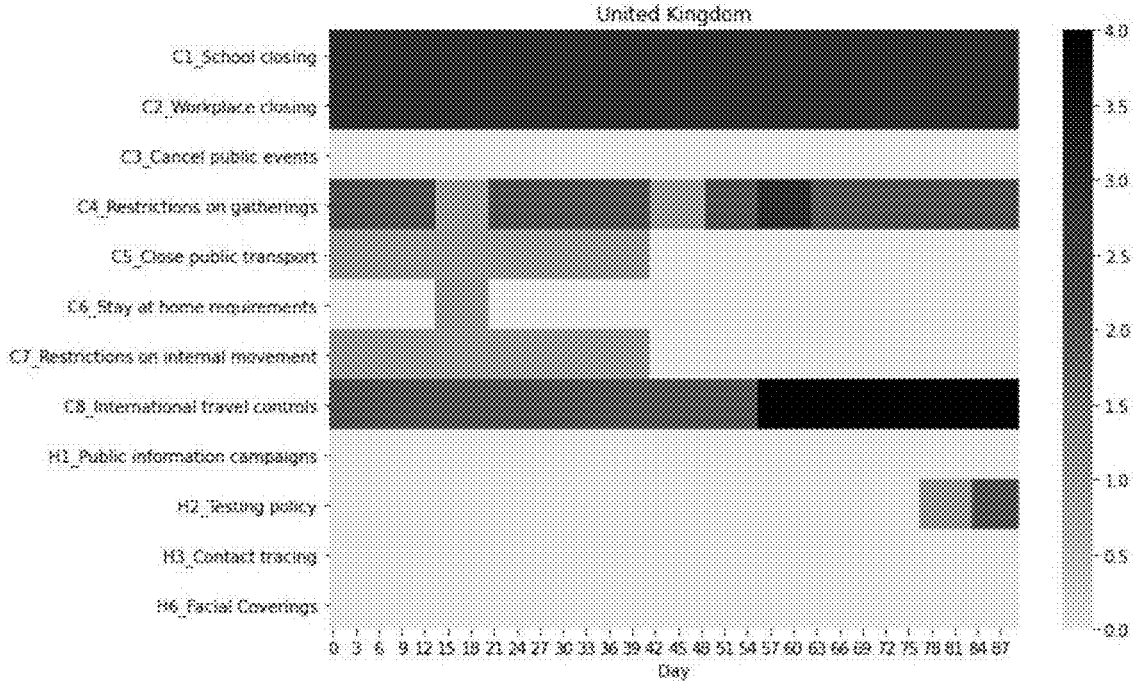
Figure 7C:
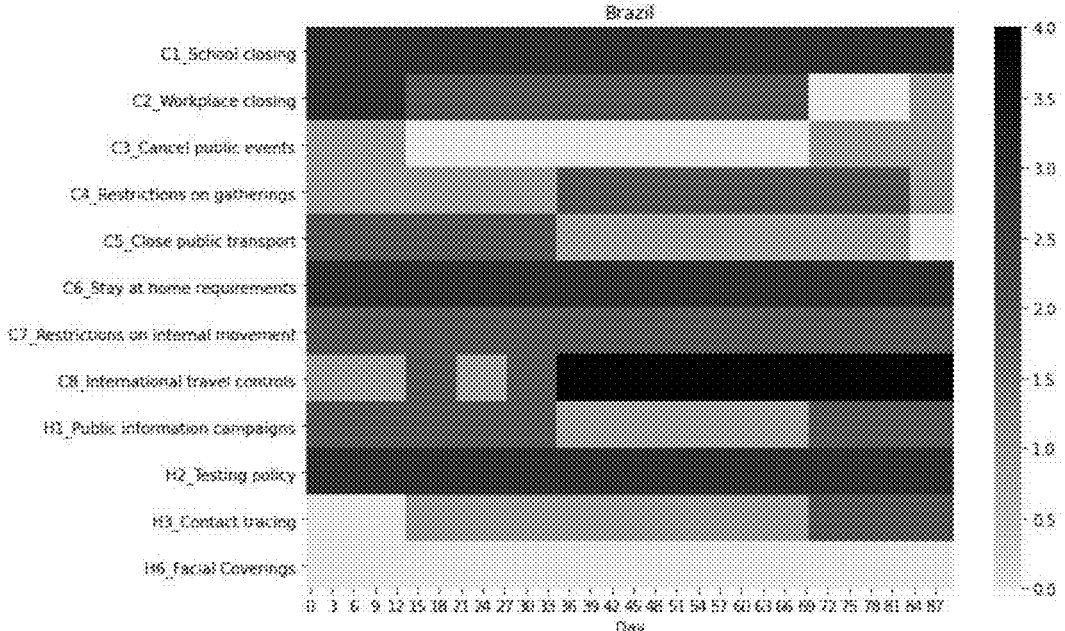
Figure 7D:
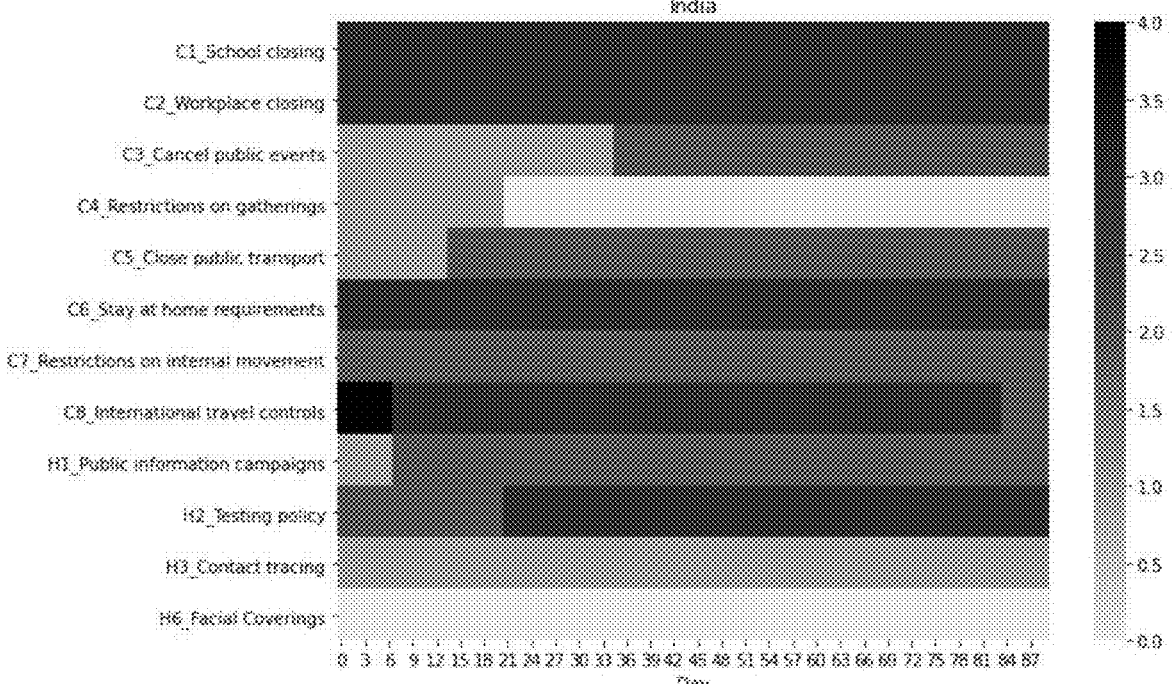
Figure 7E:
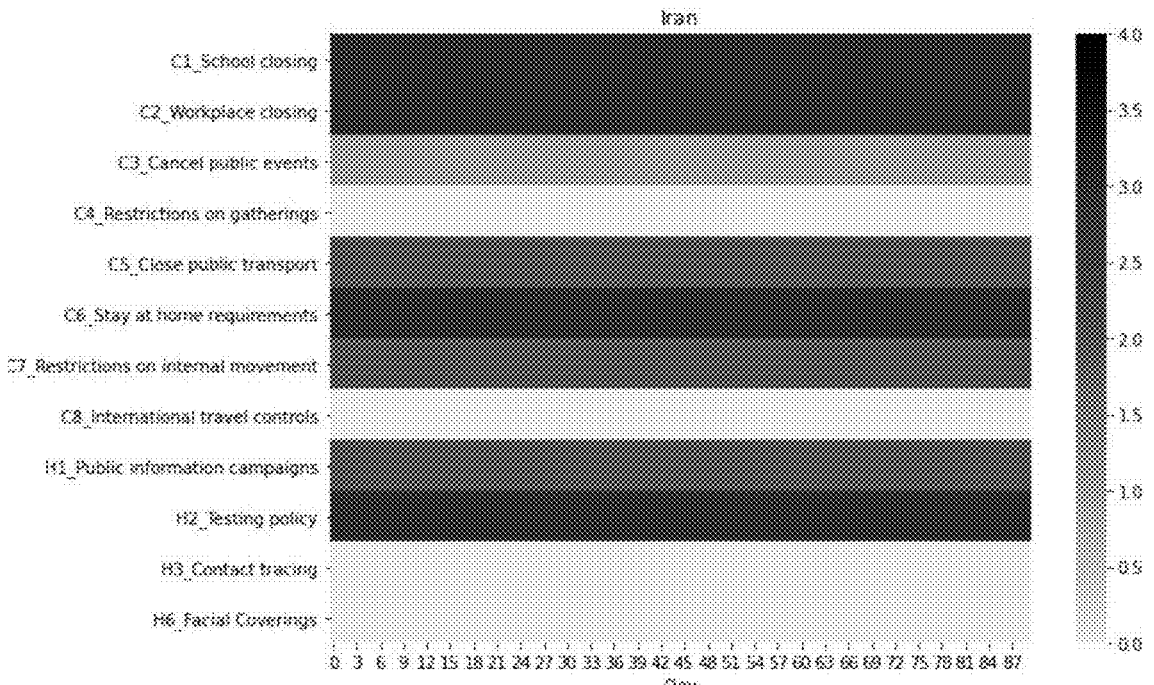
Figure 7F:
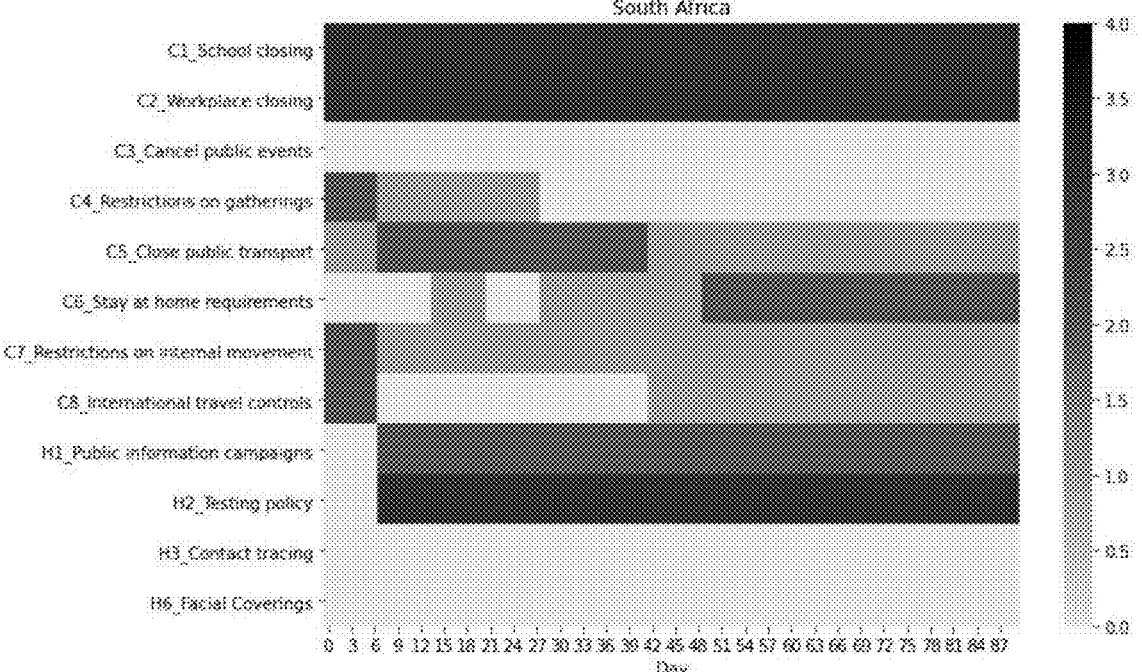
Figure 7G:
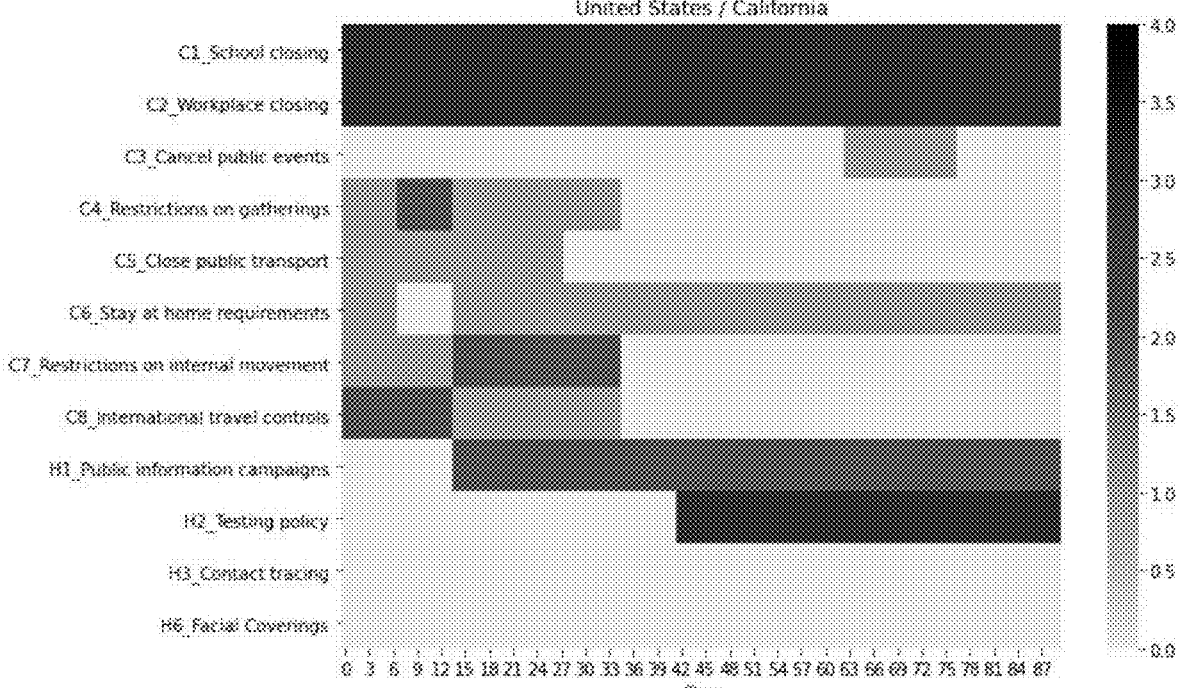
Figure 7H:
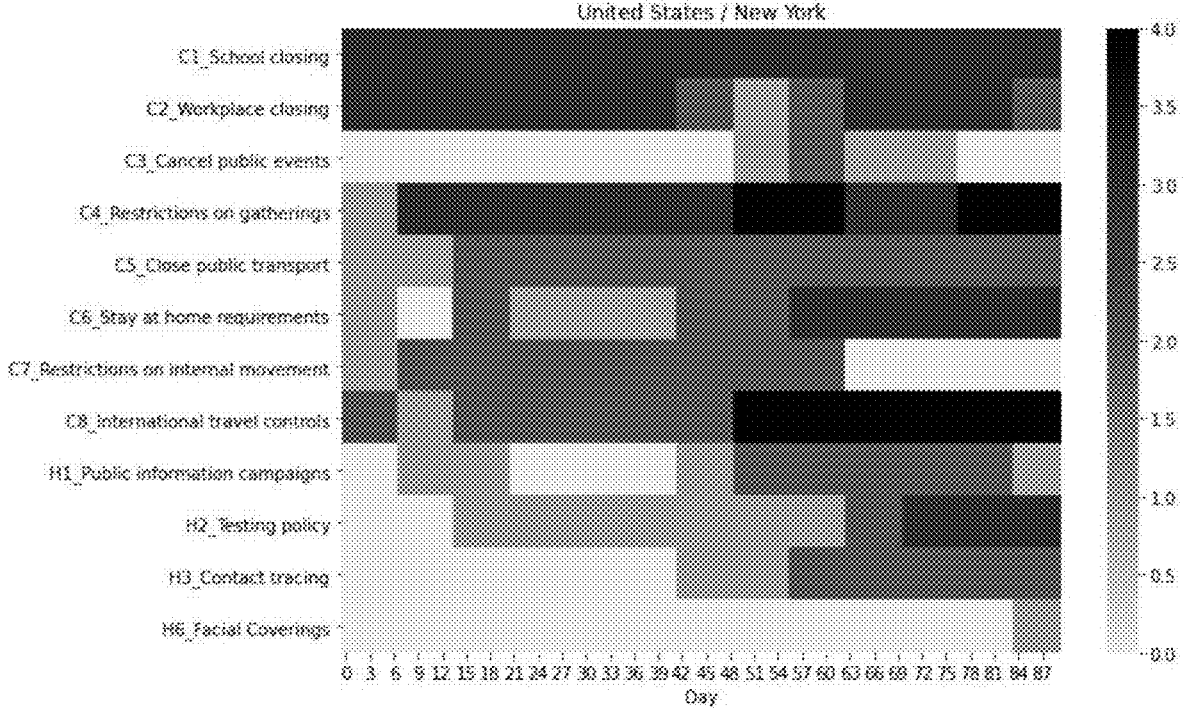
Figure 8A:
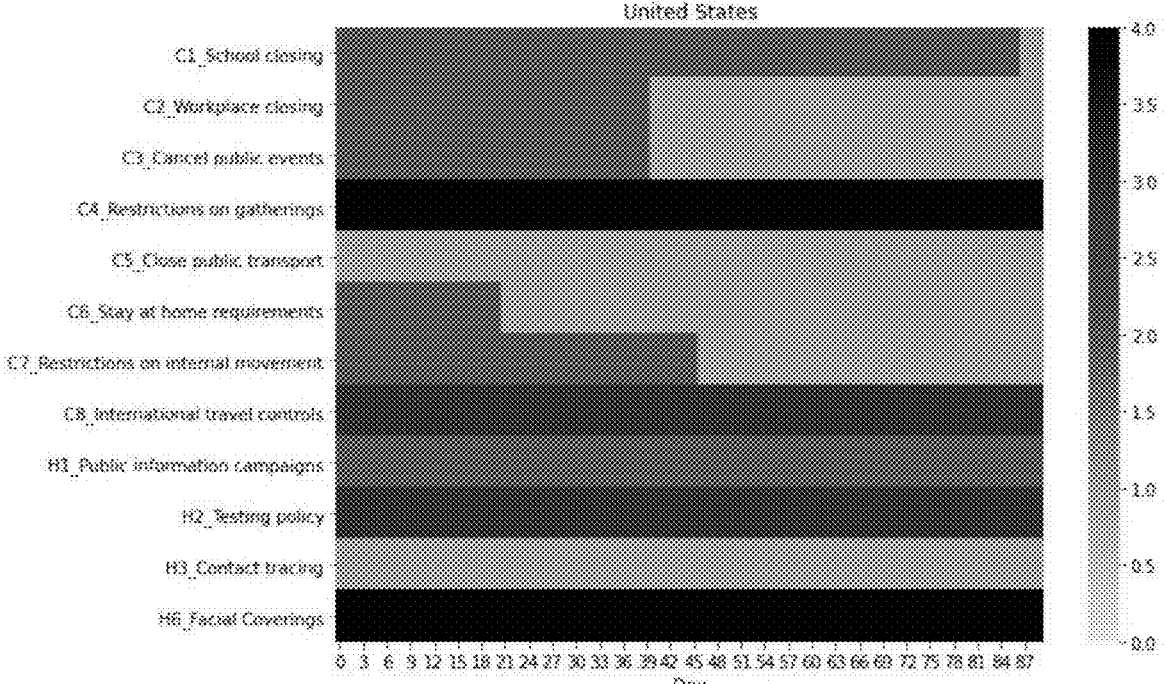
FIGS. 8a, 8b, 8c, 8d, 8e, 8f, 8g, 8h plots real-world policies that were implemented for select geographic regions/countries, in accordance with embodiments herein.
Figure 8B:
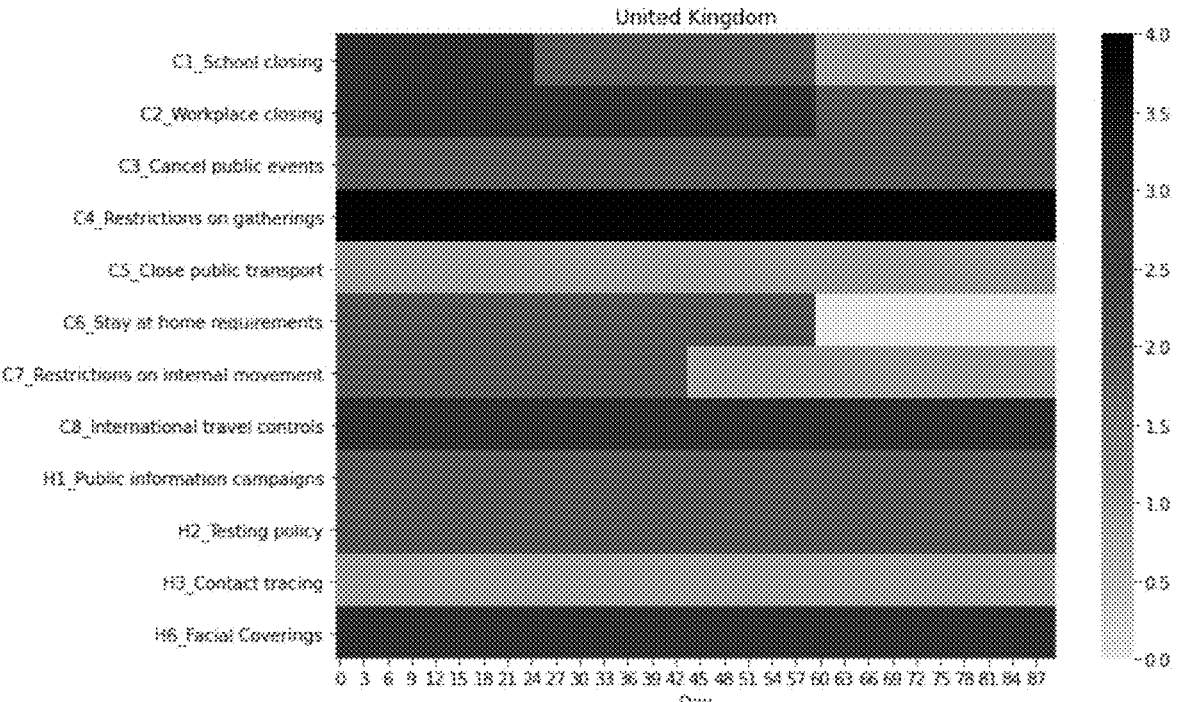
Figure 8C:
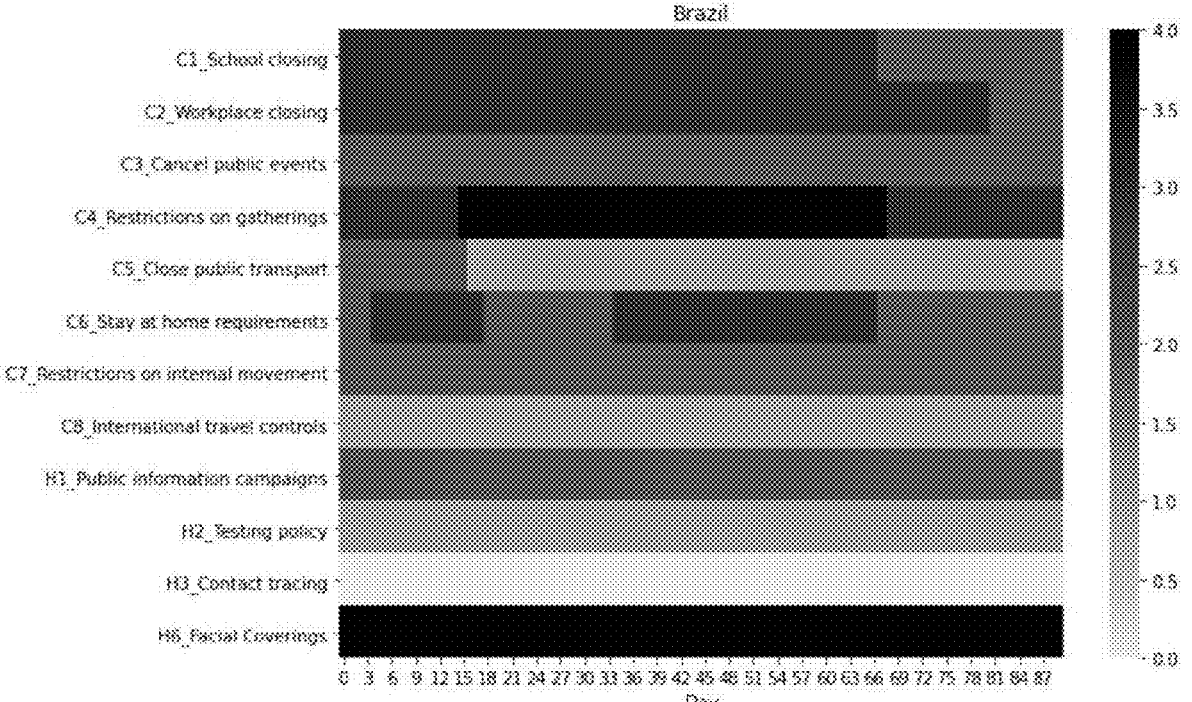
Figure 8D:
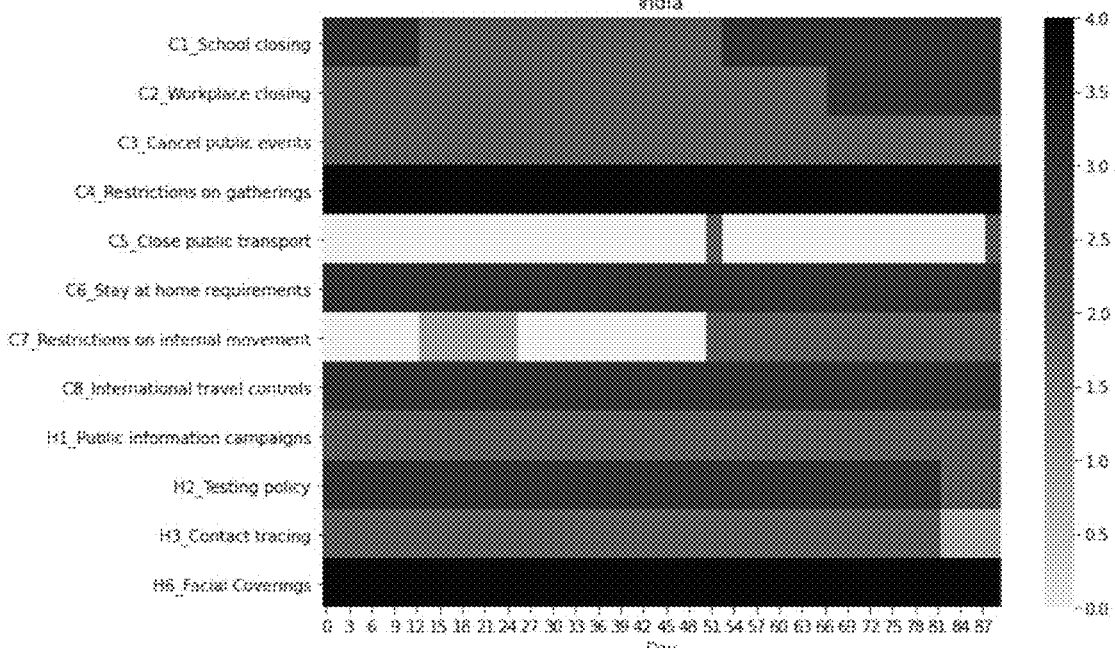
Figure 8E:
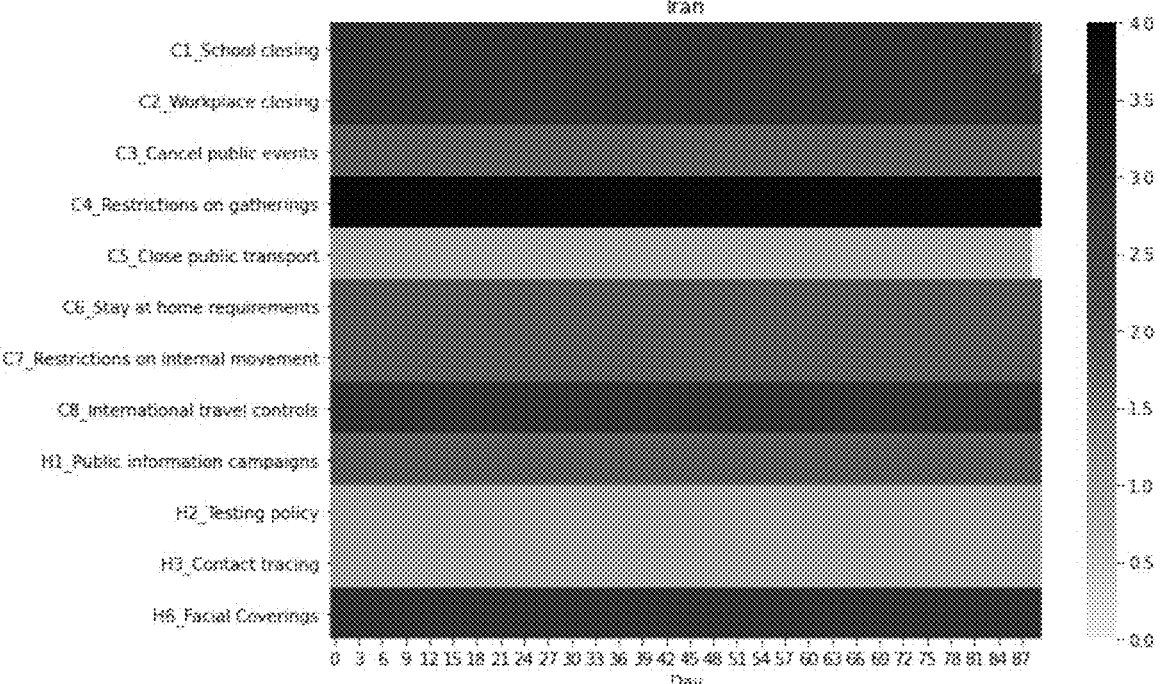
Figure 8F:
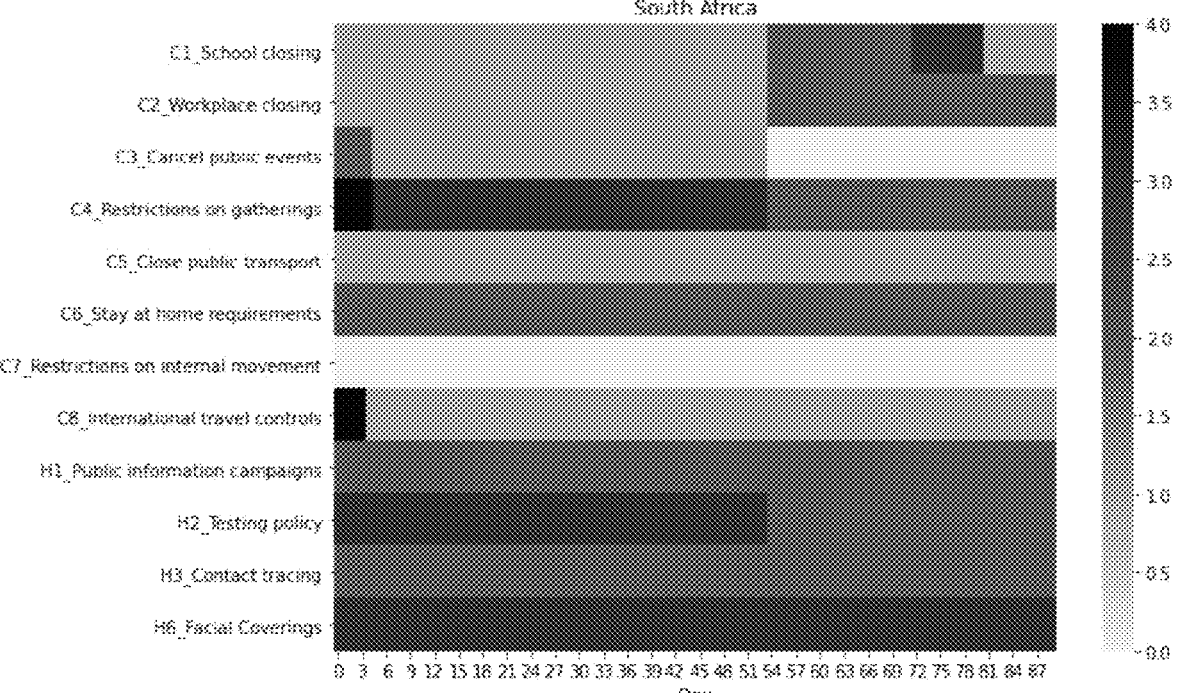
Figure 8G:
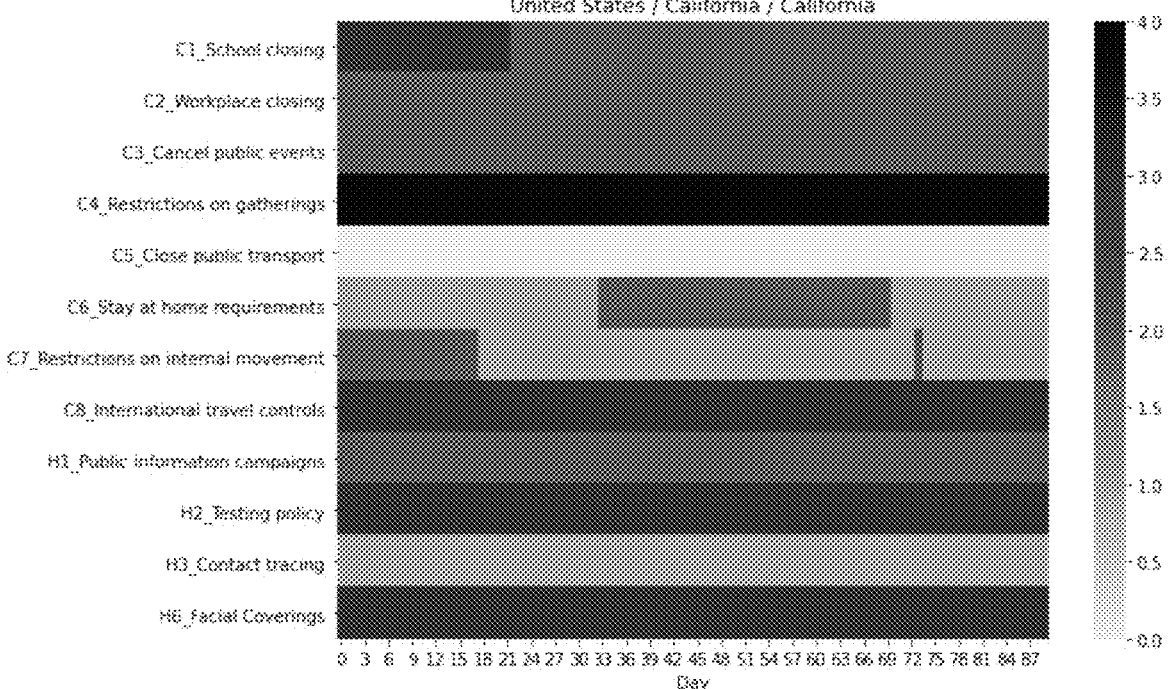
Figure 8H:
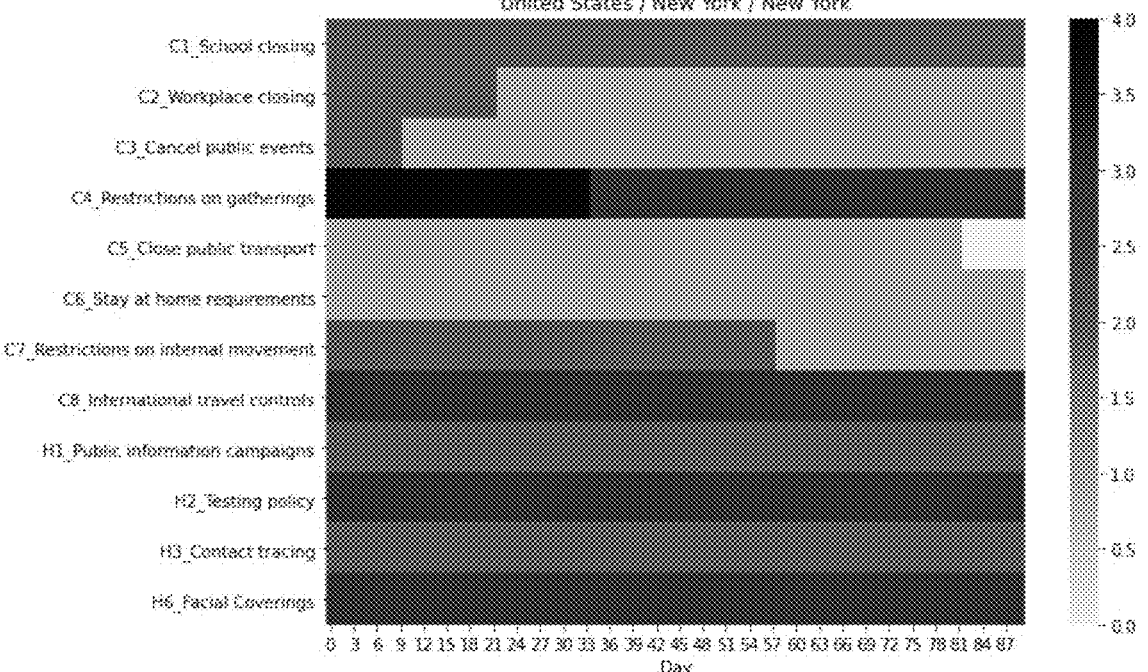

FIGS. 4*a*-4*c* show the complexities of policies in the various Pareto fronts. FIG. 4*a* is a scatterplot showing the empirical behavioral complexity of policies on the Pareto front of different methods, i.e., scratch, submitted and evolved. On the right side of the plot we see a firework like behavior, where the D&E models have exploding complexity as restraints (IPs) are lifted. Overall, the evolved policies tend to have higher complexities than the distilled ones that are based on human-developed systems, but the D&E policies provide a mediating trade-off between the high structure of the human-developed policies and the high entropy of evolution from scratch. This plot highlights a key reason for how evolution is able to discover policies that go beyond those prescribed by human-developed models: it is able to explore in a space of higher complexity. FIG. 4*b* is a distribution of real-world policy complexities in 90-day windows. These complexities are generally much lower than those of the policies suggested by D&E. FIG. 4*c* shows most complex policy for a single IP. This captures a weekly change in the C7 (Restrictions on Internal Movement) IP, showing how weekly policy changes are implementable in the real world. This observation motivates the version of D&E that only prescribes policy weekly without sacrificing Pareto efficiency. This plot highlights a key reason for how evolution is able to discover policies that go beyond those prescribed by human-developed models: it is able to explore in a space of higher complexity.

FIGS. 5*a*-5*h* are plots showing the full policies for 8 Geos of the D&E prescriptor that generates the most complex policies. The complexities of the policies vary substantially by Geo, with some IPs changing frequently, while Iran (FIG. 5*e*) has fixed policies the entire time (possibly due to the fact that official misreporting of case data in Iran causes IPs to look like noise). Although the more complex policies appear challenging to implement for policy-makers today, in an ideal society they would be implementable, helped by the fact that the policies encode a level of weekly periodicity, so each day of the week may have a particular IP setting assigned. Plus, some real-world Geos have incorporated weekly periodicity into their policies (FIG. 4*c*). However, for implementation today, changing policies on a weekly basis (FIG. 7*a*-7*h*) may be more practical, with marginal reduction in Pareto performance, and in line with the complexity of real-world policies (FIG. 8a-8h). In other words, although one of ways D&E produces innovation is through its discovery of highly complex policies, but such complexity is not required to make it work. (darker colors indicate increased stringency).

Looking at the most complex real-world policy, we notice it contains weekly periodicity. Namely, during this period, internal movement in Portugal was limited on weekends with the restrictions relaxed during the week. So, we check if some of the complexity in the evolved D&E policies is due to an inherent weekly periodicity, and see that this is indeed the case, i.e., evolution settles in to this periodicity. To detect and measure this periodicity, we generalize the Complexity metric defined above to any temporal offset, so that it measures how often the policy changes from what the policy was k days before instead of just one. Formally, $$\text{Complexity}(\pi, k) := \Sigma_{g \in G} \Sigma_{i \in I} \Sigma_{t=k}^{T-1} I(\pi(q_{git} \neq \pi(q_{gi(t-k)})), \quad (12)$$

In other words, assuming a periodicity of k days, how often does the policy change? Across the board, we see that the evolved policies have their complexity minimized at k=7, indicating that their natural periodicity is one week. It is notable that evolution comes upon such a structured periodicity that has been found to be useful in the real world, captures some inherent structure of human organization, and could potentially be useful to do more of in real-world implementations.

That said, we can also generate more easily-implementable strategies from evolved D&E models by allowing them to modify their prescriptions only every k days. We took the same models evolved for daily prescription and allowed them only to make prescriptions every 7 days. FIGS. 7a-7h illustrate full policies for the highest-complexity D&E model, but with weekly prescription (as compared to the daily in FIG. 5a-5h). The generated policies are much more in line with what is seen in the real world. The results show that the evolved models generalize to a constrained, more practical setting without further training or evolution, demonstrating the robustness of the evolved policies.

For comparison, the FIG. 6a-6h are plots showing the full policies for the same 8 for the highest complexity model submitted to the challenge. The highest-complexity submitted model has some interesting behavior. Some of the IPs for some Geos are changed rapidly, and eventually turned off (darker colors indicate increased stringency), but the overall complexity is less than that of the most complex D&E models (FIGS. 5a-5h).

Next, we look at how consistent the results are over multiple runs. To measure the contribution of individual models, we analyze the ancestry of individuals on the final Pareto front of D&E. For each distilled model $\hat{\pi}_i$ we compute the number of final Pareto front individuals who have $\hat{\pi}_i$ as an ancestor, and the percentage of genetic material on the final Pareto front that originally comes from $\hat{\pi}_i$. Formally, these two metrics are computed recursively. Let Parents($\pi$) be the parent set of $\pi$ in the evolutionary tree. Individuals in the initial population have an empty parent set; individuals in further generations usually have two parents, but may have only one if the same parent is selected twice during the weighted random selection step. Let F be the set of all individuals on the final Pareto front. Then, $$\text{Ancestors}(\pi) = \begin{cases} \varnothing & \text{Parents}(\pi) = \varnothing \quad (13) \\ \bigcup_{\pi' \in Parents(\pi)} \text{Ancestors}(\pi') \cup \text{Parents}(\pi) & \text{otherwise.} \end{cases}$$

with $$\text{ParetoContributionCount}(\pi) = |\{\pi' : \pi \in \text{Ancestors}(\pi') \\ \text{and } \pi \in F\}|, \quad (14)$$

and the percentage of ancestry of $\pi$ due to $\pi'$ is $$\text{AncestryPercentage}_{\pi'}(\pi) = \quad (15)$$

$$\begin{cases} 0 & \text{Parents } (\pi) = \varnothing, \pi \neq \pi' \\ 1 & \text{Parents } (\pi) = \varnothing, \pi = \pi' \\ \dfrac{1}{|\text{Parents}(\pi)|} \sum_{\pi'' \in Parents(\pi)} \text{AncestryPercentage}_{\pi'}(\pi'') & \text{otherwise.} \end{cases}$$

with $$\text{ParetoContributionPercentage}(\pi) = \frac{1}{|F|} \sum_{\pi' \in F} \text{AncestryPercentage}_{\pi}(\pi''). \quad (16)$$

It turns out that ParetoContributionCount and ParetoContributionPercentage are highly correlated (Spearman correlation of <correlation> over all distilled models), which is already an encouraging indication that they are measuring the underlying contribution of initial models.

Figure 9A:
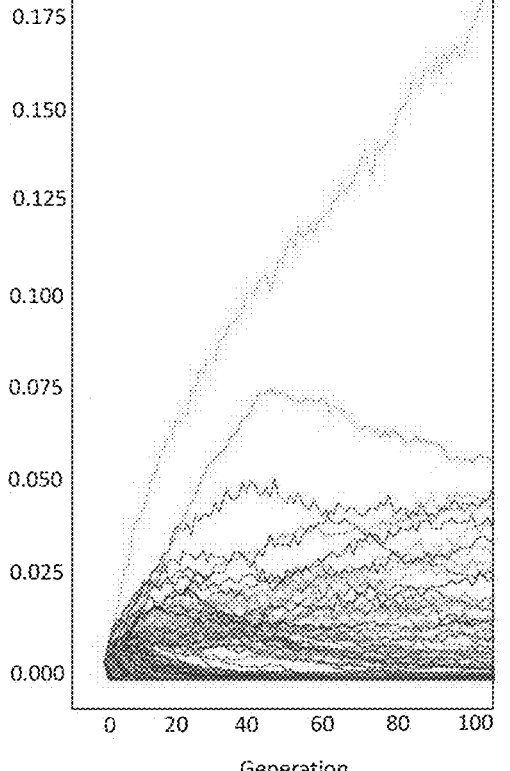
FIGS. 9a, 9b provide visualizations of contributions of individual distilled models from the XPRIZE challenge to the population of D&E models, in accordance with embodiments herein.
Figure 9B:
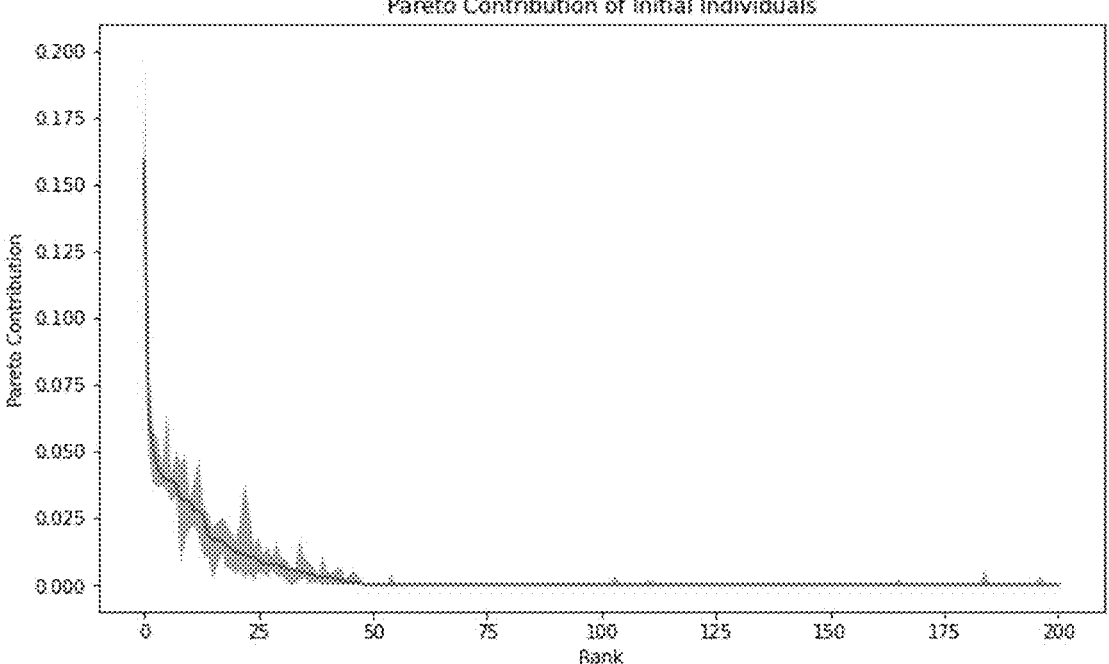

FIGS. 9a and 9b illustrate the consistency of contribution. We can see that by both contribution metrics, the contributions follow a long-tailed distribution, with the top twenty models contributing having an outsized impact on the final Pareto front. However, every distilled model makes at least some contribution to a Pareto front, showing that although some models contribute more, evolution is able to exploit some knowledge from every human-developed solution, unifying them all into a single innovation system. We conclude that both the overall performance of the method and contributions of individual distilled models to the success of the method are consistent of independent runs, demonstrating that the approach is a reliable way to push unify and expand the contributions on human-developed models.

Figure 10A:
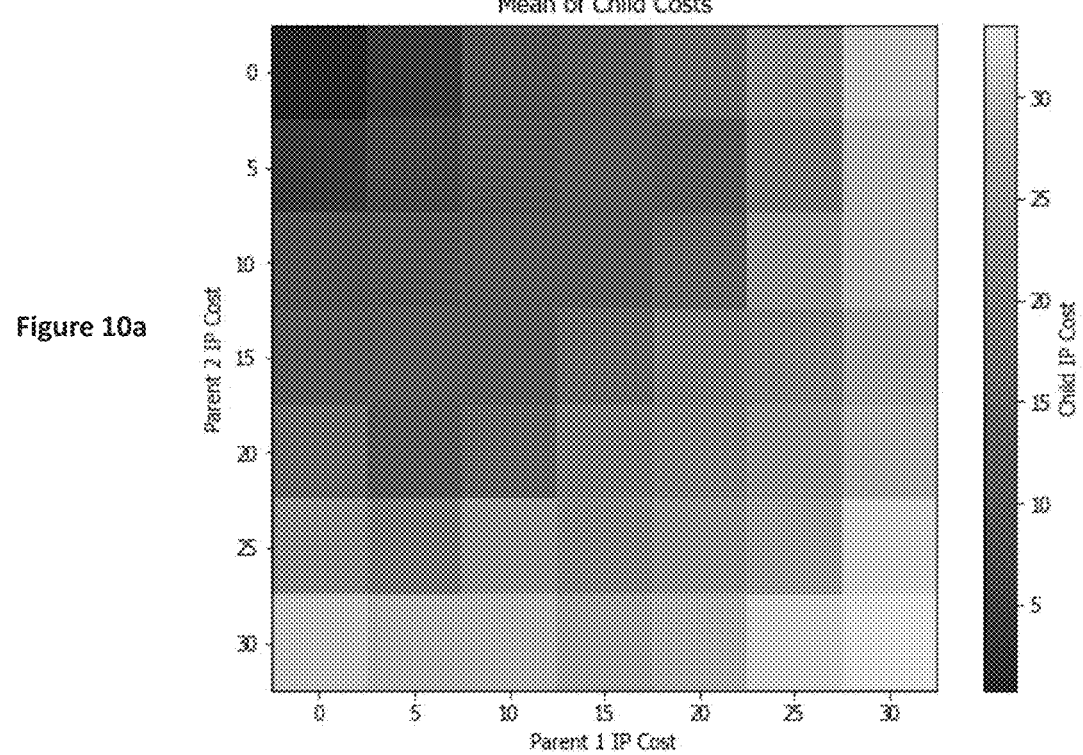
FIGS. 10a, 10b, 10c, 10d provide exemplary visualizations of crossover and ancestries for select D&E models, in accordance with embodiments herein.
Figure 10T:
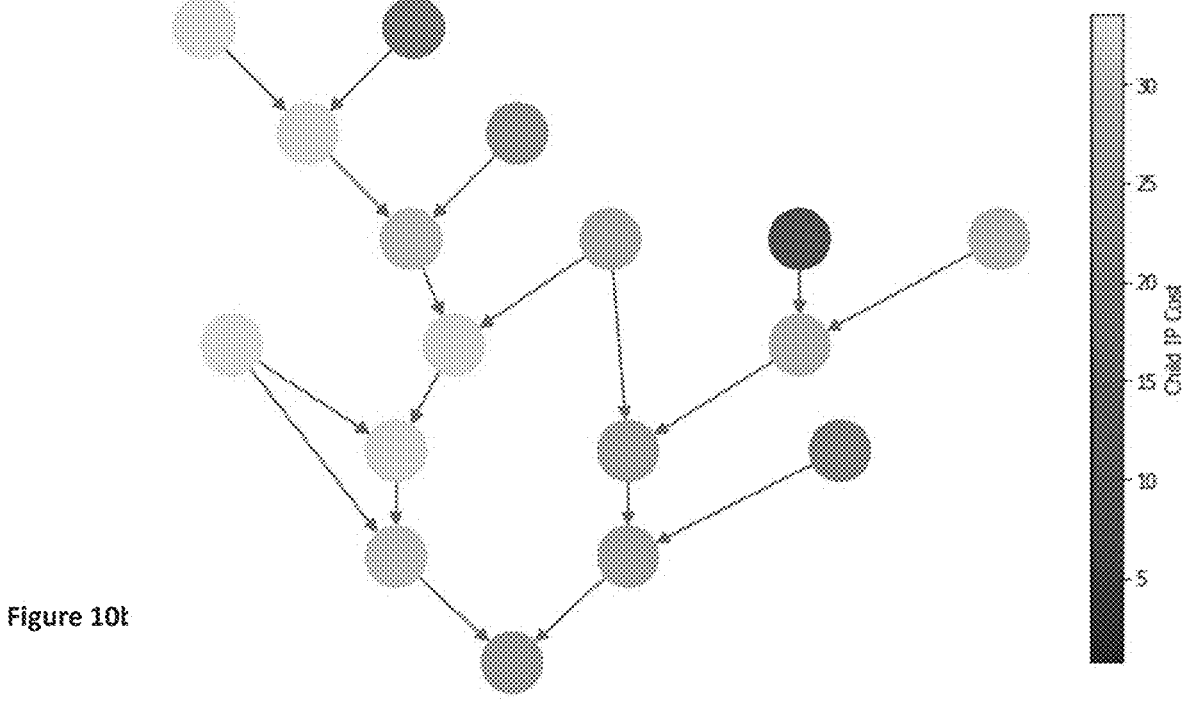
Figure 10C:
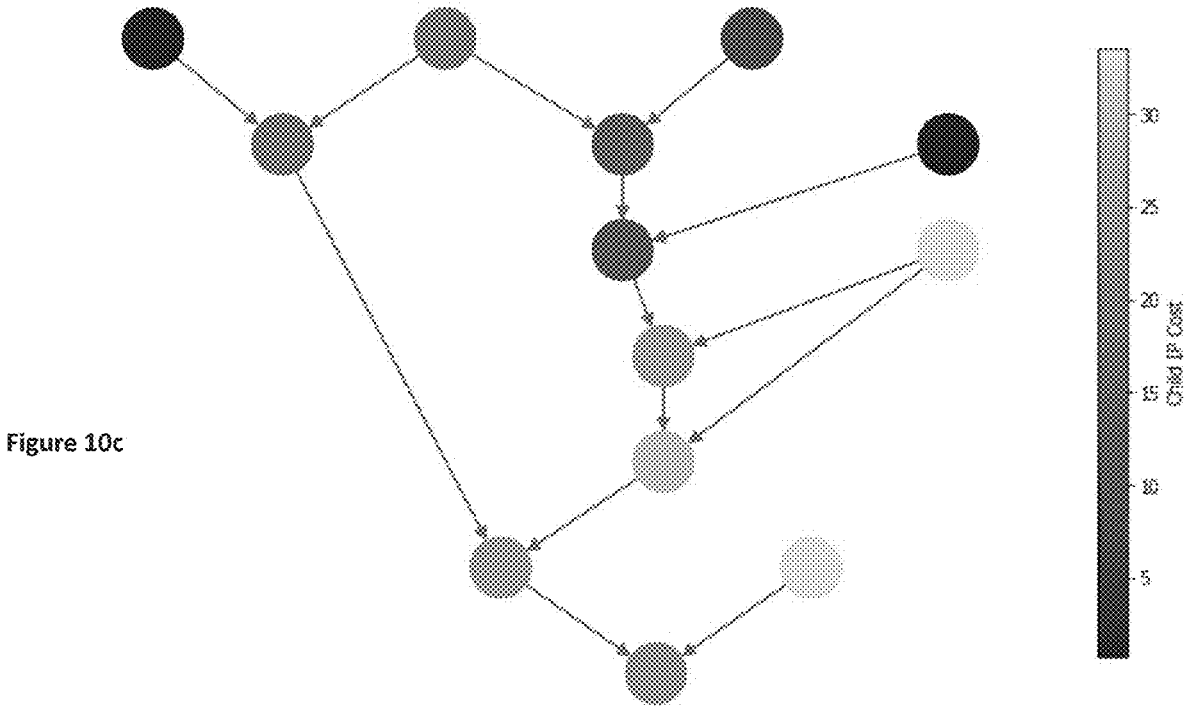
Figure 10D:
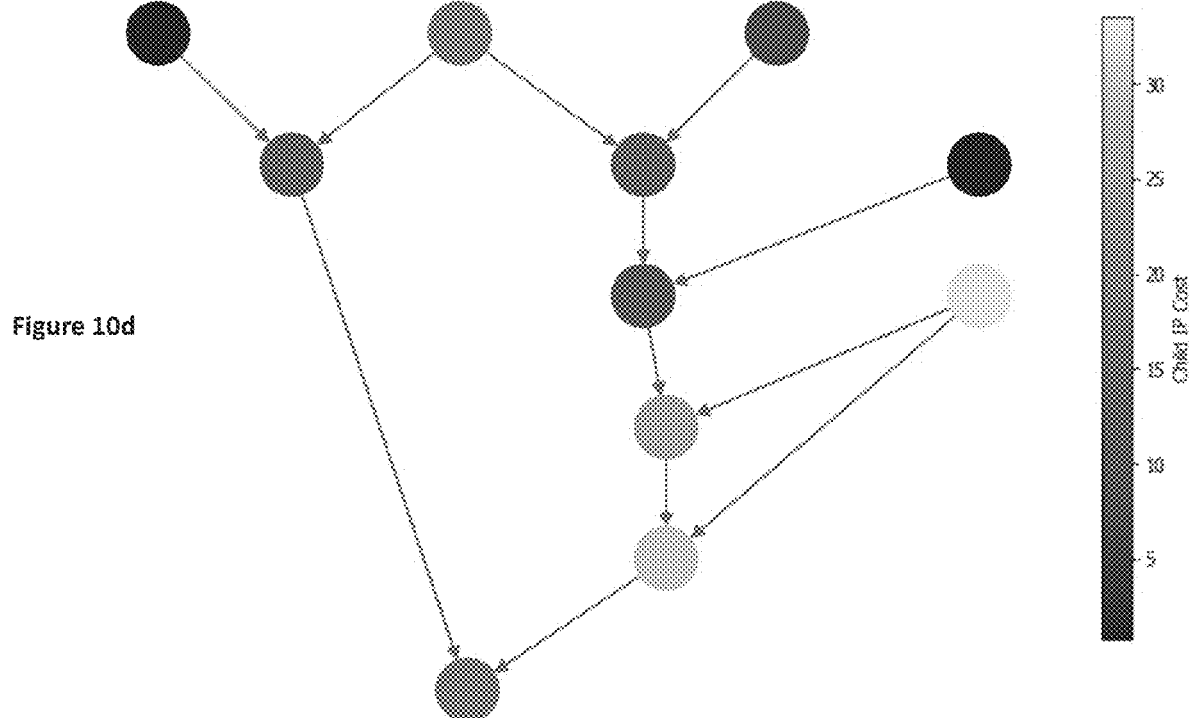

Finally, we analyze the process of evolution itself. One may wonder whether distilling prescriptors into neural networks with gradient descent results in sets of models that can be meaningfully recombined with weight-level recombination operators. It turns out that, yes, despite no explicit biases towards evolvability in the distillation process, the distilled models indeed recombine in ways that generally preserve locality and the intuition for how their phenotypes should manifest. FIGS. 10a-10d illustrate exemplary crossover and ancestries of D&E models. FIG. 10a is a heatmap showing that the crossover operator is coherent. Overall, the evolutionary process behaves as expected, in a highly-structured manner, with child models reliably falling between their parents along the case-stringency tradeoff. Several complete ancestries of models on the D&E Pareto front are shown in FIG. 10*b*-10*d*. FIG. 10*b* shows a high stringency lineage and a lower stringency lineage develop separately, before finally producing a novel, balanced final policy. The ancestry of FIG. 10*c* starts with some of the least stringent distilled models, combining with high stringency ones towards the end to fill another hole in the Pareto front. And the ancestry of FIG. 10*d* has substantial overlap with FIG. 10*c*, but the stochasticity of the procreation module leads to a distinct innovating solution.

The ancestries vary in complexity, and generally make a lot of sense, showing how evolution can discover cool behavior throughout the trade-off space by combining previous models. Although there is a correlation between the performance of teams of expert models and their contribution to the final front, there are some teams with unimpressive quantitative performance in their submissions who end up making outsized contributions through the evolutionary process. This result highlights the value in soliciting a broad diversity of expertise, even if some of it does not have immediately obvious practical utility. AI can play a role in realizing this latent potential.

The heat map of FIG. 10*a* supports how evolution matches our intuition of how behavior should evolve, even though we are evolving indirectly in the space of neural network weights, not in the space of IP schedules. In other words, evolution naturally picks up from the knowledge of distilled models, and pushes them further in terms of performance and into unexplored regions in a consistent and coherent way.

Accordingly, not only does D&E yield high-performing models, but it continues the process of innovation in a meaningful and intuitively useful way from where the humans left it.

The foregoing description is a specific embodiment of the present disclosure. It should be appreciated that this embodiment is described for purpose of illustration only, and that those skilled in the art may practice numerous alterations and modifications without departing from the spirit and scope of the invention. It is intended that all such modifications and alterations be included insofar as they come within the scope of the invention as claimed or the equivalents thereof.

Though the specific application of the D&E approach described herein addresses the current COVID-19 pandemic response policy, this is but one exemplary application. The specific example of the technology for the COVID-19 pandemic should make it faster/easier to apply the framework to future pandemics should they arise. More generally, such technology should be applicable to any policy decision-making problem where the objectives (costs and benefits) can be effectively measured, and the space of possible policies can be effectively enumerated. The most immediate generalization may be to other applications in public health, but applying such methods to other global-scale problems such as industrial climate policy (where there are economic costs in some areas and economic benefits in others, not to mention the environmental benefits) is also considered.

Another direction of generalization would be to allow users to explicitly specify constraints as part of the context to the prescriptor, leading to more controllable exploration of practical possibilities. In global-scale problems, it becomes extremely difficult for humans to make fully-informed decisions without relying on some form of artificial intelligence ("AI") to extract useful information from vast data sources. Methods like D&E can help bridge the gap between human-only decision making and AI-from-data-only approaches, so that global policy makers can start adopting such powerful methods sooner, and take advantage of the powerful possibilities that such technologies illuminate, leading to a more appealing future.

Finally, it is to be noted that though the presently described method has been applied to extend the ESP platform, such distillation, followed by injecting in the initial population, could be used in principle to initialize the population of any evolution-based method that evolves functions.

In addition to the solution benefits discussed above, the present embodiments also have the benefit of being relatively environmentally friendly compared to other large-scale AI approaches. Any proposed addition to a policymaker's toolkit must be considered for its environmental impact since environmental impact is currently at the top-of-mind of policy-makers. Fortunately, D&E, as implemented in the present embodiments, has very small energy usage compared to the average real-world deep learning application. This is because D&E does not require gigantic models (w.r.t. number of parameters) and thus can be run efficiently in parallel over CPU, avoiding costly GPU consumption. Thus, if energy consumption becomes an even more significant concern for AI methods, approaches like D&E and ESP more generally may be one sustainable way forward.

Further, one major barrier in the adoption of AI technologies by policy-makers is trust. How can a policy-maker, who is not an AI expert, trust a seemingly black-box system? D&E provides an advantage here: If the initial human-developed models are explainable, e.g., are derived from human-developed decision rules, interpretable epidemiological models, or simpler machine learning methods, then a policy-maker can trust the results of D&E are based in something sensible, and is not simply finding strange patterns in noisy data. Further, trust-building can be created by finding rules that explain the actions suggested by prescriptors. Since the prescriptor NNs are relatively small/shallow, there are a variety of techniques that would be effective here. This is another advantage of the D&E NNs being smaller/shallower than many current deep learning models; they can be effectively audited, a critical property for AI systems maintained by government organizations.

The invention claimed is:

1. A computer-implemented method for automatic discovery of intervention policies (IP) to optimize one or more objectives related to an epidemiological event, comprising:

training a predictor model, $P_d$ (C, A)=O, implemented on a processor, the predictor model being configured to receive input training data, the input historical training data sets (C, A, O) including context information (C), actions (A) performed in a given context, and outcomes (O) resulting from action performed in the given context;

establishing an initial population of candidate prescriptor models, said establishing including receiving multiple known model candidates for determining intervention policies;

distilling the multiple known model candidates into a functional architecture that is compatible with an evolutionary algorithm framework;

evolving prescriptor models, $P_s$ (C)=A, implemented on a processor, wherein the prescriptor models are evolved over multiple generations using the trained predictor model as a surrogate to evolve a subset of the candidate prescriptor models in the initial population, the evolved prescriptor models being configured to
  receive context information as input data, wherein the
    context information includes epidemiological event
    data; and
  output actions that optimize the one or more objectives
    as outcomes corresponding to the received context
    information, wherein the output actions include
    implementation of intervention policies.

2. The computer-implemented method of claim 1, wherein the predictor model is a machine learning model trained with supervised methods.

3. The computer-implemented method of claim 2, wherein the predictor model is a neural network.

4. The computer-implemented method of claim 1, wherein the functional architecture is a neural network.

5. The computer-implemented method of claim 1, wherein the one or more objectives include minimizing a number of future epidemiological events and a level of stringency of one or more interventions.

* * * * *